(12) United States Patent
Baker

(10) Patent No.: US 11,543,211 B2
(45) Date of Patent: *Jan. 3, 2023

(54) VARIABLE RANGE COMPENSATING DEVICE

(71) Applicant: John L. Baker, Sheridan, IL (US)

(72) Inventor: John L. Baker, Sheridan, IL (US)

(*) Notice: Subject to any disclaimer, the term of this patent is extended or adjusted under 35 U.S.C. 154(b) by 72 days.

This patent is subject to a terminal disclaimer.

(21) Appl. No.: 17/242,128

(22) Filed: Apr. 27, 2021

(65) Prior Publication Data

US 2021/0310767 A1    Oct. 7, 2021

Related U.S. Application Data

(63) Continuation-in-part of application No. 16/544,465, filed on Aug. 19, 2019, now Pat. No. 10,989,498, which is a continuation-in-part of application No. 16/092,057, filed as application No. PCT/US2017/027208 on Apr. 12, 2017, now Pat. No. 10,386,159.

(60) Provisional application No. 62/321,254, filed on Apr. 12, 2016.

(51) Int. Cl.
| | |
|---|---|
| *F41G 1/38* | (2006.01) |
| *F41G 3/06* | (2006.01) |
| *F41G 1/30* | (2006.01) |
| *G02B 26/08* | (2006.01) |
| *F41G 3/32* | (2006.01) |
| *G02B 23/02* | (2006.01) |

(52) U.S. Cl.
CPC ............. *F41G 3/06* (2013.01); *F41G 1/30* (2013.01); *F41G 1/38* (2013.01); *F41G 3/323* (2013.01); *G02B 23/02* (2013.01); *G02B 26/0816* (2013.01)

(58) Field of Classification Search
CPC ... F41G 1/38; F41G 1/473; F41G 3/08; F41G 3/06; F41G 3/323; G02B 23/02; G02B 23/14; G02B 23/16
USPC .................. 42/111, 118–122, 130; 89/41.17; 235/404
See application file for complete search history.

(56) References Cited

U.S. PATENT DOCUMENTS

| | | | | |
|---|---|---|---|---|
| 3,749,494 A | * | 7/1973 | Hodges .................. | F41G 1/473 356/17 |
| 4,478,513 A | * | 10/1984 | Skinner .................. | G01J 3/021 359/636 |
| 6,233,836 B1 | * | 5/2001 | Uhlmann ................ | F41G 1/345 42/145 |
| 7,552,558 B1 | * | 6/2009 | Ballard .................... | F41G 1/40 356/255 |

(Continued)

*Primary Examiner* — Michael D David

(74) *Attorney, Agent, or Firm* — Shaddock Law Group, PC

(57) ABSTRACT

A variable range compensating device, including at least some of a housing having an optical cavity defined at least partially within the housing, wherein the optical cavity extends from an incoming image aperture to an outgoing image aperture; and two or more reflective optical elements, wherein each reflective optical element is adjustably positioned within at least a portion of the optical cavity, and wherein adjustment of at least one of the reflective optical elements adjusts the reflective optical elements such that a target image entering the incoming image aperture is reflected by the reflective optical elements, so as to exit the outgoing image aperture at a determined offset.

20 Claims, 36 Drawing Sheets

(56) References Cited

U.S. PATENT DOCUMENTS

| | | | | |
|---|---|---|---|---|
| 7,603,804 B2* | 10/2009 | Zaderey | ............ | F41G 1/38 |
| | | | | 42/130 |
| 7,752,798 B2* | 7/2010 | Mayerle | ............ | F41G 1/41 |
| | | | | 42/118 |
| 8,336,776 B2* | 12/2012 | Horvath | ............ | F41G 1/473 |
| | | | | 235/407 |
| 8,353,454 B2* | 1/2013 | Sammut | ............ | F41G 1/00 |
| | | | | 235/404 |
| 8,656,630 B2* | 2/2014 | Sammut | ............ | F41G 1/01 |
| | | | | 89/41.17 |
| 8,707,608 B2* | 4/2014 | Sammut | ............ | G02B 27/32 |
| | | | | 42/130 |
| 10,180,565 B2* | 1/2019 | Havens | ............ | G02B 23/16 |
| 10,386,159 B2* | 8/2019 | Baker | ............ | F41G 1/473 |
| 10,989,498 B2* | 4/2021 | Baker | ............ | F41G 1/38 |
| 2003/0010190 A1* | 1/2003 | Sammut | ............ | G02B 23/14 |
| | | | | 89/41.17 |
| 2015/0052796 A1* | 2/2015 | Baker | ............ | F41A 35/02 |
| | | | | 42/96 |
| 2019/0145737 A1* | 5/2019 | Baker | ............ | F41G 1/473 |
| | | | | 42/118 |
| 2021/0310767 A1* | 10/2021 | Baker | ............ | F41G 3/06 |

\* cited by examiner

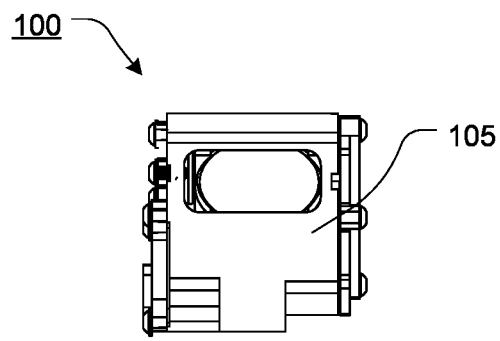
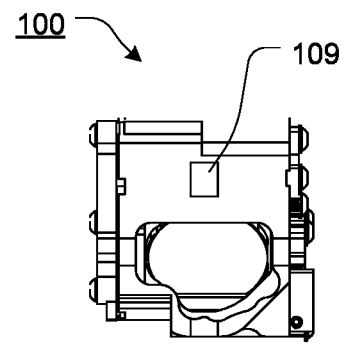
FIG. 31  FIG. 32
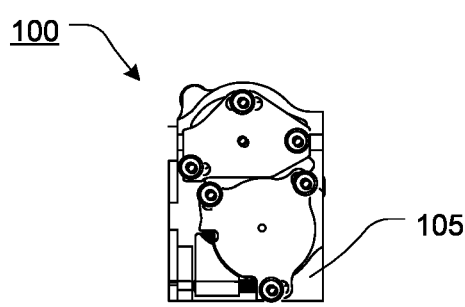
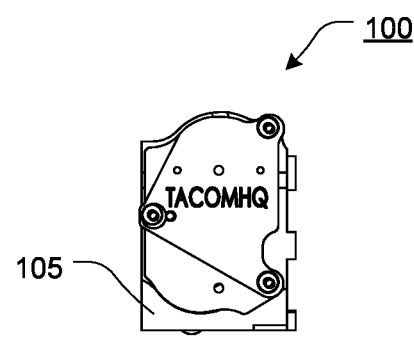
FIG. 33  FIG. 34
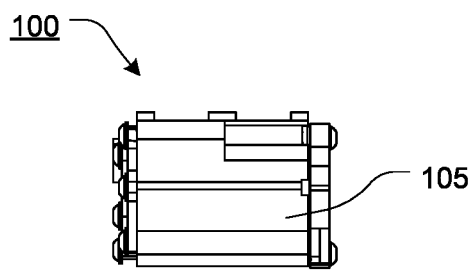
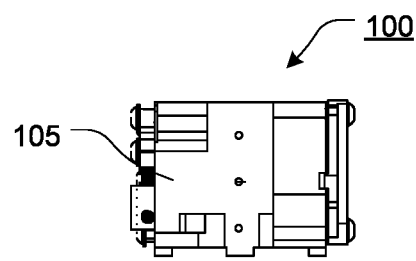
FIG. 35  FIG. 36

VARIABLE RANGE COMPENSATING DEVICE

CROSS-REFERENCE TO RELATED APPLICATIONS

This patent application is a continuation-in-part of U.S. patent application Ser. No. 16/544,465, filed Aug. 19, 2019, which is a continuation-in-part of U.S. patent application Ser. No. 16/092,057, filed Oct. 8, 2018, which is a 371 of International Application No. PCT/US2017/27208, filed Apr. 12, 2017, which claims the benefit of U.S. Patent Application Ser. No. 62/321,254, filed Apr. 12, 2016, the disclosures of which are incorporated herein by reference in their entireties.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to the field of targeting sights, targeting scopes, and targeting systems. More specifically, the presently disclosed systems, methods, and/or apparatuses relates to a variable range compensating device adaptable to be used with a firearm.

2. Description of Related Art

When a shooter fails to hit a target, the failure is typically on the part of the shooter. This is due to complexity of a device, time to adjust such devices, insufficient training time, and the basic reduction of human emotion to fight or flight. The stronger the negative inputs the lower the performance of most individuals.

Many modern shooting accessories, such as scopes or sights, may be attached to a variety of firearms, generally to improve the functionality or usability of those firearms. Known accessories include holographic sights, red dot sights, reflex sights, and scopes. These accessories may be used wherever firearms or similar weapons may be employed, such as for hunting, law enforcement, military, personal defense, recreational target shooting, paint ball, air soft, pellet and any projectile air driven round. Mounts, such as ring mounts, quick release bases, bolt on bases, magnetic bases are used to couple an accessory to a weapon. For example, a gun may have a scope mount on its action, which may permit an after-market scope to be attached to the gun after it has been purchased. This may improve the user's ability to operate the gun, for example by making it easier for the user to aim the gun at long-distance targets.

Other devices may similarly incorporate scopes. Many hunters, for example, choose to hunt with modernized crossbows these weapons may also include mounting sites for a scope, or may be sold with a scope pre-mounted to the stock. Scoped devices also may not exclusively be weapons; many cameras, telescopes, and other optical sensing devices may include view finding scopes that may allow a user to align the optical targeting device.

These devices, however, have functional and practical problems. Most dot units and scopes or targeting devices have a finite range, short, long, CQB (close quarters battle) but typically add time and complexity to make the change (turrets, stadia values, holdover) in order to engage at a significantly different points on the ballistic curve.

Most scopes or targeting devices have a finite range. It is often time consuming or difficult to change or adjust the scope or other targeting devices for close quarters or long range targeting. A user may need to completely remove the scope or similar targeting device and mounting system to apply the correct component(s), which can create significant weapon re-sighting issues and becomes increasingly problematic as range increases. Alternatively, a user may require increasingly large ocular/elevation adjustments to compensate for a projectile's ballistic path at extended ranges. For example, a user will use the scope's total adjustment range at extreme ranges, such as 3,000 or more, to add or subtract a few hundred yards of range. As an example, a scope might need 25 moa dialed in to go from 100 yds to 1000 yds, but would need 380 moa for 4000 yards an increase of 14× for a 4× increase of required yardage/targeting. Insufficient adjustability in elevation may reduce or, in some cases, eliminate the ability of a platform/weapon to be employed over its full potential range in spite of the magnification.

Adjustability in elevation may relate to the ability to use the scope/weapon over a known range/yardage/meters/distance. This may be overcome through guess work and methods such as "terrain bracketing" or "geography stepping" in which objects beyond the target or vertical from the target are used to create a reference in order to target an object beyond the range of the base optics. For short-range devices this could be 300 meters, while in other engagements, limits could start taking place at 2400 meters. Mistakes can be made while switching ranges. Mistakes could include the bullet not arriving on the intended target, a loss of points in a target shooting match, or, in other cases, the mistake can cost lives. It is also often time consuming or difficult to adjust or change devices from long range to short range targeting. It can also be confusing for a person in to make such compensation in the field or while under stress.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

In order to overcome these and various other shortcomings in the present targeting sights, targeting scopes, and targeting systems, various exemplary, nonlimiting embodiments of the present disclosure optionally provide a variable range compensating device that reduces exposure time to enemy fire, reduces time to effectively engage, improves on-target performance and increases the lethality of all weapon's capable distances, while improving shooter performance. This is done by bending the incoming image to an optical targeting device. The bent image value is equal to a point blank range value. Stacking point-blank ranges creates new second point-blank range values. This allows the shooter to engage at new longer distance ranges (i.e., 600 yds) with a simple instruction—put the dot on the target—no training required. This compensator of the present disclosure reduces on-time engagement and increases effectiveness by 50-70% as compared to standard optics.

The variable range compensating device be utilized to shift a target image before the target image reaches an optical targeting device or optical system, and may include an optical targeting device having a zero. The variable range compensating device may be removably disposed in line of sight between a target and the optical targeting device. The variable range compensating device may be utilized to shift a target image before it reaches the optical targeting device, creating zeroing or point of aim, point of impact adjustment at alternate ranges.

No currently known or existing optic can match the performance range of current (let alone future) high performance rifle rounds. No currently known or existing optic can provide the range of the variable range compensating device of the present disclosure.

In certain other exemplary, nonlimiting embodiments, methods of shifting the target image for an optical targeting device are provided. The methods may include providing an optical adjustment apparatus that consists of two or more mirrors and/or lenses in a line of sight between a target and an optical targeting device. The mirrored optical adjustment apparatus may be utilized to shift the target image, which is then viewed through the optical targeting device.

In certain exemplary, nonlimiting embodiments, a target adjustment apparatus is provided. The variable range compensating device may include an optical targeting device having a zero and set magnification range. The variable range compensating device may further include an optical adjustment mirror/lens assembly that is removably disposed in a line of sight between a target and the optical targeting device and/or its reticle/aim point. The optical adjustment lens may shift a target image before it reaches the optical targeting device and/or its aim point, creating a second zero.

In various exemplary, nonlimiting embodiments, the variable range visual target adjustment system or apparatus comprises at least some of a housing having an optical cavity defined at least partially within the housing. The optical cavity extends from an incoming image aperture to an outgoing image aperture. Two or more adjustable holders, each comprising a reflective surface, are rotatably positioned within the optical cavity.

The adjustable holders adjust the reflective surfaces, such that an image entering the incoming image aperture can be reflected off of the reflective surfaces, so as to exit the outgoing image aperture at a determined offset.

In various exemplary, nonlimiting embodiments, the variable range compensating device includes a housing having an optical cavity defined at least partially within the housing, wherein the optical cavity extends from an incoming image aperture to an outgoing image aperture and at least one adjustable holder rotatably positioned within at least a portion of the optical cavity, wherein at least a portion of the at least one adjustable holder comprises a reflective surface, and wherein adjustment of the adjustable holder adjusts the reflective surface such that an image entering the incoming image aperture can be reflected off of the reflective surface, so as to exit the outgoing image aperture at a determined offset.

In certain exemplary, nonlimiting embodiments, the variable range compensating device includes a housing having an optical cavity defined at least partially within the housing, wherein the optical cavity extends from an incoming image aperture to an outgoing image aperture and two or more adjustable holders rotatably positioned within at least a portion of the optical cavity, wherein at least a portion of each of the adjustable holder comprises a reflective surface, and wherein adjustment of the adjustable holders adjusts the reflective surfaces such that an image entering the incoming image aperture can be reflected off of the reflective surfaces, so as to exit the outgoing image aperture at a determined offset.

In certain exemplary embodiments, the reflective surface or surfaces is/are a reflective surface element attached or coupled to the at least one adjustable holder.

In certain exemplary embodiments, two or more adjustable holders are included, each having an associated reflective surface or reflective surface element.

In various exemplary, nonlimiting embodiments, the variable range visual target adjustment system or apparatus of the present disclosure comprises at least some of a housing having an optical cavity defined at least partially within the housing, wherein the optical cavity extends from an incoming image aperture to an outgoing image aperture; at least one first adjustable holder rotatably positioned within at least a portion of the optical cavity, wherein at least a portion of the at least one first adjustable holder comprises a reflective surface; and at least one second adjustable holder rotatably positioned within at least a portion of the optical cavity, wherein at least a portion of the at least one second adjustable holder comprises a reflective surface; wherein the reflective surface of the at least one first adjustable holder is positioned so as to receive an target image through the incoming image aperture and reflect the target image to the reflective surface of the at least one second adjustable holder, and wherein the reflective surface of the at least one second adjustable holder is positioned so as to receive the target image from the reflective surface of the at least one first adjustable holder and reflect the target image through the outgoing image aperture; and wherein rotational adjustment of the at least one first adjustable holder and/or the at least one second adjustable holder adjusts an angle at which the target image is reflected through the outgoing image aperture.

In various exemplary, nonlimiting embodiments, the reflective surface of the at least one first adjustable holder and/or the reflective surface of the at least one second adjustable holder is a polished or coated portion, a concave surface, or a convex surface of the at least one first adjustable holder and/or the reflective surface of the at least one second adjustable holder.

In various exemplary, nonlimiting embodiments, the reflective surface of the at least one first adjustable holder and/or the reflective surface of the at least one second adjustable holder is a plane mirror or a magnifying mirror attached or coupled to the at least one adjustable holder.

In various exemplary, nonlimiting embodiments, a determined rotational adjustment of the at least one first adjustable holder and/or a determined rotational adjustment of the at least one second adjustable holder adjusts an angle at which the target image is reflected through the outgoing image aperture at a determined offset.

In various exemplary, nonlimiting embodiments, the adjustable holder extends from a substantially circular first end portion, along a central, cradle portion, to a substantially circular second end portion.

In various exemplary, nonlimiting embodiments, the first end portion has a greater outer diameter than an outer diameter of the second end portion and the first end portion is formed so as to be rotationally positioned within a first lens holder aperture formed through the housing, while the second end portion is formed so as to be rotationally positioned within a second holder aperture formed in the housing.

In various exemplary, nonlimiting embodiments, at least one of the at least one first adjustable holder and the at least one second adjustable holder are manually rotatable. In certain exemplary, nonlimiting embodiments, at least one of the at least one first adjustable holder and the at least one second adjustable holder are manually rotatable, via an elongate slot formed in the at least one first adjustable holder or the at least one second adjustable holder. Alternatively, at least one of the at least one first adjustable holder and the at least one second adjustable holder are rotatable via linked interaction with at least one turret, wherein rotational movement of the turret produces rotational movement of at least one of the at least one first adjustable holder and the at least one second adjustable holder.

In various exemplary, nonlimiting embodiments, at least one of the at least one first adjustable holder and the at least one second adjustable holder is rotatably adjusted, via a drive motor. In certain exemplary, nonlimiting embodiments, the drive motor rotatably just at least one of the at least one first adjustable holder and the at least one second adjustable holder in response to information from a rangefinder device or a ballistic computer or calculator.

In various exemplary, nonlimiting embodiments, the variable range visual target adjustment system or apparatus of the present disclosure comprises at least some of a housing having an optical cavity defined at least partially within the housing, wherein the optical cavity extends from an incoming image aperture to an outgoing image aperture; and two or more adjustable holders, wherein each rotatably adjustable holder is rotatably positioned within at least a portion of the optical cavity, wherein at least a portion of each of the adjustable holder comprises a reflective surface, and wherein adjustment of at least one of the adjustable holders adjusts the reflective surfaces such that a target image entering the incoming image aperture is reflected by the reflective surfaces, so as to exit the outgoing image aperture at a determined offset.

In various exemplary, nonlimiting embodiments, the variable range visual target adjustment system or apparatus of the present disclosure provides a method for adjusting an angle at which a target image is presented to an optical targeting device. The method includes at least some of providing a variable range compensating device between a target and the optical targeting device and rotationally adjusting at least one of the at least one first adjustable holder and/or the at least one second adjustable holder of the variable range compensating device to adjust an angle at which the target image is reflected through the outgoing image aperture to the optical targeting device.

In various exemplary, nonlimiting embodiments of the method, the reflective surface of the at least one first adjustable holder and/or the reflective surface of the at least one second adjustable holder is a polished or coated portion of the at least one first adjustable holder and/or the reflective surface of the at least one second adjustable holder.

In various exemplary, nonlimiting embodiments of the method, the reflective surface of the at least one first adjustable holder and/or the reflective surface of the at least one second adjustable holder is a plane mirror attached or coupled to the at least one adjustable holder.

In various exemplary, nonlimiting embodiments, the variable range visual target adjustment system or apparatus comprises at least some of a housing having an optical cavity defined at least partially within the housing, wherein the optical cavity extends from an incoming image aperture to an outgoing image aperture; at least one first reflective surface positioned within at least a portion of the optical cavity, wherein the at least one first reflective surface is adjustable so as to adjust an orientation of the at least one first reflective surface relative to the housing; at least one second reflective surface positioned within at least a portion of the optical cavity, wherein the at least one second reflective surface is adjustable so as to adjust an orientation of the at least one second reflective surface relative to the housing; wherein the at least one first reflective surface is positioned so as to receive a target image through the incoming image aperture and reflect the target image to the at least one second reflective surface, and wherein the at least one second reflective surface is positioned so as to receive the target image from the at least one first reflective surface and reflect the target image through the outgoing image aperture; and wherein adjustment of the at least one first adjustable holder and/or the at least one second adjustable holder adjusts an angle at which the target image is reflected through the outgoing image aperture.

In various exemplary, nonlimiting embodiments, a determined adjustment of the at least one first reflective surface and/or a determined adjustment of the at least one second reflective surface adjusts an angle at which the target image is reflected through the outgoing image aperture at a determined offset.

In various exemplary, nonlimiting embodiments, adjustment so as to adjust the vertical orientation of the at least one first reflective surface and/or the at least one second reflective surface adjusts a right and left orientation of the at least one first reflective surface and/or the at least one second reflective surface.

In various exemplary, nonlimiting embodiments, adjustment so as to adjust the orientation of the at least one first reflective surface and/or the at least one second reflective surface adjusts a vertical orientation of the at least one first reflective surface and/or the at least one second reflective surface.

In various exemplary, nonlimiting embodiments, adjustment so as to adjust the orientation of the at least one first reflective surface and/or the at least one second reflective surface adjusts a horizontal orientation of the at least one first reflective surface and/or the at least one second reflective surface.

In various exemplary, nonlimiting embodiments, adjustment so as to adjust the orientation of the at least one first reflective surface and/or the at least one second reflective surface adjusts the orientation of the at least one first reflective surface relative to the at least one second reflective surface.

In various exemplary, nonlimiting embodiments, at least one transmissive optical device is positioned relative to the at least one first reflective surface or the at least one second reflective surface to magnify the incoming image or the outgoing image or de-magnify the incoming image or the outgoing image.

In various exemplary, nonlimiting embodiments, at least one of the at least one first reflective surface and the at least one second reflective surface is manually manipulable.

In various exemplary, nonlimiting embodiments, the variable range visual target adjustment system or apparatus comprises at least some of a housing having an optical cavity defined at least partially within the housing, wherein the optical cavity extends from an incoming image aperture to an outgoing image aperture; and two or more reflective surfaces, wherein each reflective surface is adjustably positioned within at least a portion of the optical cavity, and wherein adjustment of at least one of the reflective surfaces adjusts the reflective surfaces such that a target image entering the incoming image aperture is reflected by the reflective surfaces, so as to exit the outgoing image aperture at a determined offset.

In various exemplary, nonlimiting embodiments, a method for adjusting an angle at which a target image is presented to an optical targeting device, includes at least the steps of providing a variable range compensating device between a target and the optical targeting device; the variable range compensating device comprising: a housing having an optical cavity defined at least partially within the housing, wherein the optical cavity extends from an incoming image aperture to an outgoing image aperture; at least one first reflective surface adjustably positioned within at least a portion of the optical cavity; at least one second reflective surface adjustably positioned within at least a portion of the optical cavity; wherein the at least one first reflective surface is positioned so as to receive a target image through the incoming image aperture and reflect the target image to the at least one second reflective surface, and wherein the at least one second reflective surface is positioned so as to receive the target image from the at least one first reflective surface and reflect the target image through the outgoing image aperture; wherein adjustment of the at least one first reflective surface and/or the at least one second reflective surface adjusts an angle at which the target image is reflected through the outgoing image aperture; and adjusting at least one of the at least one first reflective surface and/or the at least one second reflective surface to adjust an angle at which the target image is reflected through the outgoing image aperture to the optical targeting device.

In various exemplary, nonlimiting embodiments, the variable range visual target adjustment system or apparatus of the present disclosure comprises at least some of a housing having an optical cavity defined at least partially within the housing, wherein the optical cavity extends from an incoming image aperture to an outgoing image aperture; at least one first reflective optical element positioned within at least a portion of the optical cavity, wherein the at least one first reflective optical element is adjustable so as to adjust an orientation of the at least one first reflective optical element relative to the housing; at least one second reflective optical element positioned within at least a portion of the optical cavity, wherein the at least one second reflective optical element is adjustable so as to adjust an orientation of the at least one second reflective optical element relative to the housing; wherein the at least one first reflective optical element is positioned so as to receive a target image through the incoming image aperture and reflect the target image to the at least one second reflective optical element, and wherein the at least one second reflective optical element is positioned so as to receive the target image from the at least one first reflective optical element and reflect the target image through the outgoing image aperture; and wherein adjustment of the at least one first reflective optical element and/or the at least one second reflective optical element adjusts an angle at which the target image is reflected through the outgoing image aperture.

In certain exemplary embodiments, the at least one first reflective optical element and/or the at least one second reflective optical element is an optical wedge.

In certain exemplary embodiments, the at least one first reflective optical element and/or the at least one second reflective optical element is an optical prism.

In certain exemplary embodiments, the at least one first reflective optical element and/or the at least one second reflective optical element comprises a reflective optical element having a transparent optical portion with one of more surfaces that refract light.

In certain exemplary embodiments, the at least one first reflective optical element is attached or coupled to an adjustable holder.

In certain exemplary embodiments, the at least one second reflective optical element is attached or coupled to an adjustable holder.

In certain exemplary embodiments, a determined adjustment of the at least one first reflective optical element and/or a determined adjustment of the at least one second reflective optical element adjusts an angle at which the target image is reflected through the outgoing image aperture at a determined offset.

In certain exemplary embodiments, adjustment so as to adjust the vertical orientation of the at least one first reflective optical element and/or the at least one second reflective optical element adjusts a right and left orientation of the at least one first reflective optical element and/or the at least one second reflective optical element.

In certain exemplary embodiments, adjustment so as to adjust the orientation of the at least one first reflective optical element and/or the at least one second reflective optical element adjusts a vertical orientation of the at least one first reflective optical element and/or the at least one second reflective optical element.

In certain exemplary embodiments, adjustment so as to adjust the orientation of the at least one first reflective optical element and/or the at least one second reflective optical element adjusts a horizontal orientation of the at least one first reflective optical element and/or the at least one second reflective optical element.

In certain exemplary embodiments, adjustment so as to adjust the orientation of the at least one first reflective optical element and/or the at least one second reflective optical element adjusts the orientation of the at least one first reflective optical element relative to the at least one second reflective optical element.

In certain exemplary embodiments, at least one transmissive optical device is positioned relative to the at least one first reflective optical element or the at least one second reflective optical element to magnify the incoming image or the outgoing image or de-magnify the incoming image or the outgoing image.

In certain exemplary embodiments, at least one of the at least one first reflective optical element and the at least one second reflective optical element is manually manipulable.

In certain exemplary embodiments, at least one of the at least one first reflective optical element and the at least one second reflective optical element are rotatable via linked interaction with at least one turret, wherein rotational movement of the turret produces rotational movement of at least one of the at least one first reflective optical element and the at least one second reflective optical element.

In certain exemplary embodiments, at least one of the at least one first reflective optical element and the at least one second reflective optical element is manipulated via a drive motor.

In certain exemplary embodiments, the drive motor rotatably adjusts at least one of the at least one first reflective optical element and the at least one second reflective optical element in response to information from a rangefinder device or a ballistic computer or calculator.

In various exemplary, nonlimiting embodiments, the variable range visual target adjustment system or apparatus of the present disclosure comprises at least some of a housing having an optical cavity defined at least partially within the housing, wherein the optical cavity extends from an incoming image aperture to an outgoing image aperture; and two or more reflective optical elements, wherein each reflective optical element is adjustably positioned within at least a portion of the optical cavity, and wherein adjustment of at least one of the reflective optical elements adjusts the reflective optical elements such that a target image entering the incoming image aperture is reflected by the reflective optical elements, so as to exit the outgoing image aperture at a determined offset.

In certain exemplary embodiments, each of the reflective optical elements is attached or coupled to an adjustable holder.

In certain exemplary embodiments, at least one reflective optical element is adjusted so as to adjust a relative angle of the at least one reflective optical element relative to at least one other reflective optical element.

In various exemplary, nonlimiting embodiments, a method for adjusting an angle at which a target image is presented to an optical targeting device, includes at least the steps of providing a variable range compensating device between a target and the optical targeting device; the variable range compensating device comprising: a housing having an optical cavity defined at least partially within the housing, wherein the optical cavity extends from an incoming image aperture to an outgoing image aperture; at least one first reflective optical element adjustably positioned within at least a portion of the optical cavity; at least one second reflective optical element adjustably positioned within at least a portion of the optical cavity; wherein the at least one first reflective optical element is positioned so as to receive a target image through the incoming image aperture and reflect the target image to the at least one second reflective optical element, and wherein the at least one second reflective optical element is positioned so as to receive the target image from the at least one first reflective optical element and reflect the target image through the outgoing image aperture; wherein adjustment of the at least one first reflective optical element and/or the at least one second reflective optical element adjusts an angle at which the target image is reflected through the outgoing image aperture; and adjusting at least one of the at least one first reflective optical element and/or the at least one second reflective optical element to adjust an angle at which the target image is reflected through the outgoing image aperture to the optical targeting device.

Accordingly, the presently disclosed systems, methods, and/or apparatuses separately and optionally provide variable range compensating device that shift a target image before it reaches an optical targeting device, creating alternate ranges.

The presently disclosed systems, methods, and/or apparatuses separately and optionally provide variable range compensating device that will allow the user to shift an image before of the existing optical unit's aim point.

The presently disclosed systems, methods, and/or apparatuses separately and optionally provide variable range compensating device that create a second zero for an optical targeting device.

The presently disclosed systems, methods, and/or apparatuses separately and optionally provide variable range compensating device that can be easily manipulated by a user.

The presently disclosed systems, methods, and/or apparatuses separately and optionally provide variable range compensating device that allow a user to add, remove, or adjust mirrors/lenses from a device.

The presently disclosed systems, methods, and/or apparatuses separately and optionally provide variable range compensating device that allow a user to swap or replace devices with different mirrors/lenses and/or capabilities.

These and other aspects, features, and advantages of the presently disclosed systems, methods, and/or apparatuses are described in or are apparent from the following detailed description of the exemplary, non-limiting embodiments of the presently disclosed systems, methods, and/or apparatuses and the accompanying figures. Other aspects and features of embodiments of the presently disclosed systems, methods, and/or apparatuses will become apparent to those of ordinary skill in the art upon reviewing the following description of specific, exemplary embodiments of the presently disclosed systems, methods, and/or apparatuses in concert with the figures. While features of the presently disclosed systems, methods, and/or apparatuses may be discussed relative to certain embodiments and figures, all embodiments of the presently disclosed systems, methods, and/or apparatuses can include one or more of the features discussed herein. Further, while one or more embodiments may be discussed as having certain advantageous features, one or more of such features may also be used with the various embodiments of the systems, methods, and/or apparatuses discussed herein. In similar fashion, while exemplary embodiments may be discussed below as device, system, or method embodiments, it is to be understood that such exemplary embodiments can be implemented in various devices, systems, and methods of the presently disclosed systems, methods, and/or apparatuses.

Any benefits, advantages, or solutions to problems that are described herein with regard to specific embodiments are not intended to be construed as a critical, required, or essential feature(s) or element(s) of the presently disclosed systems, methods, and/or apparatuses or the claims.

BRIEF DESCRIPTION OF THE SEVERAL VIEWS OF THE DRAWINGS

As required, detailed exemplary embodiments of the presently disclosed systems, methods, and/or apparatuses are disclosed herein; however, it is to be understood that the disclosed embodiments are merely exemplary of the presently disclosed systems, methods, and/or apparatuses that may be embodied in various and alternative forms, within the scope of the presently disclosed systems, methods, and/or apparatuses. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the presently disclosed systems, methods, and/or apparatuses.

The exemplary embodiments of the presently disclosed systems, methods, and/or apparatuses will be described in detail, with reference to the following figures, wherein like reference numerals refer to like parts throughout the several views, and wherein:

FIG. 31 illustrates a front view of an exemplary variable range compensating device, according to the present disclosure;

FIG. 32 illustrates a rear view of an exemplary variable range compensating device, according to the present disclosure;

FIG. 33 illustrates a left side view of an exemplary variable range compensating device, according to the present disclosure;

FIG. 34 illustrates a right side view of an exemplary variable range compensating device, according to the present disclosure;

FIG. 35 illustrates a top view of an exemplary variable range compensating device, according to the present disclosure;

FIG. 36 illustrates a bottom view of an exemplary variable range compensating device, according to the present disclosure;

DETAILED DESCRIPTION OF EXEMPLARY EMBODIMENTS OF THE PRESENT DISCLOSURE

Figure 1:
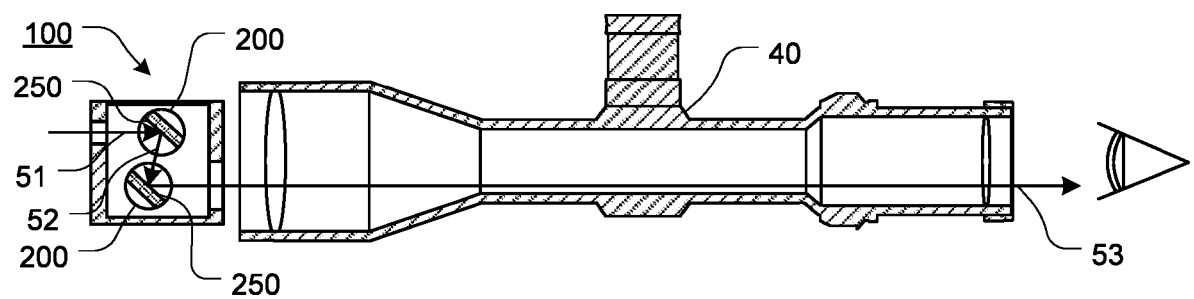
FIG. 1 illustrates an exemplary diagram of a variable range compensating device and system, according to the present disclosure.

For simplicity and clarification, the design factors and operating principles of the variable range compensating device according to the presently disclosed systems, methods, and/or apparatuses are explained with reference to various exemplary embodiments of variable range compensating device according to the presently disclosed systems, methods, and/or apparatuses. The basic explanation of the design factors and operating principles of the variable range compensating device is applicable for the understanding, design, and operation of the variable range compensating device of the presently disclosed systems, methods, and/or apparatuses. It should be appreciated that the variable range compensating device can be adapted to many applications where a variable range compensating device can be used.

As used herein, the word "may" is meant to convey a permissive sense (i.e., meaning "having the potential to"), rather than a mandatory sense meaning "must"). Unless stated otherwise, terms such as "first" and "second" are used to arbitrarily distinguish between the exemplary embodiments and/or elements such terms describe. Thus, these terms are not necessarily intended to indicate temporal or other prioritization of such exemplary embodiments and/or elements.

The term "coupled", as used herein, is defined as connected, although not necessarily directly, and not necessarily mechanically. The terms "a" and "an" are defined as one or more unless stated otherwise.

The term "exemplary" is used herein to mean "serving as an example, instance, or illustration". Any embodiment described herein as "exemplary" is not necessarily to be construed as preferred or advantageous over other embodiments. Likewise, the term "embodiment" does not require that all embodiments of the invention include the discussed feature, advantage, or mode of operation.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that the terms "variable range", "adjustable holder", "mirror", and "firearm" are used for basic explanation and understanding of the operation of the systems, methods, and apparatuses of the presently disclosed systems, methods, and/or apparatuses. Therefore, the terms "variable range", "adjustable holder", "mirror", and "firearm" are not to be construed as limiting the systems, methods, and apparatuses of the presently disclosed systems, methods, and/or apparatuses.

For simplicity and clarification, the variable range compensating device of the presently disclosed systems, methods, and/or apparatuses will be described as being used in conjunction with a firearm, such as a rifle or carbine. However, it should be appreciated that these are merely exemplary embodiments of the variable range compensating device and are not to be construed as limiting the presently disclosed systems, methods, and/or apparatuses. Thus, the variable range compensating device of the presently disclosed systems, methods, and/or apparatuses may be utilized in conjunction with any object or device.

Turning now to the appended drawing figures, FIGS. 1-24 illustrate certain elements and/or aspects of certain exemplary embodiments of the variable range compensating device, according to the presently disclosed systems, methods, and/or apparatuses.

As illustrated most clearly in FIGS. 3-11, the variable range compensating device 100 optionally comprises at least some of a housing 105 having an optical cavity 110 defined at least partially within the housing 105. The optical cavity 110 extends between an incoming image aperture 120 and an outgoing image aperture 130. It should be appreciated that the size, shape, and relative positioning of the incoming image aperture 120 and the outgoing image aperture 130, relative to the housing 105 and the optical cavity 110 are designed choices, based upon the desired appearance and/or functionality of the incoming image aperture 120 and the outgoing image aperture 130. Additionally, the size, shape, and/or relative positioning of the incoming image aperture 120 and the outgoing image aperture 130 may be chosen based upon the amount of desired light allowed to enter the incoming image aperture 120 and/or exit the outgoing image aperture 130.

In various exemplary, nonlimiting embodiments, a protective, magnifying, or light altering, other lens or shield may be provided, covering the incoming image aperture 120 and/or the outgoing image aperture 130.

Lens holder apertures 150 and 155 are formed on opposing sides of the housing 105. Generally, lens holder apertures 150 are larger in diameter than lens holder apertures 155. A diameter of lens holder apertures 150 is such that at least a portion of the first end portion 210 of an adjustable holder 200 may be rotationally fitted within the lens holder aperture 150. A diameter of lens holder apertures 155 is such that at least a portion of the second end portion 220 of an adjustable holder 200 may be rotationally fitted within the lens holder aperture 155.

As illustrated, a lens holder aperture 150 is aligned with a lens holder aperture 155, such that an adjustable holder 200 may be positioned such that the first end portion 210 is rotationally fitted within the lens holder aperture 150, while the second end portion 220 is rotationally fitted within the lens holder aperture 155. In this manner, each adjustable holder 200 is rotationally adjustable relative to the housing 105 and the optical cavity 110.

While not illustrated, in certain exemplary, nonlimiting embodiments, the housing 105 may optionally be a stand-alone unit directly adapted to attach, through various attachment mechanisms, as an accessory to a rifle, a mount, a rail, or an optic. In certain other exemplary, nonlimiting embodiments, the housing 105 may optionally be integrated into an optic, in front of the optical targeting device's reticle or aim point, so mirrors/lenses and holders can be swapped, exchanged, or adjusted. Thus, it should be appreciated the housing 105 may optionally be bolted to, hingedly connected, pinned to, or rotatably connected to a rail or attached to a scope or other optical targeting device. Therefore, it should be appreciated that the system and/or method for attachment of the housing 105 has nothing to do with the function of the variable range compensating device 100 as it is extremely forgiving for placement at distance from an optical targeting device and may be attached or coupled so as to touch the optical targeting device or may be positioned up to several feet from the optical targeting device. Additionally, the variable range compensating device 100 may optionally be positioned so as to be vertically or horizontally spaced apart from the optical targeting device.

The housing 105 may be constructed of a single element, multiple elements, including, for example, upper, lower, front, and/or back plates, or any combination thereof. Thus, the housing 105 may be formed of any element or combination of elements usable to maintain the adjustable holder(s) 200 and/or the mirrored or reflective surface(s) 250 in a desired position.

Thus, in various exemplary, nonlimiting embodiments, where the housing 105 is mounted to the same object, such as a firearm rail, as an optical targeting device 40, a support or attachment device may include a quick-release or connection component designed for use with that object or rail. In embodiments wherein the support or attachment device is secured directly to an optical targeting device 40, a frame or similar connection component may be used to secure the housing 105. In still other exemplary embodiments, the housing 105 may optionally be directly affixed to a connection component and there may be no need for a support or other attachment device. In certain of these exemplary embodiments, the housing 105 may optionally be capable of rotating or moving into and out of the line of sight of the mounted optical targeting device 40.

As illustrated most clearly in FIGS. 12-18, each adjustable holder 200 extends from a substantially circular first end portion 210, along a central, cradle portion 230, to a substantially circular second end portion 220. In various exemplary embodiments, the first end portion 210 has a greater outer diameter than an outer diameter of the second end portion 220 and the first end portion 210 is formed so as to be rotationally positioned within a lens holder aperture 150, while the second end portion 220 is formed so as to be rotationally positioned within a lens holder aperture 155.

The first end portion 210 and the second end portion 220 are aligned, such that the adjustable holder 200 is rotatable about a rotational axis 205.

The cradle portion 230 extends between the first end portion 210 and the second end portion 220. At least a portion of the cradle portion 230 includes a substantially planar surface. In certain exemplary embodiments, the reflective surface 250 or surfaces 250 is/are a mirrored or reflective surface element attached or coupled to the at least one adjustable holder 200. In various exemplary embodiments, the substantially planar surface is polished or coated so as to provide a mirror surface.

In various exemplary, nonlimiting embodiments, the reflective surface 250 of the adjustable holder 200 is a polished or coated portion of the adjustable holder 200. In certain alternative embodiments, the reflective surface 250 of the adjustable holder 200 optionally comprises a concave or convex surface or portion of the reflective surface 250.

Alternatively, a plane or other mirror or lens 255 is attached or coupled to a portion of the cradle portion 230. In certain exemplary embodiments, the mirror or lens 255 may comprise a magnifying mirror or lens. It should appreciated that the mirror and lens 255 may be any type of mirror and lens, such as, for example, glass, plastic, crystal, fused silica, sapphire, reflective or polished metals, silicon, or any other material hard durable surface.

In various exemplary embodiments, a recess or groove 212 and 222, is optionally formed around an outer perimeter of the first end portion 210 and the second end portion 220, respectively. If grooves 212 and/or 222 are included, and "O" ring 245 may be positioned within at least a portion of each respective groove. The inclusion of "O" rings 245 around the first end portion 210 and the second end portion 220 help to provide additional frictional engagement between the first end portion 210 and the lens holder aperture 150 and the second end portion 220 and the lens holder aperture 155.

In various exemplary embodiments, a groove, recess, or other engagement feature 215 is formed in or extends from at least a portion of the first end portion 210 and/or the second end portion 220. The engagement feature 215 provides for more positive engagement of the first end portion 210 or the second end portion 220, to facilitate rotational movement of each adjustable holder 200 relative to the housing 205. In various exemplary embodiments, as illustrated, the engagement feature 215 may comprise an elongate slot, which allows a user to insert a screwdriver, coin, or other element to aid in rotational movement of the adjustable holder 200 relative to the housing 205.

It should be appreciated that rotational movement of the adjustable holder 200, about the rotational axis 205, rotationally adjusts the angle or position of the reflective surface 250 (or a mirror or lens 255), within the optical cavity 210.

Portions of at least one, and potentially two or more adjustable holders 200, each comprising a reflective surface 250, or a mirror or lens 255, are rotatably positioned within the optical cavity 110.

Adjustment of the adjustable holders 200 adjusts the reflective surface 250 of each adjustable holder 200, within the optical cavity 110, such that an image entering the incoming image aperture 120 is reflected off of the reflective surface 250 of a first lens holder 200, onto the reflective surface 250 of a second lens holder 200, and through the outgoing image aperture 130, at a determined offset.

In various exemplary embodiments, various components of the variable range compensating device 100 are substantially rigid and are formed of steel. Alternate materials of construction of the various components of the variable range compensating device 100 may include one or more of the following: stainless steel, aluminum, titanium, polytetrafluoroethylene, and/or other metals, as well as various alloys and composites thereof, glass-hardened polymers, polymeric composites, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset materials, and/or various combinations of the foregoing. Thus, it should be understood that the material or materials used to form the various components of the variable range compensating device 100 is a design choice based on the desired appearance and functionality of the variable range compensating device 100.

It should be appreciated that certain elements of the variable range compensating device 100 may be formed as an integral unit. Alternatively, suitable materials can be used and sections or elements made independently and attached or coupled together, such as by adhesives, welding, screws, rivets, pins, or other fasteners, to form the various elements of the variable range compensating device 100.

It should also be understood that the overall size and shape of the variable range compensating device 100, and the various portions thereof, is a design choice based upon the desired functionality and/or appearance of the variable range compensating device 100.

Figure 2:
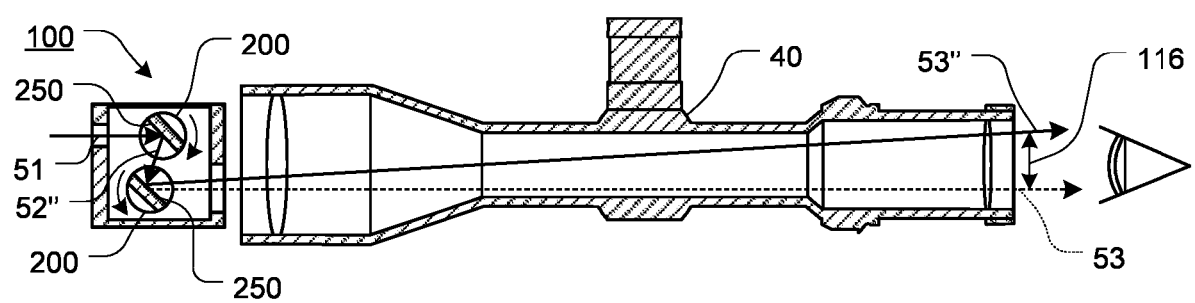
FIG. 2 illustrates an exemplary diagram of a variable range compensating device and system, according to the present disclosure.
Figure 3:
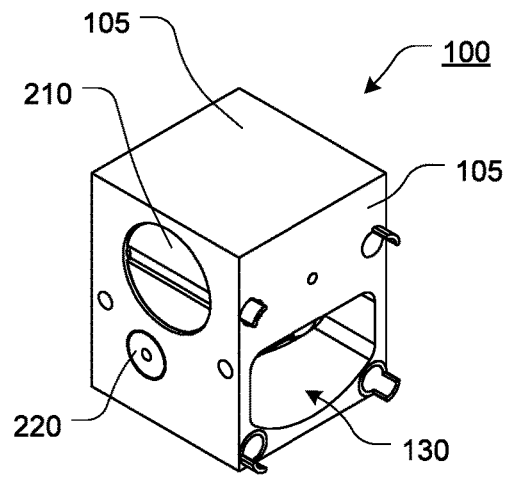
FIG. 3 illustrates an upper, left, rear, perspective view of an exemplary variable range compensating device, according to the present disclosure.
Figure 4:
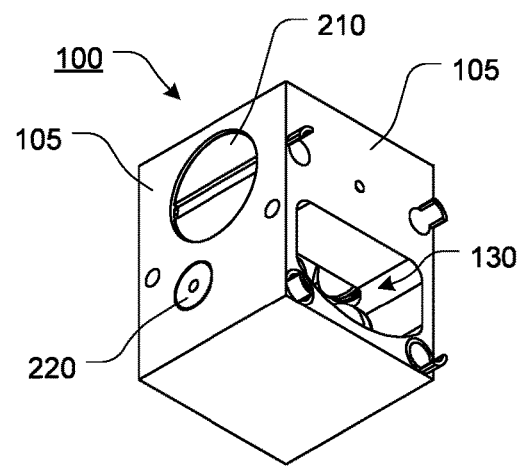
FIG. 4 illustrates a lower, left, rear, perspective view of an exemplary variable range compensating device, according to the present disclosure.
Figure 5:
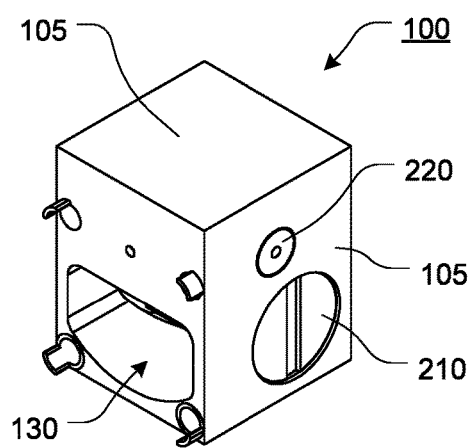
FIG. 5 illustrates an upper, right, rear, perspective view of an exemplary variable range compensating device, according to the present disclosure.
Figure 6:
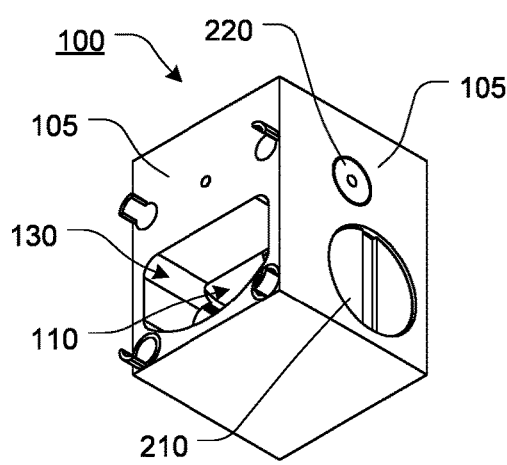
FIG. 6 illustrates a lower, right, rear, perspective view of an exemplary variable range compensating device, according to the present disclosure.
Figure 7:
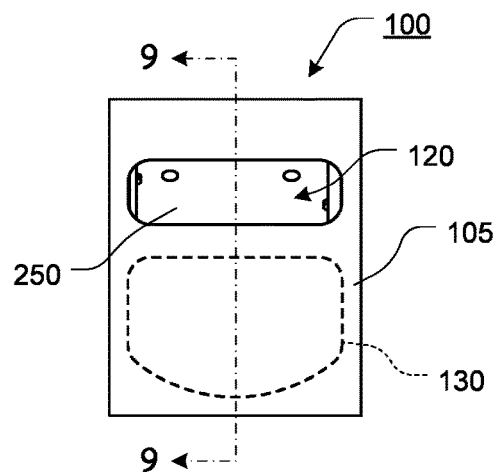
FIG. 7 illustrates a front view of an exemplary variable range compensating device, according to the present disclosure.
Figure 8:
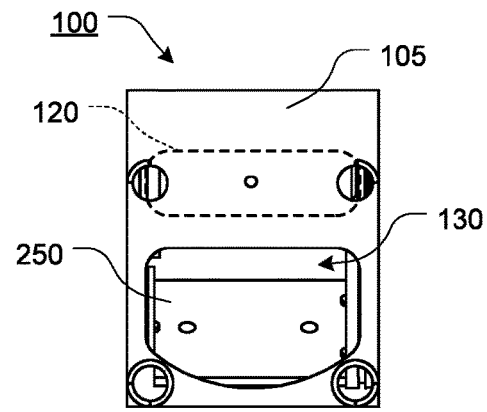
FIG. 8 illustrates a rear view of an exemplary variable range compensating device, according to the present disclosure.
Figure 9:
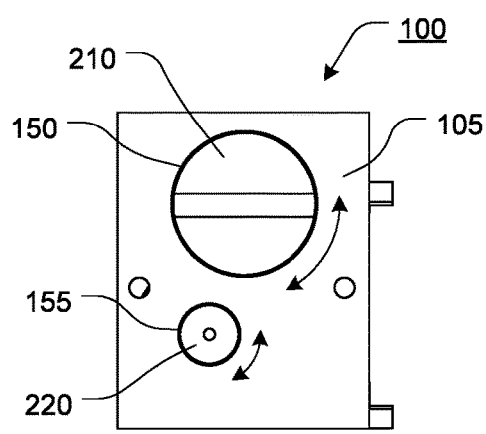
FIG. 9 illustrates a left side view of an exemplary variable range compensating device, according to the present disclosure.
Figure 10:
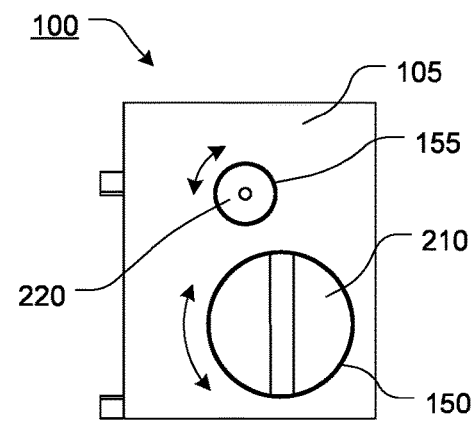
FIG. 10 illustrates a right side view of an exemplary variable range compensating device, according to the present disclosure.

FIGS. 1 and 2 illustrate an exemplary utilization of the variable range compensating device 100, according to the present disclosure. As illustrated, the variable range compensating device 100 is aligned with an optical component or optical targeting device 40. While not illustrated, it should be appreciated that variable range compensating device 100 and the optical targeting device 40 may be attached, coupled, or otherwise mounted to a firearm or other device (not illustrated), utilizing known attachment or mounting means and methods. It should also be appreciated that the optical targeting device 40 may be any visual aid, such as, for example, a rifle scope, night vision optic, ACOG, holographic device, red dot optic, laser, targeting device, iron sight, mechanical device, or other such device that is mounted on a weapon, such as a rifle, that can allow a user to more accurately acquire, view, range, and/or acquire a target. In certain exemplary embodiments, the optical targeting device 40 may be such that, by implementing the variable range compensating device 100 of the present disclosure, the effective range of the optical targeting device 40 may be substantially increased or decreased, for example, by about 200% or more.

The optical targeting device 40 described in the exemplary embodiments herein may be such that the optical targeting device 40 can add distance capabilities to or from any desired optical system and may be used or applied on or with respect to any shooting platform, or with respect to any rail, mounts, or attachment assembly. Further, the variable range compensating device 100 may be utilized without additional tools or without negatively impacting or adjusting existing optics.

The variable range compensating device 100 may be mounted to any platform or weapon in any desired or known fashion. Here, it may further be appreciated that variable range compensating device 100 may be a standalone device or may be associated with an existing aiming system or scope. The existing or optical targeting device may be any type of optic, for example a scope, a holographic sight, a "red dot", and the like.

In certain exemplary embodiments, systems, methods, and/or apparatuses of the present disclosure may be a mechanical, optical adjustment with kinetics. Optical adjustments may be made, for example, vertically and/or horizontally, or anywhere along an x-y axis, to a target image 5 before an optical targeting device or optical system, such as, for example, optical targeting device 40. The optical adjustment may effectively apply a second zero to an optical system.

In various exemplary embodiments, the variable range compensating device 100 of the present disclosure allows a target image's apparent position to be shifted, as viewed by a user. This creates a "second zero". This may also provide a user the ability to manage a greater range for target images, than provided by the optical targeting device 40, alone. The variable range compensating device 100 may be adjusted to change the apparent position of a target image before reaching the optical targeting device 40, by changing an incoming target image's optical path within a mirror or lens assembly. The apparent position change may take place on either, or both of, x and y axes.

In certain exemplary embodiments, rotational adjustment of the adjustable holders 200 (resulting in relative adjustment of the reflective surfaces 250 or mirrors or lenses 255 within the optical cavity 210) alters an apparent position of a target image, creating the second zero by internal or external reflection. The variable range compensating device 100 may be employed in visible spectrum optics, low light level devices (night optics), filtration, and other enhanced image devices. The variable range compensating device 100 may compensate for various velocity components of ammunition or projectiles, such as subsonic, round and/or barrel changes, atmosphere, elevation and any other ballistic compensation that may affect the vertical adjustment of an optical targeting device 40, as will be understood by a person having ordinary skill in the art.

In various exemplary embodiments, the variable range compensating device 100 creates a greater and/or more precise operating range that could be applied to a larger variety of optical targeting devices 40. The variable range compensating device 100 can further be applied in layers and/or steps that allow for stepped optical shift changes (i.e. vertically and/or horizontally). For example, the variable range compensating device 100 may be adjusted to provide small variations, as desired by a user, to improve sighting or targeting. Such adjustments may allow for the adjusting of the zero of a rifle or reticle in any horizontal (x) or vertical (y) direction, or any combination thereof. It may further be appreciated that the zero of a rifle or optical system can be adjusted in any desired various increments by changing the tilt/slant/angle or elevation of the mirrors and lenses in the exemplary embodiments described herein.

Such additions or subtractions may be made manually or automatically. For example, a user may optionally be able to utilize the variable range compensating device 100 as purchased, or use a machined key, turret, or fully electronic and ballistically driven assembly to create adjustable secondary zeroes.

Figure 24:
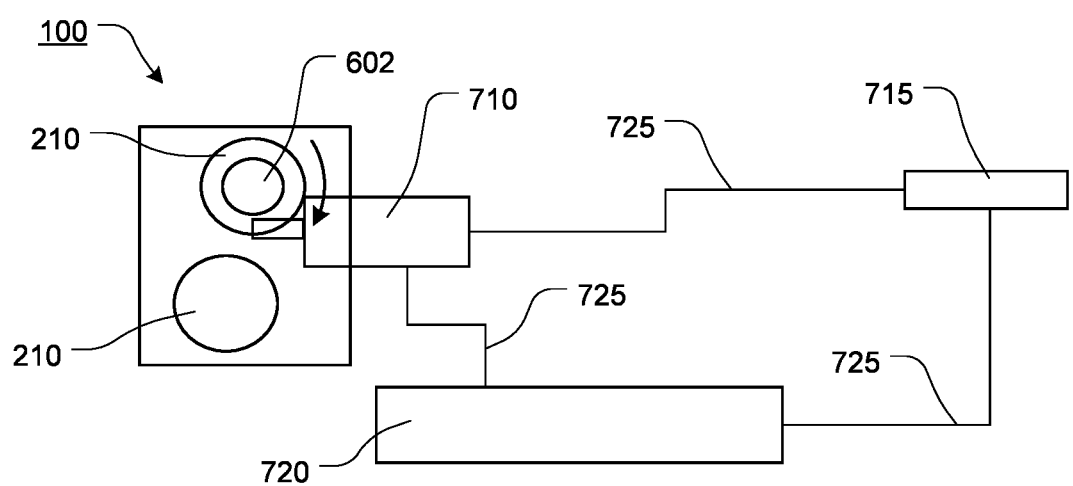
FIG. 24 illustrates another exemplary diagram of components of a variable range compensating device and system, according to the present disclosure.
Figure 25:
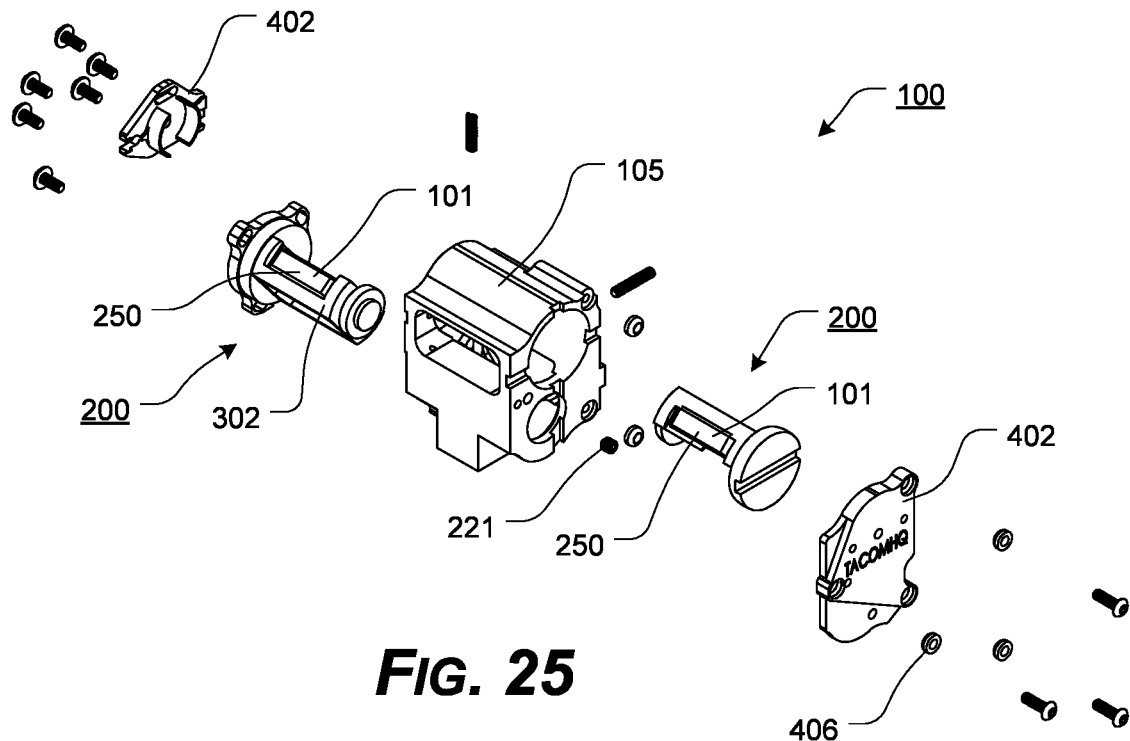
FIG. 25 illustrates an upper, left, front, perspective view of an exemplary variable range compensating device, according to the present disclosure.
Figure 26:
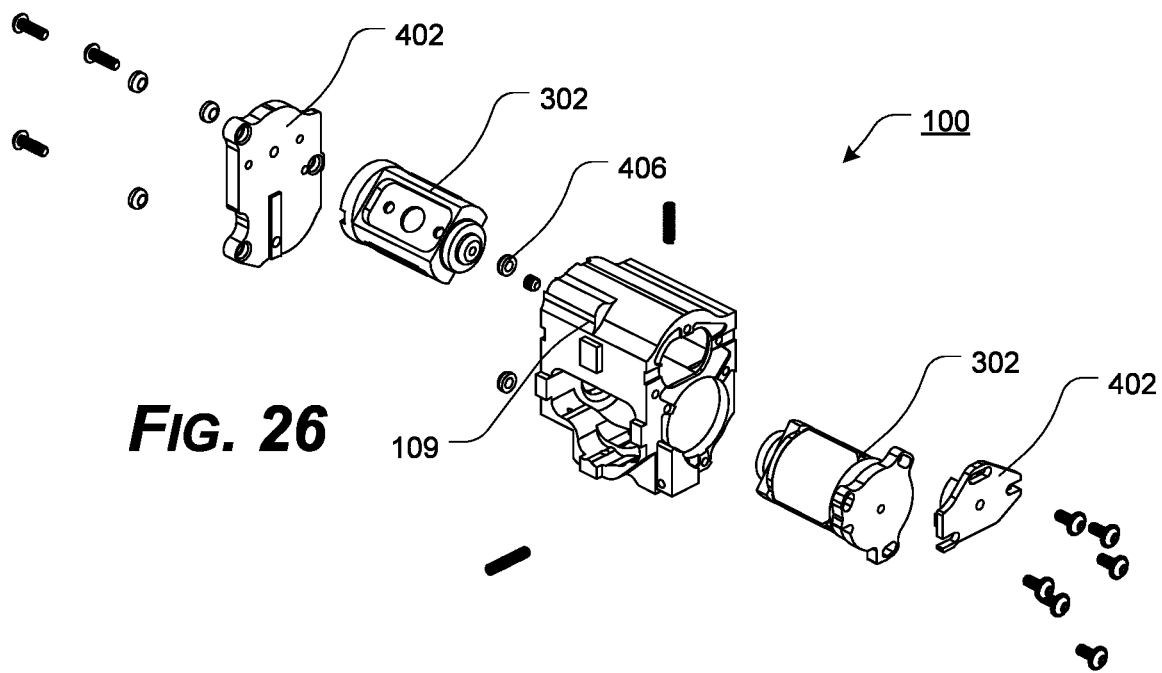
FIG. 26 illustrates an upper, right, rear, perspective view of an exemplary variable range compensating device, according to the present disclosure.
Figure 27:
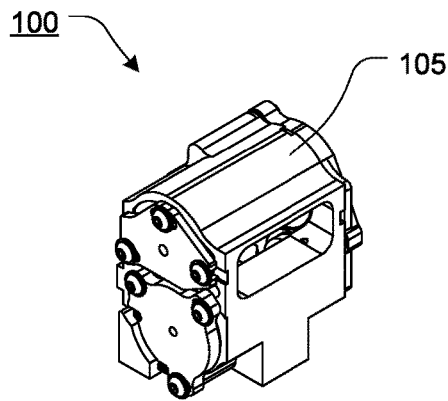
FIG. 27 illustrates an upper, right, front, perspective view of an exemplary variable range compensating device, according to the present disclosure.
Figure 28:
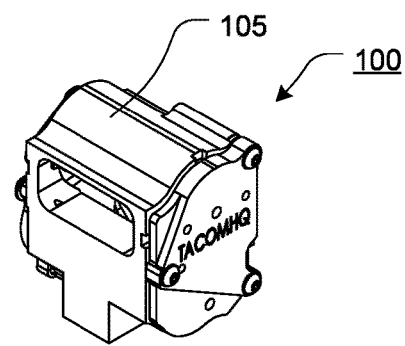
FIG. 28 illustrates an upper, left, front, perspective view of an exemplary variable range compensating device, according to the present disclosure.
Figure 29:
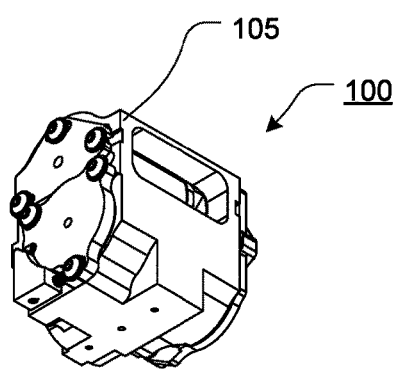
FIG. 29 illustrates a lower, right, front, perspective view of an exemplary variable range compensating device, according to the present disclosure.
Figure 30:
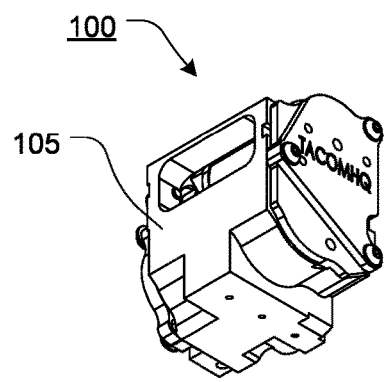
FIG. 30 illustrates a lower, left, front, perspective view of an exemplary variable range compensating device, according to the present disclosure.

In various exemplary embodiments, as illustrated most clearly in FIG. 24, a fully electronic and ballistically driven variable range compensating device 100 may constantly adjust the incoming image position according to range so that the appearance of a target image may be matched to the ballistics of a specific round or bullet.

As illustrated in FIG. 1, the variable range compensating device 100 is positioned ahead of and relative to an optical targeting device 40. As illustrated, the adjustable holders 200 are adjusted, as further illustrated in FIG. 11A, such that a target image is presented through the variable range compensating device 100 and the optical targeting device 40, to eye/receptor 10, in a standard or first zero position. In the first zero position, the target image is originally presented, through the incoming image aperture 120, along incoming light path 51. As the original target image passes into the optical cavity 110, the target image contacts the reflective surface 250 (or mirror or lens 255) of the first adjustable holder 200. The target image is then reflected by the reflective surface 250 (or mirror or lens 255) of the first adjustable holder 200 to the reflective surface 250 (or mirror or lens 255) of the second adjustable holder 200, along internal light path 52.

As the target image contacts the reflective surface 250 (or mirror or lens 255) of the second adjustable holder 200, the target image is reflected by the reflective surface 250 (or mirror or lens 255) of the second adjustable holder 200, through the outgoing image aperture 130, to the optical targeting device 40, along outgoing light path 53. The target image is then passed through the optical targeting device 40, along outgoing light path 53, to the eye/receptor 10.

In this manner, the target image is presented, along outgoing light path 53, to the eye/receptor 10 at a first zero.

Figure 11A:
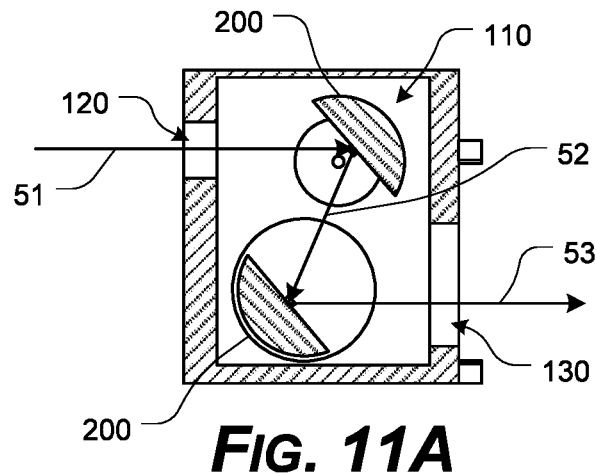
FIG. 11A illustrates a left side, cross-sectional view, taken along line 9-9 of FIG. 7, of an exemplary variable range compensating device, wherein a target image is presented, along a light path, to an eye/receptor, at an original or first zero, according to the present disclosure.
Figure 11B:
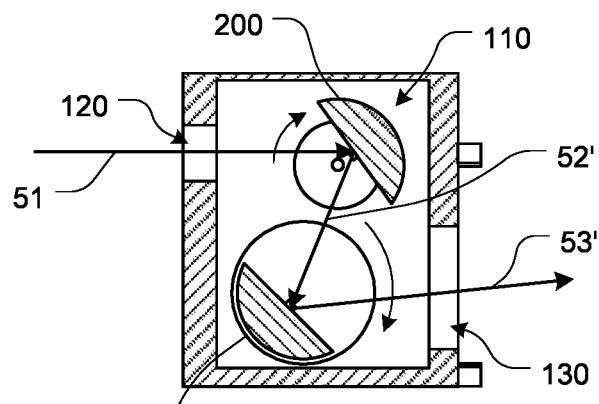
FIG. 11B illustrates a left side, cross-sectional view of an exemplary variable range compensating device, wherein a target image is presented, along a light path, to an eye/receptor, between a first zero and a second zero, according to the present disclosure.

As illustrated in FIG. 11B, the first adjustable holder 200 and the second adjustable holder 200 are each rotated clockwise. As a result of the clockwise rotation of one or both of the first adjustable holder 200 and the second adjustable holder 200, the relative angle of the reflective surface 250 (or mirror or lens 255) of the first adjustable holder 200 relative to the reflective surface 250 (or mirror or lens 255) of the second adjustable holder 200 is altered. Thus, while the target image continues to be presented through the incoming image aperture 120, along incoming light path 51, the target image contacts the reflective surface 250 (or mirror or lens 255) of the first adjustable holder 200. The target image is then reflected by the reflective surface 250 (or mirror or lens 255) of the first adjustable holder 200 to the reflective surface 250 (or mirror or lens 255) of the second adjustable holder 200, along an altered internal light path 52'.

As the target image continues along altered internal light path 52' the target image contacts the reflective surface 250 (or mirror or lens 255) of the second adjustable holder 200 and is reflected by the reflective surface 250 (or mirror or lens 255) of the second adjustable holder 200, through the outgoing image aperture 130, along an altered outgoing light path 53', to the optical targeting device 40. The target image is then passed through the optical targeting device 40, along altered outgoing light path 53', to the eye/receptor 10.

In this manner, the target image is presented, along altered outgoing light path 53', to the eye/receptor 10 between a first zero and a second zero. The offset outgoing light path 53' is offset from the outgoing light path 53 by a distance 116.

Thus, the first zero represents a range where a projectile hits a target image when an aiming point through the optical targeting device 40 aligns with the target image, and wherein the second zero represents a range where a projectile hits a target image when an aiming point through the optical targeting device 40 aligns with the target image shifted by the optical adjustment device.

Figure 11C:
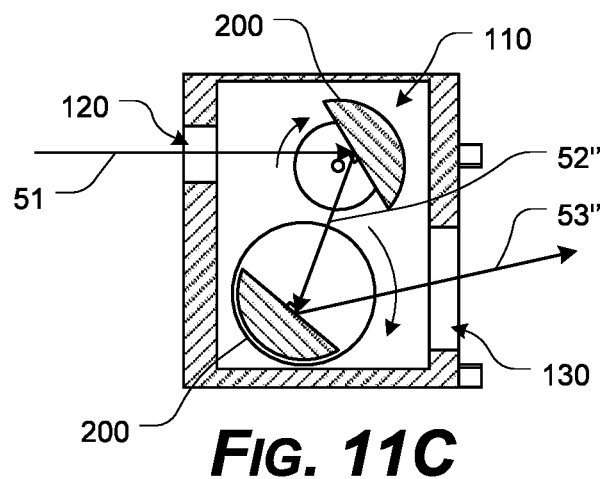
FIG. 11C illustrates a left side, cross-sectional view of an exemplary variable range compensating device, wherein a target image is presented, along a light path, to an eye/receptor, at a second zero, according to the present disclosure.
Figure 12:
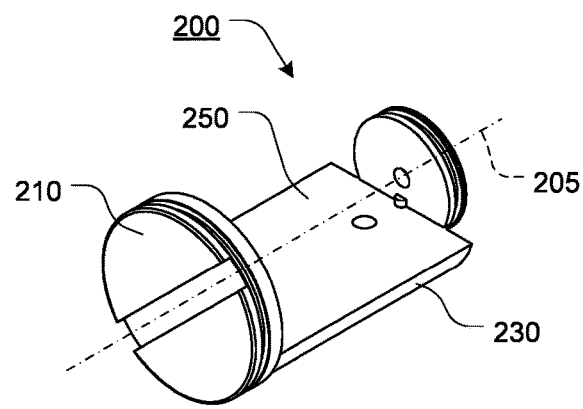
FIG. 12 illustrates an upper, left, rear, perspective view of an exemplary adjustable holder, according to the present disclosure.
Figure 13:
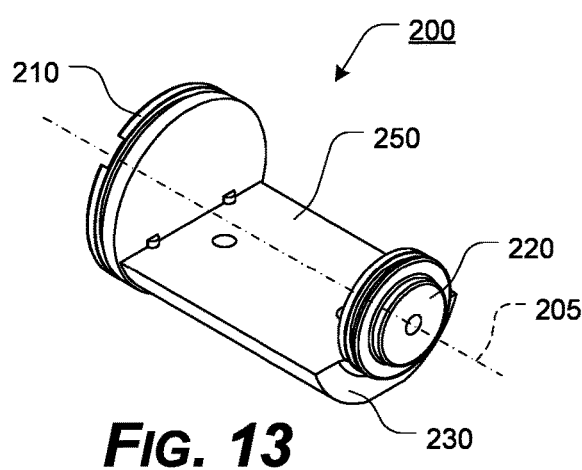
FIG. 13 illustrates an upper, right, rear, perspective view of an exemplary adjustable holder, according to the present disclosure.
Figure 14:
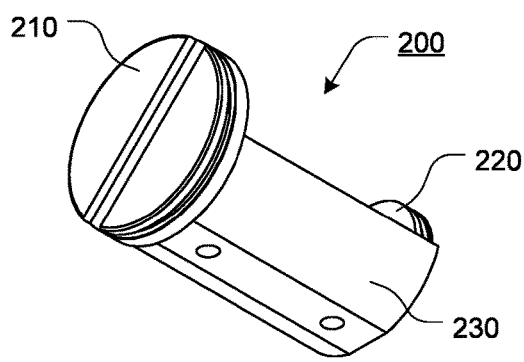
FIG. 14 illustrates a lower, left, rear, perspective view of an exemplary adjustable holder, according to the present disclosure.
Figure 15:
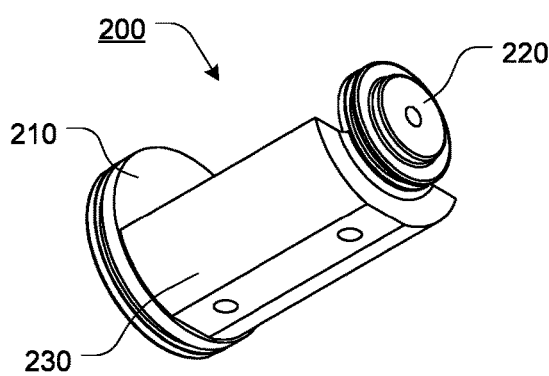
FIG. 15 illustrates a lower, right, rear, perspective view of an exemplary adjustable holder, according to the present disclosure.
Figure 16:
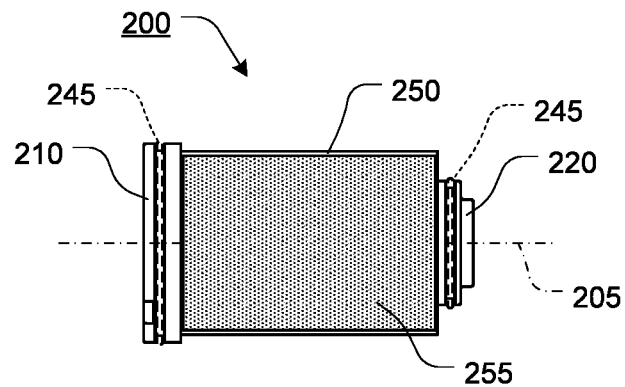
FIG. 16 illustrates a top view of an exemplary adjustable holder, according to the present disclosure.
Figure 17:
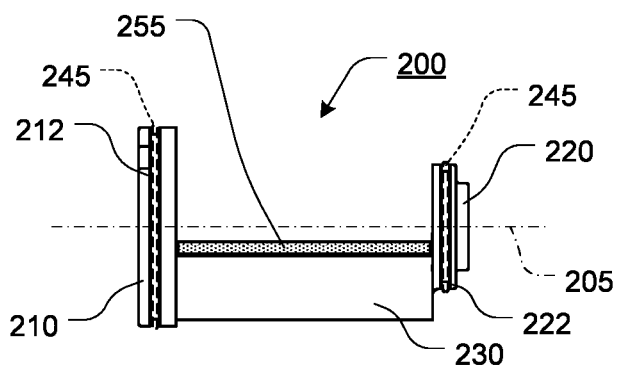
FIG. 17 illustrates a rear view of an exemplary adjustable holder, according to the present disclosure.
Figure 18:
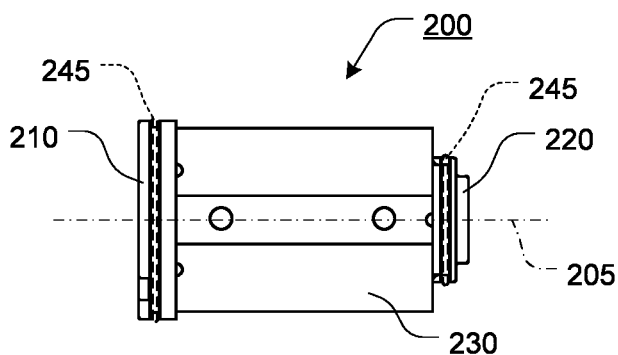
FIG. 18 illustrates a bottom view of an exemplary adjustable holder, according to the present disclosure.

As illustrated in FIG. 11C, the first adjustable holder 200 and the second adjustable holder 200 are each rotated further clockwise, as compared to the rotational positions illustrated in FIG. 11B.

As a result of the further clockwise rotation of one or both of the first adjustable holder 200 and the second adjustable holder 200, the relative angle of the reflective surface 250 (or mirror or lens 255) of the first adjustable holder 200 relative to the reflective surface 250 (or mirror or lens 255) of the second adjustable holder 200 is further altered. Thus, as illustrated in FIGS. 2 and 11C, while the target image continues to be presented through the incoming image aperture 120, along incoming light path 51, the target image contacts the reflective surface 250 (or mirror or lens 255) of the first adjustable holder 200. The target image is then reflected by the reflective surface 250 (or mirror or lens 255) of the first adjustable holder 200 to the reflective surface 250 (or mirror or lens 255) of the second adjustable holder 200, along a further altered internal light path 52".

As the target image continues along further altered internal light path 52" the target image contacts the reflective surface 250 (or mirror or lens 255) of the second adjustable holder 200 and is reflected by the reflective surface 250 (or mirror or lens 255) of the second adjustable holder 200, through the outgoing image aperture 130, along a further altered outgoing light path 53", to the optical targeting device 40. The target image is then passed through the optical targeting device 40, along further altered outgoing light path 53", to the eye/receptor 10.

In this manner, the target image is presented, along further altered outgoing light path 53", to the eye/receptor 10 at a first zero. The further altered outgoing light path 53" is offset from the outgoing light path 53 by a distance 116.

Thus, in order to shift the target image from a first zero to a second zero, the relative rotational position of one or both of the first adjustable holder 200 (and, in turn, the reflective surface 250 or mirror or lens 255 of the first adjustable holder 200) and/or the second adjustable holder 200 (and, in turn, the reflective surface 250 or mirror or lens 255 of the second adjustable holder 200) is adjusted. It should be appreciated that the degree of the relative rotational adjustment of the first adjustable holder 200 relative to the second adjustable holder 200 will result in the final light path of the image projected from the outgoing image aperture 130.

One or both of the adjustable holders 200 (and, in turn, the respective reflective surfaces 250 or mirror or lens 255) may optionally be adjusted to pass a new, second zero thru optical targeting device 40. A new second zero is produced and received by the eye/receptor 10. The difference in the target image position, between the first zero and second zero, as detected by the eye/receptor 10 is the required change that must be applied to optical targeting device 40. Changing the position of the optical targeting device 40 will require a shift in the platform the optical targeting device 40 is mounted to. This will create a new second zero.

The variable range compensating device 100 allows a user to shift the firearm, device, or other platform to which optical targeting device 40 is attached or coupled in order to realign to a desired aiming point. In various exemplary embodiments, locks 109 may optionally be provided to secure the first adjustable holder 200 and/or the second adjustable holder 200 such that the desired target image position (i.e., the relative rotational positions producing the adjusted second zero) may be maintained. In various exemplary, nonlimiting embodiments, the locks 109 comprise covers, attached or coupled to portions of the housing 105, covering the first adjustable holder 200 and/or the second adjustable holder 200.

Figure 19:
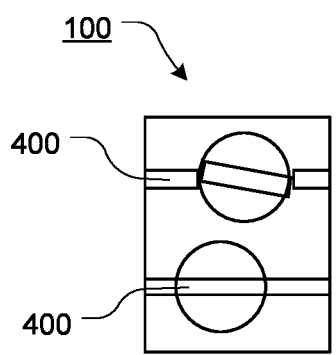
FIG. 19 illustrates an exemplary diagram of a variable range compensating device and system, according to the present disclosure.
Figure 20:
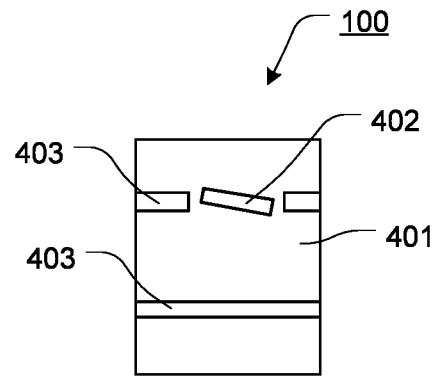
FIG. 20 illustrates an exemplary diagram of a variable range compensating device and system, according to the present disclosure.
Figure 21:
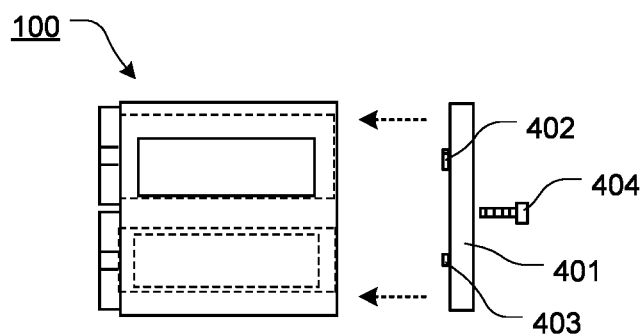
FIG. 21 illustrates an exemplary diagram of a variable range compensating device and system, according to the present disclosure.

In various exemplary, nonlimiting embodiments, as illustrated in FIGS. 19-21, the variable range compensating device 100 may use keyway reference points or detents 400, 401, 402, and 403, to establish reference positions for the adjustable holders 200 and reference positions when a predetermined rotational adjustment or any solution or combination thereof may be repeated or further utilized. In various exemplary embodiments, a known key 403 (optionally attached to the housing 105 via one or more fasteners 404) or one or more corresponding detents can be used to set and establish the relative rotational position of the first adjustable holder 200 and/or the second adjustable holder 200. The variable range compensating device 100 may then be used to shift an apparent second zero of a viewed target image or scene.

Figure 22:
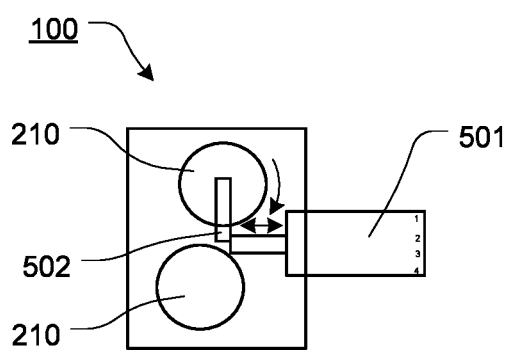
FIG. 22 illustrates an exemplary diagram of a variable range compensating device and system, according to the present disclosure.

As illustrated in FIG. 22, the variable range compensating device 100 may be mounted to any platform or weapon in any desired or known fashion. In various exemplary, nonlimiting embodiments, the variable range compensating device 100 may be a standalone device or may be associated with an optical targeting device 40. Additionally, variable range compensating device 100 and its contained adjustable holders 200 may be actuated in a manual or automatic manner. In various exemplary embodiments, a turret 501, positioned substantially perpendicular to the reflective surfaces 250 or the mirrors or lenses 255, includes one or more linkages or mechanisms 502, such that as the turret is rotated, the linkages or mechanisms 502 produce rotational movement of the adjustable holders 200. The variable range compensating device 100 may then be used to shift an apparent second zero of a viewed target image or scene.

Figure 23:
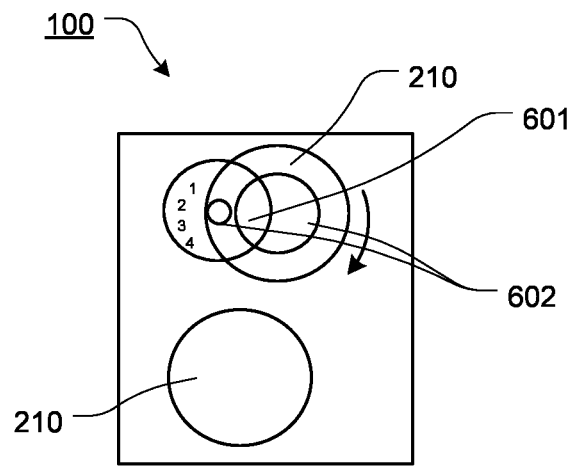
FIG. 23 illustrates another exemplary diagram of components of a variable range compensating device and system, according to the present disclosure.

In various exemplary embodiments, as illustrated in FIG. 23, the variable range compensating device 100 may optionally include a turret 601, positioned substantially perpendicular to one or more of the adjustable holders 200 (and, in turn, the respective reflective surfaces 250 or mirror or lens 255), using one or more linkages/mechanisms 602. The variable range compensating device 100 may then be used to shift an apparent second zero of a viewed target image or scene.

In exemplary FIG. 24, the variable range compensating device 100 may optionally be actuated in a manual or automatic manner. In certain exemplary embodiments, a drive motor or device 710 interacts with one or more of the adjustable holders 200, such that when the drive motor or device 710 is actuated, actuation of the drive motor or device 710 produces rotational adjustment of one or more of the adjustable holders 200.

As illustrated, feedback or information may be obtained from one or more of a rangefinder device 720 and/or a ballistic computer or calculator 715 and provided to the drive motor or device 710, via a wired or wireless connection 725, so as to produce automated rotational adjustment of one or more of the adjustable holders 200.

By utilizing feedback or information from a rangefinder 720 and/or ballistic computer or calculator 715 (or the like) to actuate the drive motor device 710, a target image may be produced from the outgoing image aperture 130 that is shifted to a desired second zero. It may be further appreciated that these mechanisms can be configured in several methods. The output target image may be determined and situated based on information obtained from an eye/receptor 10, information interpreted by a user, and/or data collected from the ballistic computer 715.

Thus, as information is gathered, calculated, or updated by the rangefinder 720 and/or the ballistic computer or calculator 715, one or more of the adjustable holders 200 can be rotationally adjusted, via the drive motor device 710 to alter the presented position of a target image.

In one exemplary, nonlimiting embodiment, a variable range compensating device 100 may be utilized in conjunction with an optical targeting device 40, such as, for example, a 4-25× rifle scope. It should be appreciated, however, that other variations may be utilized or implemented. In this example, the rifle scope may have an adjustment capability of about 30 MIL of angle. It may further be appreciated that although Milradian (MIL) may be used in exemplary embodiments herein, the same principles, devices, methods and techniques may be used with respect to Minute of Angle (MOA) and they may be adjusted in any desired increments, for example 20 MIL, 25 MIL, 150 MIL, and so forth.

I know what to According to the present example, different sight-in techniques may be utilized. For example, a 100 yard zero may be obtained and the elevation turrets of the rifle scope may be utilized to their standard limits of 30 MIL. In this example, the 30 MIL may allow a 2200 m (m=meter) shot with a typical high performance round.

Utilizing the variable range compensating device 100, a 30 MIL, or adjustable, additional range may be added. Thus, in the present example, accurate sighting could be made for up to about a 3,000 yd (yd=yard) shot using desired ammunition, such as 0.338 Lapua. Then, implementing the variable range compensating device 100, with 40 MIL, 60 MIL, or more MILs may be added to meet and exceed all known high performance known rounds existing today may be realized. It may also be appreciated that such MIL adjustments (as well as zero adjustments) may be made instantly and accurately without any turret adjustment to the optical targeting device 40.

In another exemplary embodiment, a 4-27× rifle scope with 120 MOA turret travel mounted with 80 MOA on a rail allowing a 1100 yd sight-in may be utilized. In this embodiment, with the variable range compensating device 100, −25 MOA, or adjustable, allowing for a second zero of 50 yds. The rifle scope or similar optical targeting device 40 may now be used to more accurately engage targets at shorter ranges and provide a user with a greater range capability. It may be appreciated that such zero adjustments may be made instantly and accurately without any adjustment to the optical targeting device 40.

In another exemplary embodiment, using an AR-15 rifle platform, or the like, the rifle may be set up for close quarters combat using an EOTech, red dot, ACOG, holographic, or low power rifle scope without longer range capabilities. However, adding the variable range compensating device 100 can allow for the near instantaneous and fast application of an about, or adjustable, 400 yd second zero in elevation. For example, by adding a lens (or other optic device) that shifts a 400 yd target's image to a height constant that may be unique to a round's ballistics, when a user raises the AR-15 (or other rifle platform, as desired) to reacquire an adjusted target image in the reticle, the target image will be automatically adjusted and compensated for that round's ballistics at 400 yds. The EOTech or similar optical targeting device 40 may now be used to more accurately engage targets at longer ranges and provide a user with a greater range capability. This can be done without any guessing, calculation, or adjustment by the user as would be understood by a person having ordinary skill in the art. It should be appreciated that such zero adjustments may be made instantly and accurately without any adjustment to the optical targeting device 40.

In another exemplary embodiment, for example using an AR-10/15 rifle platform, or the like, the rifle may be set up for a continuously variable ranging system being fed by its own ballistic device or a group controlling ballistic device.

In yet another exemplary embodiment, a hunter may use a 3-9× rifle scope having a first zero at 100 yds. With the utilization of the variable range compensating device 100, a second zero may be created at, or adjustable, 310 yds. The creation of the second zero allows a shooter to aim without having to compensate or hold the reticle or dot on or above the target. The shooter can instead place the reticle or dot directly on point of aim. The second zero concept may be adjusted multiple times, which may allow a shooter multiple direct holds on their target. The compensation may be applied in MOA/MIL specific shifts, round/ballistic shifts, point-blank range applications, kill zones, target zones and other incremented applications as would be understood by a person having ordinary skill in the art.

The above weapons, scopes, magnifications, ranges, and adjustments by the optical magnification device in the above applications are for exemplary purposes and it may be understood by a person having ordinary skill in the art that a variety of weapons, scopes, magnifications, ranges, and adjustments may be utilized and achieved.

Figure 37A:
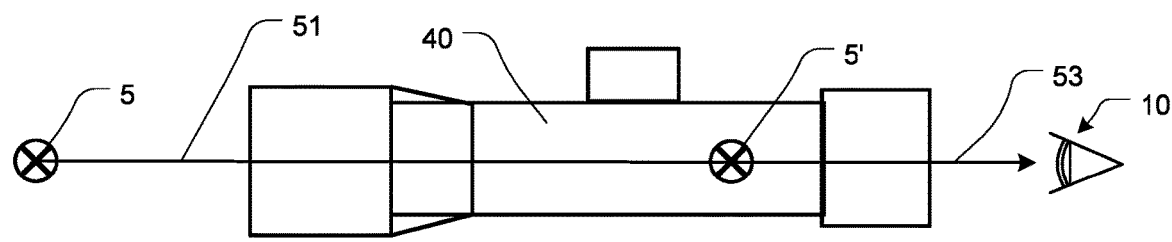
FIG. 37A illustrates an exemplary embodiment of the variable range compensating device, according to the present disclosure.
Figure 37B:
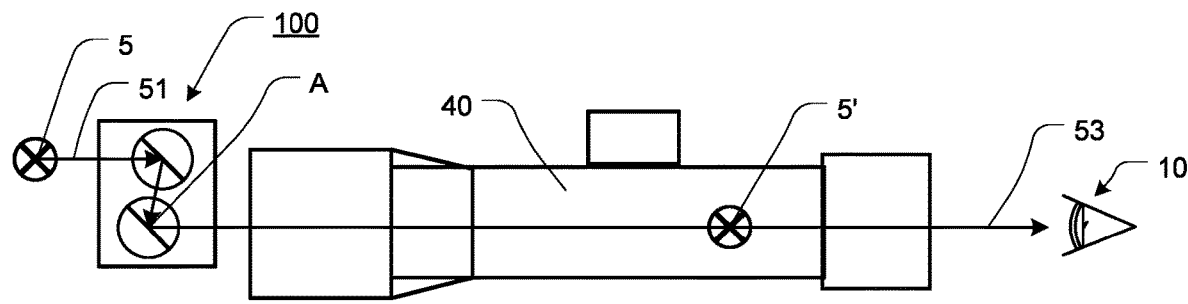
FIG. 37B illustrates an exemplary embodiment of the variable range compensating device, according to the present disclosure.
Figure 37C:
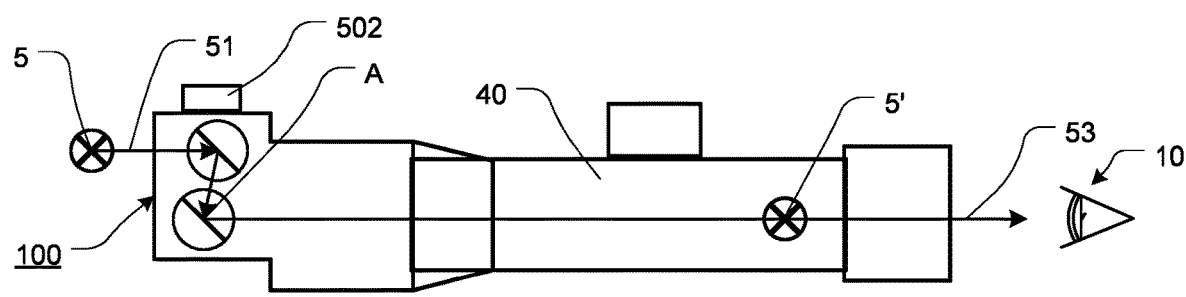
FIG. 37C illustrates an exemplary embodiment of the variable range compensating device, according to the present disclosure.

Referring generally to FIGS. 37A-37C, exemplary embodiments of the variable range compensating device 100 is mounted on a weapon (not shown), such as a rifle, that can allow a user to more accurately acquire, view, range, and shoot targets. An optical targeting device 40 may be such that, by implementing further components, its effective range may be substantially increased or decreased, for example about 200 % or more. The variable range compensating device 100 described in exemplary embodiments herein may be such that it can add distance capabilities to or from any desired optical system and may be used or applied on or with respect to any shooting platform, or with respect to any rail, mounts, or attachment assembly. Further the variable range compensating device 100 may be utilized without additional tools or without negatively impacting or adjusting an optical targeting device 40.

In one exemplary embodiment, and generally referring to the figures, a method, system, and apparatus for adjusting a targeting optic may be described. The method, system, and apparatus may be a mechanical, optical adjustment with kinetics. Optical adjustments may be made, for example, vertically and/or horizontally, or anywhere along an x-y axis, to a target image 5 before an optical targeting device 40 or optical system. The optical adjustment may effectively apply a second zero to an optical system.

The variable range compensating device 100 allows a target's apparent position to be shifted, for example as viewed by a user or operator. This may create a second zero. This may also provide an operator the ability to manage a greater range for targets, than provided by the optical targeting device 40 or optical system alone. The variable range compensating device 100 may change the apparent position of a target before reaching an optical targeting device 40, ACOG, or the like, by changing an incoming image's optical path within a mirror or lens assembly. The apparent position change may take place on either, or both of, x and y axes. It may be appreciated that the variable range compensating device 100 may be a standalone unit directly adapted to attach through various attachment mechanisms as an accessory to the rifle, mounts, rails, or optics. It may also be appreciated the variable range compensating device 100 may be integrated into an optical targeting device 40 (as illustrated in FIG. 37C), in front of the reticle or aim point of the optical targeting device 40 (as illustrated in FIG. 37B), so mirrors/lenses and holders can be swapped, exchanged, or adjusted. It should appreciated that the mirror and lens may be any type of mirror and lens, for example glass, plastic, crystal, fused silica, sapphire, reflective or polished metals, silicon or any other material hard durable surface. In another exemplary embodiment, the mirror and or lens assembly may be able to change an apparent position of an image, or second zero, by internal or external reflection.

The variable range compensating device 100 may be employed in visible spectrum optics, low light level devices (night optics), filtration, and other enhanced image devices. The variable range compensating device 100 may be capable of compensating for various velocity components of ammunition or projectiles, such as subsonic, round and/or barrel changes, atmosphere, elevation and any other ballistic compensation that may affect the vertical adjustment of an optical device, as would be understood by a person having ordinary skill in the art.

Using the variable range compensating device 100 may create a greater and/or more precise operating range that could be applied to a larger variety of optical targeting devices 40. Such optical targeting device 40 can include, but are not limited to, scopes, night vision optics, ACOGs, holographic devices, red dots, lasers, targeting devices, iron sights, mechanical devices, and the like. The variable range compensating device 100 can further be applied in layers and/or steps that can allow for stepped optical shift changes (i.e. vertically and/or horizontally). For example, the variable range compensating device 100 may be adjusted to provide small variations, as desired by a user, to improve sighting or targeting. Such adjustments may allow for the adjusting of the zero of a rifle or reticle in any horizontal (x) or vertical (y) direction, or any combination thereof. It may further be appreciated that the zero of a rifle or optical system can be adjusted in any desired various increments by changing the tilt/slant/angle or elevation of the mirrors and lenses in the exemplary embodiments described herein. Such additions or subtractions may be made manually or automatically. For example, some exemplary embodiments may allow a person to use the variable range compensating device 100 as purchased, or use a machined key, turret, or fully electronic and ballistically driven assembly to create adjustable secondary zeroes.

It may be further appreciated a fully electronic and ballistically driven device may constantly adjust the incoming image position according to range so that it may be matched to the ballistics of a specific round or bullet. For example, some exemplary embodiments may allow for a user to add, remove, or adjust mirrors/lenses from an optical targeting device 40; still other exemplary embodiments may allow devices with different mirrors/lenses and/or capabilities to be easily swapped or replaced.

Referring now to exemplary FIGS. 37A-37C, an embodiment of the variable range compensating device 100 is illustrated. In this example, as initially illustrated in FIG. 37A, a target image 5 is created in an image in its standard position 112 before entering an optical targeting device 40, such as a scope, reticle, or the like, or any other aiming device. Here, an original object image may be in position 112 is shown passing through optical targeting device 40, with the reticle/reference 5' lined up with object 112 and the eye/receptor 10.

Further it may be appreciated that the variable range compensating device 100 can be fully integrated into a new singular optic 1001 (as illustrated in FIG. 37C). The integration of the variable range compensating device 100 into optical targeting device 40 could potentially reduce the overall package size while improving the operating range of any optical targeting device 40. Application of the variable range compensating device 100 will allow the use of a second turret 502 which would have multiple benefits to existing optics. Specifically, the main turret found on existing optics can be produced with less adjustment requirements, reduced fine incrementation (clicks), reduced extended range confusion as used by the shooter (click count or place in rotation).

Applying the variable range compensating device 100 with a corresponding reticle/reference 5' that has a grid like measuring structure would allow the introduction of a limited range turret drastically improving the speed and overall precision of the optical targeting device 40. In short implementation of the variable range compensating device 100 into current optics could produce a unit with 2× the operational range with 1/30th the required adjustments.

Referring now to exemplary FIGS. 38A-38D, an embodiment of the variable range compensating device 100 is illustrated. In this example the variable range compensating device 100 is applied. In this example, the target image 5 shown in an image in its standard position 112 before entering an optical targeting device 40, such as a scope with an aiming reticle/reference 5', or the like, or any other aiming device. The mirror assembly is shown in a 210 with a position of A. The position of mirror 210 in position a shows object 112 arriving at reticle/reference 5' and the eye/receptor 10 at its original position.

FIGS. 38A-38D further illustrate the shifted object image and the creation of a new aiming point. Mirror assembly 100 and or 101 can be adjusted creating a new mirror position 211. The new position/angle is shown at B. The new object ray 53" is now shifted as compared to reticle/reference 5'. Passing thru optical targeting device 40 a new second zero image position 54 is produced and received by the eye/receptor 10. The difference in the image position 54 as detected by the eye/receptor 10, as compared to the reticle/reference 5', will require a change in position of the bore 800 in order to realign the distant target image 5 and the reticle/reference 5', which must be applied to the optical targeting device 40. An exemplary rifle bore 800 is shown at its normal position when the target image 5, optical targeting device 40, reticle/reference 5', and the eye/receptor 10 when are in line. Changing the position of optical targeting device 40 to realign the image 53" and the eye/receptor 10 will require a shift in the platform the optics is mounted to which creates a new impact point. This will create a new second zero position.

Figure 38A:
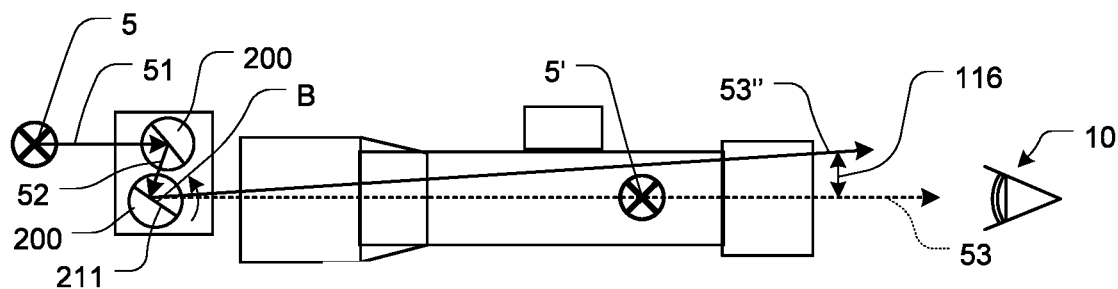
FIG. 38A illustrates an exemplary embodiment of the variable range compensating device, according to the present disclosure.
Figure 38B:
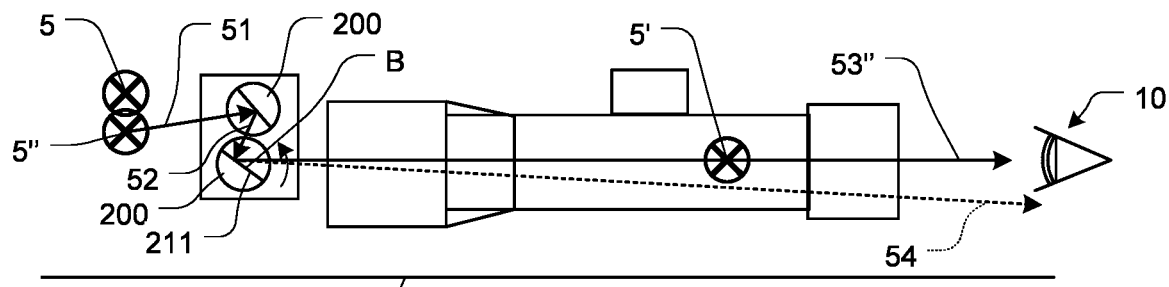
FIG. 38B illustrates an exemplary embodiment of the variable range compensating device, according to the present disclosure.
Figure 38C:
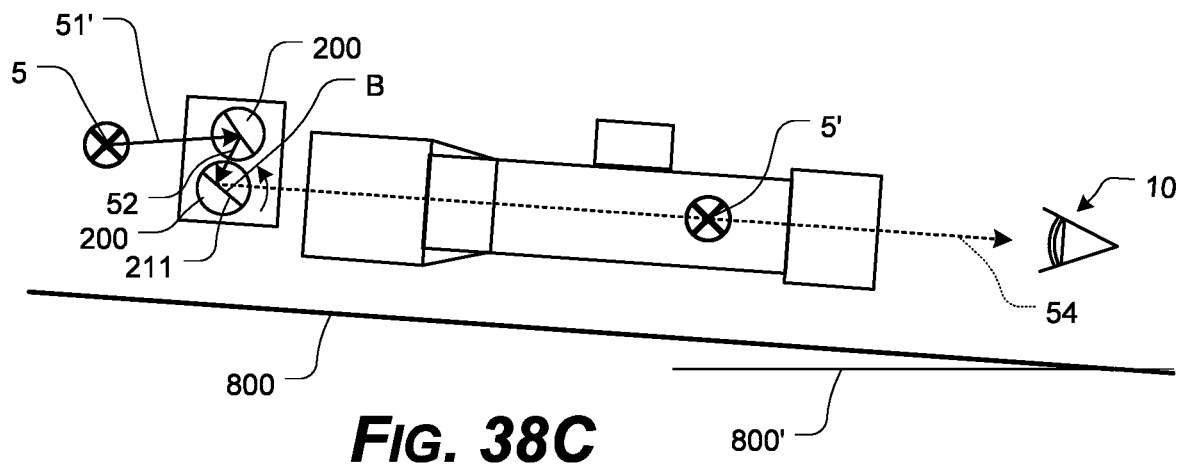
FIG. 38C illustrates an exemplary embodiment of the variable range compensating device, according to the present disclosure.
Figure 38D:
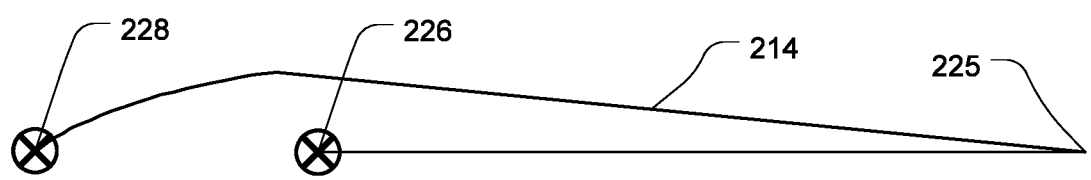
FIG. 38D illustrates a graphical representation of an exemplary second zero position created by an exemplary variable range compensating device, according to the present disclosure.

A new rifle bore position 800' is created when the shooter tilts the platform, as illustrated in FIG. 38C, and optical targeting device 40 in order to realign reticle/reference 5' and the eye/receptor 10 to line up with new apparent position 51' and the reticle/reference 5' to target image 5.

A shooter's position is shown at 225 with the original target position of 226. With the application of the variable range compensating device 100 a new image position target apparent position 5" is formed. The new image angle 116 will have the shooter adjust the optical targeting device 40 and rifle bore 800 to the new bore position 800'. With the new 800' position a new target/bullet impact 228 is created.

Figure 39A:
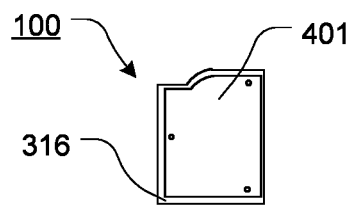
FIG. 39A illustrates certain exemplary components of an exemplary variable range compensating device, according to the present disclosure.
Figure 39A:
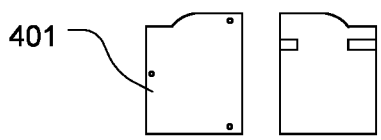
Figure 39A:
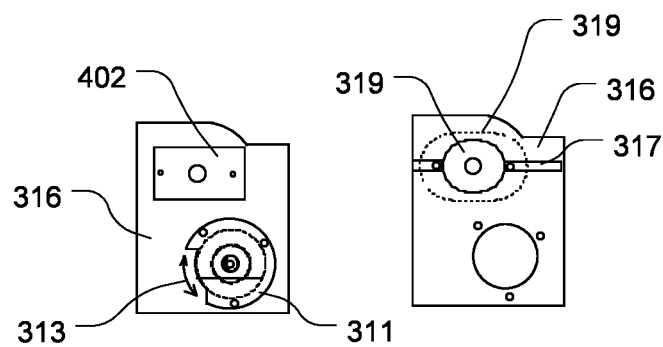
Figure 39A:
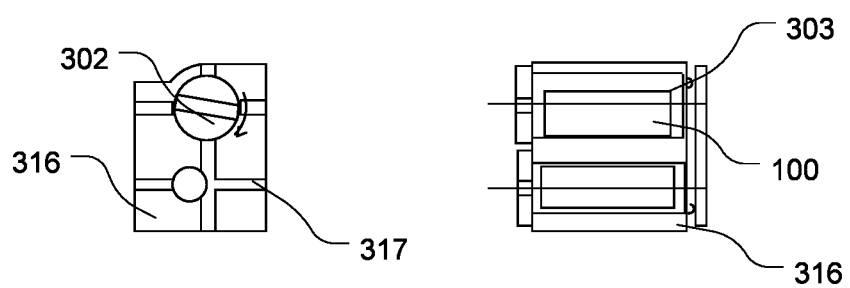
Figure 39A:
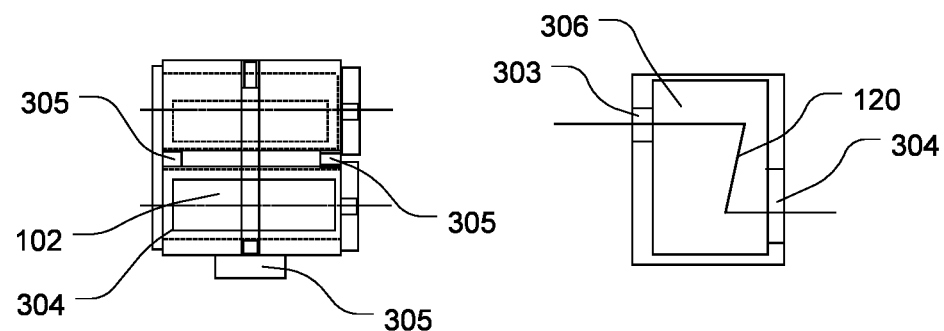
Figure 39B:
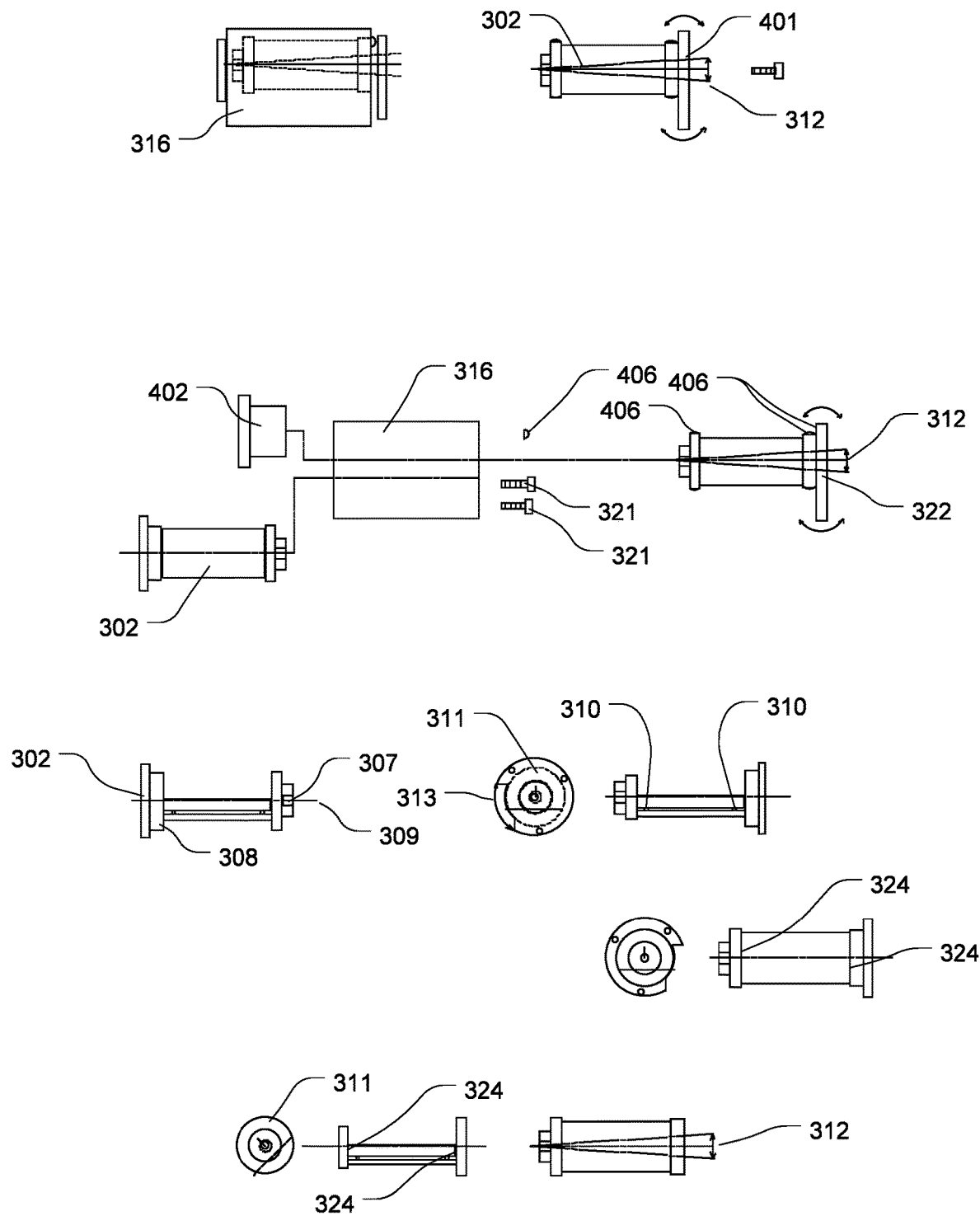
FIG. 39B illustrates certain exemplary components of an exemplary variable range compensating device, according to the present disclosure.
Figure 39C:
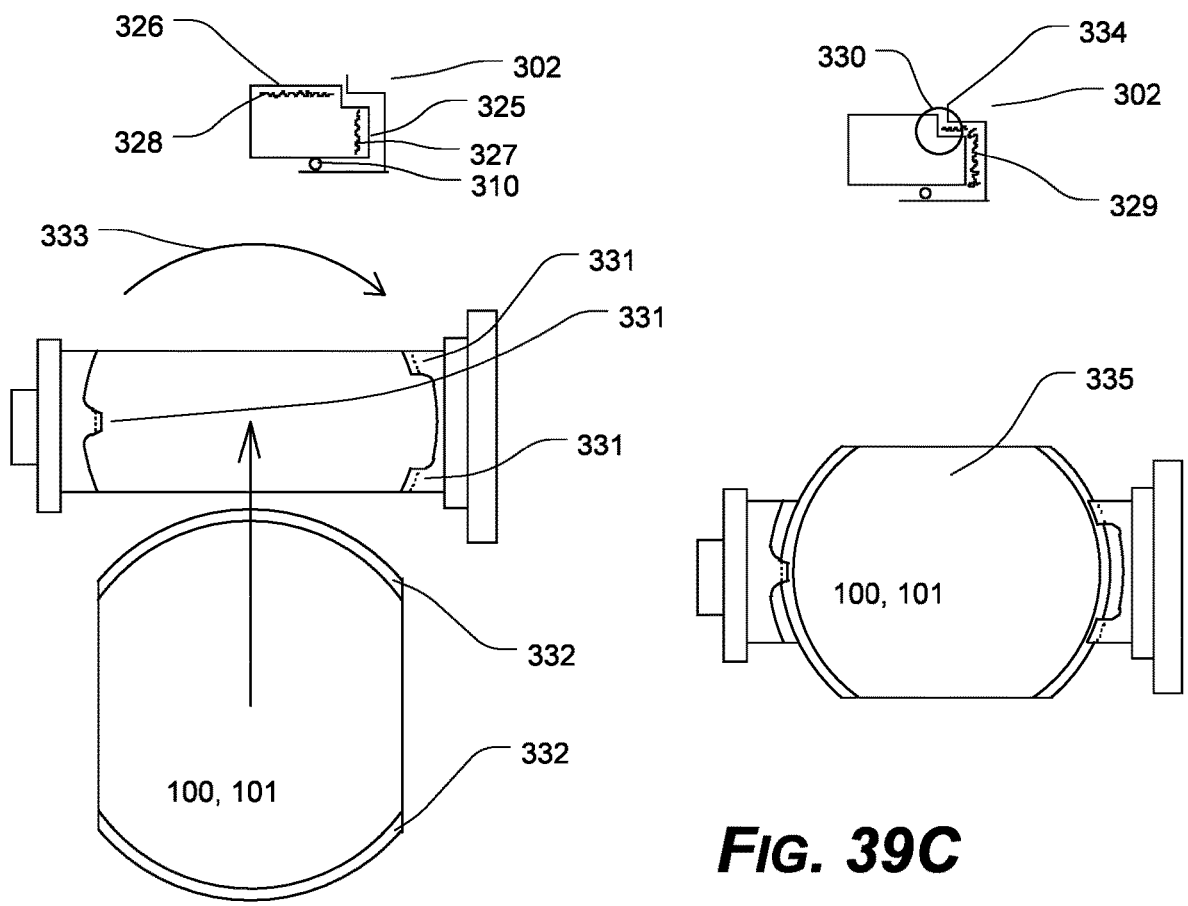
FIG. 39C illustrates certain exemplary components of an exemplary variable range compensating device, according to the present disclosure.

In exemplary FIGS. 39A-39C, the variable range compensating device 100 a setup as substantially shown in in its base components 100, 101, 316, 401, and 402. It may be appreciated that housing 316 contains features, 317, 320, and 321 for example, that create precision reference planes for assembly and to create interlocking features that are result in a robust device practical for heavy field use. Spherical surfaces such as 320 are required to allow for a large range of motion to compensate for manufacturing errors. Alignment manufacturing errors will result in the image position being offset from the required position. Adjustments created by surfaces 320 and rotational movements created by 309 allow a complete adjustability to the device. It may be further appreciated that devices 401, 402 allow further attachment and precision alignment of the components. Features 319 allow adjustment to take place and features 317 to locate supporting devices 401, 402 and are used to eliminate one or more axis of movement. Axes of movement are shown in 312. In may be appreciated that the device in total must be capable of single digit arc second precision if required and capable of retaining the single digit location in field use including significant external impacts, cold, heat and chemicals.

Further, in exemplary FIGS. 39A-39C, it may be appreciated that the viewer using the variable range compensating device 100 may shift the weapon, mechanism, or other platform to which the optical targeting device 40 may be coupled in order to realign to a desired aiming point. Incoming light path 51 will enter housing 316, opening 303 reflect off 100 and 101 thru cavity 306 and exit window 304. Here it may further be appreciated that indexing locks 305, which may be produced in a variety of fashions not all listed here, will secure housing 316 appropriately in the same plane as the optical targeting device and barrel bore, thereby the adjusted 211 image will be placed in the correct positions as compared to the optical targeting device 40 reference components such as reticles, cross hairs, dots, reticle/reference 5', and other similar aiming reference components. Locks 305 are critical to align the original incoming image 112 to the reticle/reference 5' and optical targeting device 40 vertical, horizontal and rotational planes by securing the assemblies 316, 302, 100, and 101 on the same plane as the optical targeting device 40.

Further it may be appreciated that the lens holding device 302 is unique to standard scope optics and aiming devices. 302 is perpendicular to the shooting forces of the platform/gun during recoil. Standard optics represented in optical targeting device 40 have the advantage of recoil forces being parallel to the main mechanism body/scope tube. Typical optics do not require external field accessible adjustability in all planes/rotations of movement. It may be further appreciated that 302 has unique requirements such as a reduced mass that is relatively balanced in rotation mass 308. If 302 is not relatively balanced recoil forces will act non-symmetrically causing the device to rotate during recoil moving the target image 5. Rotation and movement is represented by 312 and 313.

Further in exemplary FIGS. 39A-39C it may be appreciated that lens holding device 302 is only shown in two limited forms. It may be further appreciated that the mounting of the optics in this form is unique. A standard lens uses standard lens rings and optical adhesives. This form of mounting produces little to no stress on the optics. It can be further appreciated that typical lenses transmit object/target image 5 errors at a value that coincides with the glass optical index. In a typical case a typical lens will only transmit 50% of an error introduced by the lens. Mirrors 100, 101 as used in our device transmit an error at a factor of 2×. It may be appreciated that the variable range compensating device 100, in total, could contain 2 or more mirrors/reflective bodies 100, 101, thereby introducing errors of 4× or more from the original introduced error. It may be further appreciated that the variable range compensating device 100 must be capable of working within image errors of a total of less than single digit arc seconds.

It is understood that the mounting of such surfaces 100,101 to lens holder 302 is critical. Standard clamping methods are not sufficient as error is quickly introduced into the image ray or outgoing light path 53. The optics must be mounted as nearly stress free as possible but capable of withstanding large acceleration forces and or impacts. Typical application of adhesives will quickly introduce stress and deform the outgoing ray or outgoing light path 53.

Isolation of the stress is accomplished by controlling the working surfaces as shown in 310. The isolation faces of 310 are placed in a position and size that is optimized to eliminate the stress induced to the mirror optic 100, 101. Using limited 310 size faces reduces the ability of the adhesive to pull and distort the optical surfaces. The position and number of 310 further reduces the induced error. Further it can be appreciated that the surfaces 310 might not be sufficient to retain the optics 100,101. Vertical isolation surface 324 are applied to the lens rod holder 312 are also applied. Isolation of the vertical surfaces takes advantage of a further discovery noting that glass stress is highly two dimensional.

A mounting or adhesive 329 stress applied to one vertical surface 325, the surface 325 will not affect surface 326 during curing events. Stress formation within the glass is represented by the vertical component 327 and horizontal component 328. If one can isolate the stress component to the vertical component 328 the horizontal component, which creates the ray or outgoing light path 53, will not be affected. Careful isolation of all horizontal surfaces 326 is key to isolating the stress. Surfaces 310 must be of sufficient height as to no allow adhesives to wet/wick/capillary onto horizontal surfaces. The detail of 310 can be simple rods, of a variety of materials, or fully machined surfaces.

Further in exemplary FIGS. 39A-39C it may be appreciated that a robust method to hold the optics in place must be employed. Standard lens rings are not practical in this device. Standard hold down screws and or gaskets can be employed. However, it may be further appreciated that a glass locking/cam lock feature 333 would be advantageous. These features are shown in 330, 331, 332. It can be appreciated that a knowledgeable person can make small detail changes to the features, the isolation of the surfaces on a flat plane mounted mirror sufficient to withstand significant recoil in the noted planes are unique to rifle/platform mounted optics. The optic requires features similar to 330 in order to remove the 100% requirement for adhesive to be the sole component limiting optical/mirror travel during recoil or severe impact. This can also be provided by bolts, screws, wire, frames, and other common retaining devices.

Feature 330 provides a compression ledge area that would require a full compression failure of the adhesive/gasket 334. Adhesive section 329 provides significant sheer resistance in recoil. With no secondary components present the reliability of this design is significantly enhanced. It may be appreciated that other methods such as cores/plugs can also provide isolated stress components. A complete mounted mirror is represented by 335.

Figure 40A:
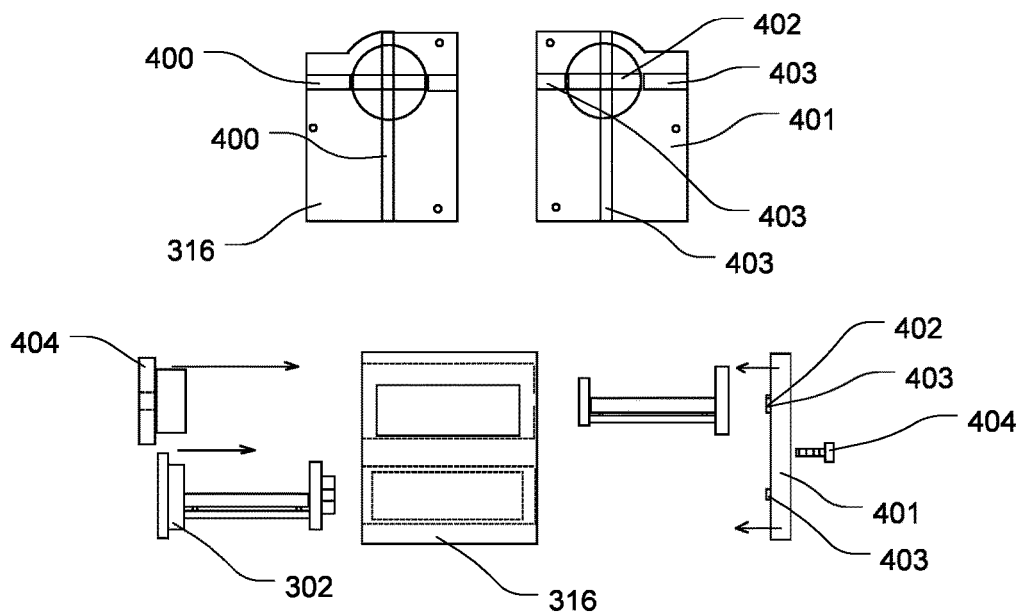
FIG. 40A illustrates certain exemplary components of an exemplary variable range compensating device, according to the present disclosure.
Figure 40B:
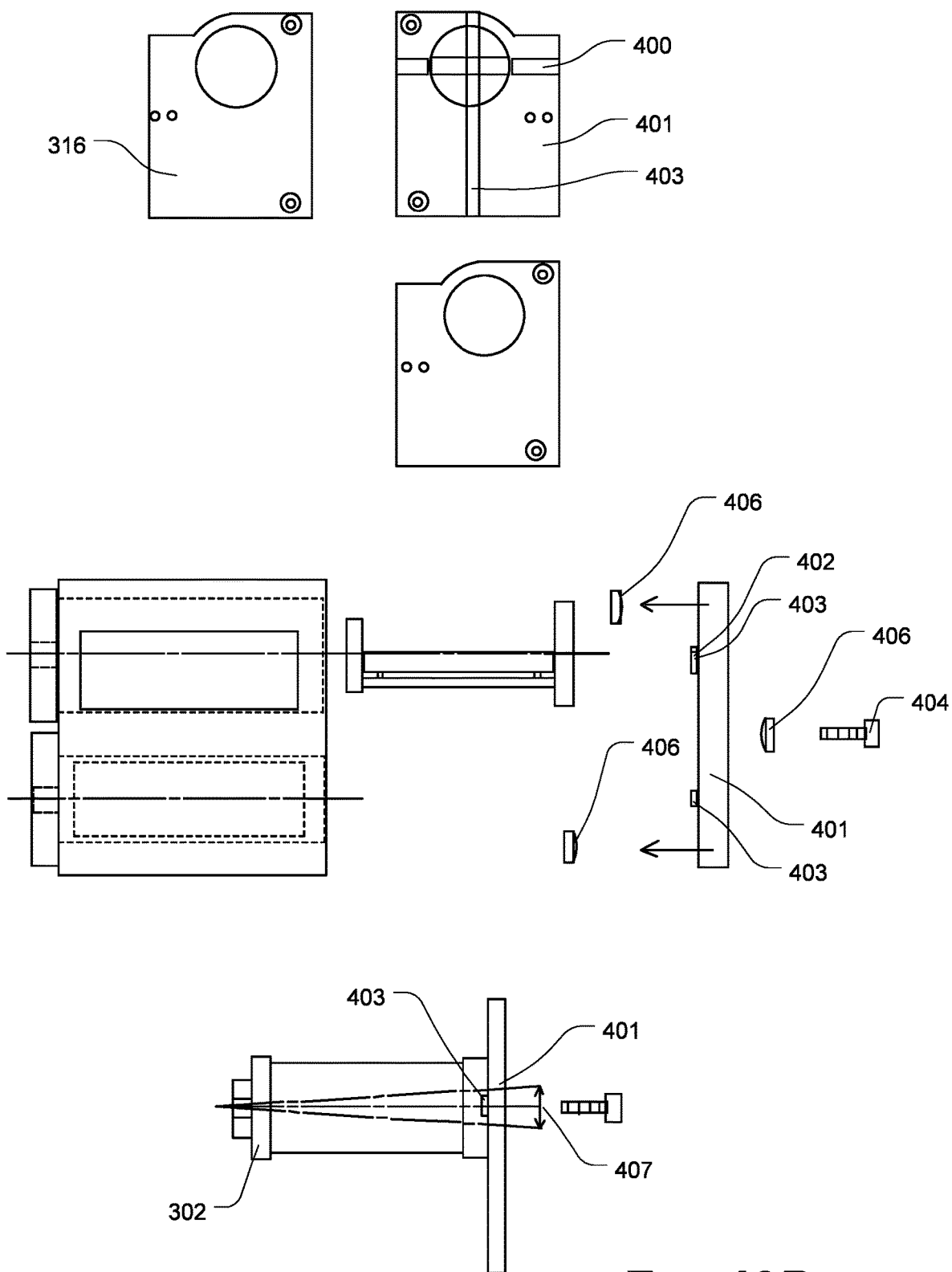
FIG. 40B illustrates certain exemplary components of an exemplary variable range compensating device, according to the present disclosure.

In exemplary FIGS. 40A and 40B, it should be appreciated that the variable range compensating device 100 may be mounted to any platform or weapon in any desired or known fashion. Here, it may further be appreciated that the variable range compensating device 100 may be a standalone device or may be associated/integrated with an existing aiming system or scope. The existing or optical targeting device 40 may be any type of optic, for example a scope, a holographic sight, a "red dot", and the like. Here, the variable range compensating device 100 may use keyway reference points or detents which could include the main body detents/features 400, secondary support components/key features 401, 402, and 403, to establish reference positions for lens holders 302 and reference positions when adjusted to locators 305 and the main body 316 or any solution or combination thereof may further be utilized. The keys/features 401, 402 can be specialized to fit the required lens rod 302 features. Features 401, 401 can also be located and manipulated/adjusted using spherical surfaces 406 to establish a specific position for the various elements in order to produce a ray or outgoing light path 53 in the correct location. Items and combination of items 321 are employed to adjust and lock the device key 401 as it is rotated around its axis. Item 321 uses a tensioner screw and adjusting screw to move and lock the key 401. Components similar to 321 can be used on the lens body and lens holders 312 without employing the use of keys 401, 402.

Further in exemplary FIGS. 40A and 40B it may be appreciated that a robust method to hold the optics in place must be employed. The adjustment range of the optics rods 302 as represented by movements 312, 313 requires a full range of motion in the key locks 401, 402. In this example the housing 316 and keys 401, 402 have features 317, 318 that limit motion in different planes creating a known in the limited plane. If planes of movement are not segregated/limited it becomes very tedious to set the unit up to create its ray or outgoing light path 53. In this example key 402 limits front to rear movements, key detail 317,318 limit key 410 x, y movements. Spherical surfaces 406 limit rotational movements in all axes allowing segregation of an interested axis.

It may be further appreciated that controlling multiple axis of movement with a robust method must be employed. Features 401, 402, 406, 316 main body bore centerlines all interlock providing secondary robust features designed to enhance the use of any fastener.

It may be appreciated further that the 401, 402 keys not only have locking features 318 to match main body 317 features, but they are also as large as possible to reduce the twisting moments of force during recoil and impact.

Once all planes have been adjusted and locked the lens device may then be used to shift an apparent potential impact of a fired round.

It may be further appreciated that the variable range compensating device 100 can be simplified by removing all adjustability and quickly limiting the device to components 100 (lens), 302 (Rods lens holders) and 316 (housing) and produce a new impact point of a fired projectile.

Mounting and or locating the variable range compensating device 100 as compared to an incoming image and the optical targeting device 40 can be accomplished with a variety of methods. In certain exemplary embodiments, one reflective surface 250 will adjust a vertical component, while the other reflective surface 250 will adjust left and right values. The reflective surfaces 250 are typically separate from one another for ease of adjustment, but a single, adjustable reflective surface 250 could accomplish both the vertical component and the left and right values.

Figure 41A:
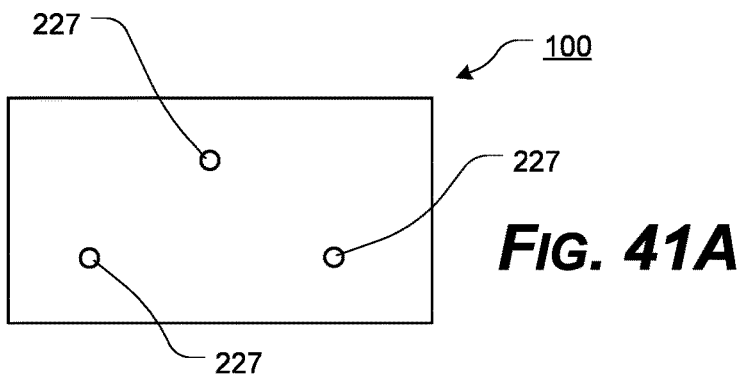
FIG. 41A illustrates an exemplary variable range compensating device, according to the present disclosure.
Figure 41B:
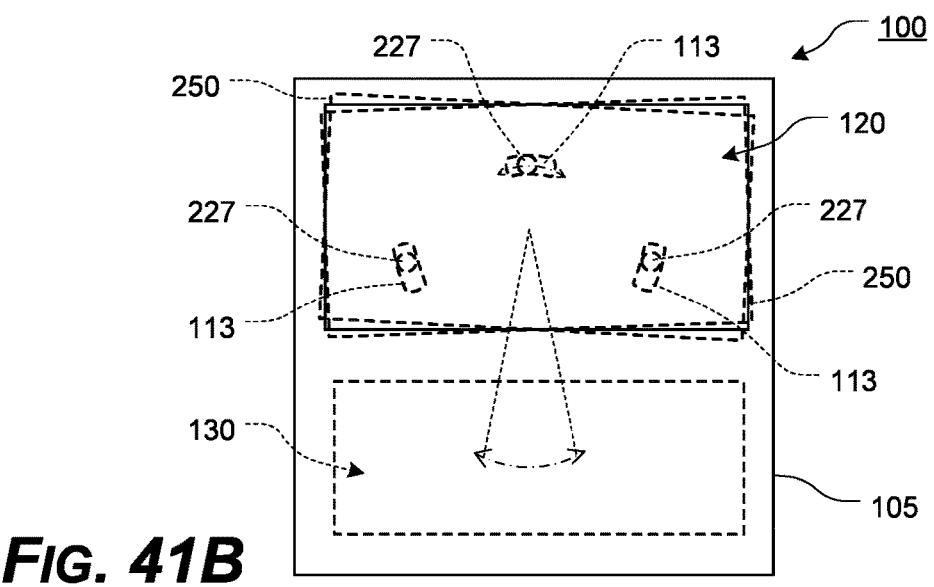
FIG. 41B illustrates a rear view of an exemplary variable range compensating device, according to the present disclosure.
Figure 41C:
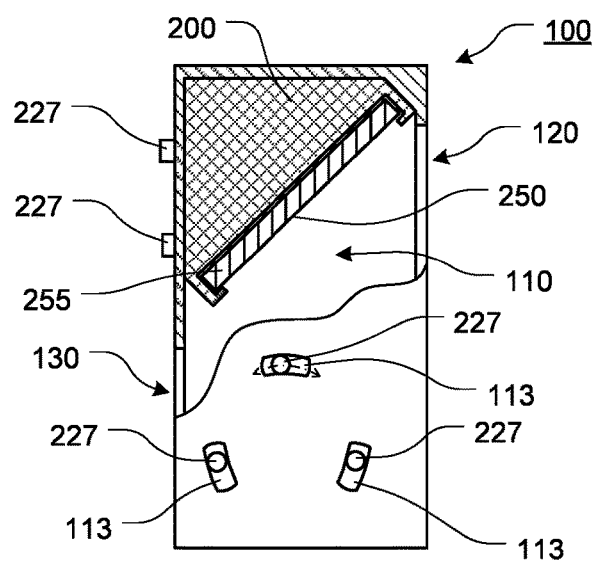
FIG. 41C illustrates a side, partial cross-sectional view of an exemplary variable range compensating device, according to the present disclosure.

For example, FIGS. 41A-41C illustrate certain exemplary embodiments and/or components of the variable range compensating device 100, wherein the reflective surfaces 250 are able to be manipulated so as to adjust a vertical (right and left) or horizontal (up and down) orientation of each reflective surface 250 relative to the housing 105. Alternatively, each reflective surface 250 may be manipulated so as to adjust the relative angle of each reflective surface 250 relative to each other reflective surface 250.

As illustrated, for example, in FIGS. 41A-41C, one or more control elements 227 may be rotated or manipulated within slots 113 formed within or through portions of the housing 105 to adjust each reflective surface 250. Each control element 227 may provide adjustment relative to a different axis of adjustment.

In certain exemplary embodiments, the control elements 227 may comprise rods or substantially round elements that may be rotated to adjust the angular position of each reflective surface 250. Alternatively, the control elements 227 may be substantially rectangular in shape. Thus, while the control elements 227 are shown as substantially round rod type devices, mounting surfaces can be produced within the housing 105, on rectangular bodies or any shape body that holds or secures the reflective surfaces 250.

Utilizing additional angular adjustments allows further displacement of incoming images, within the variable range compensating device 100.

Figure 42:
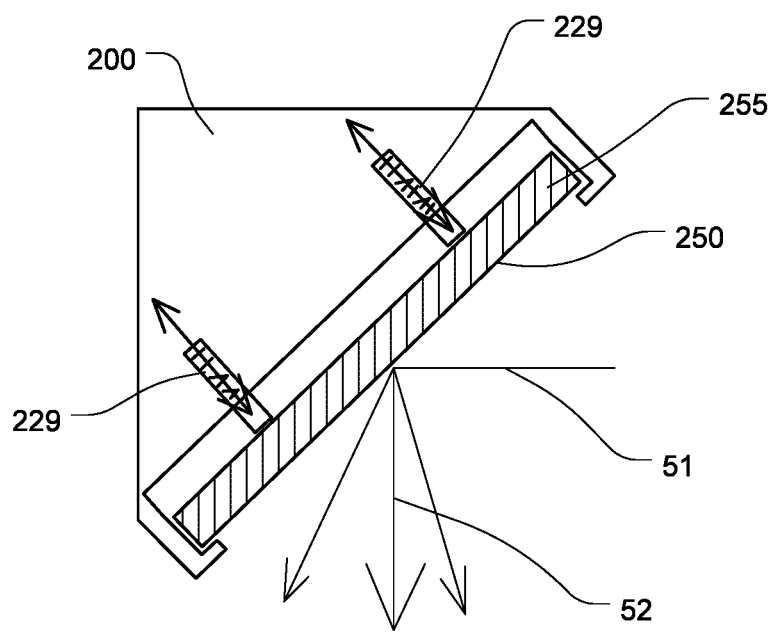
FIG. 42 illustrates a cross-sectional view of certain exemplary components of a variable range compensating device, according to the present disclosure.
Figure 43:
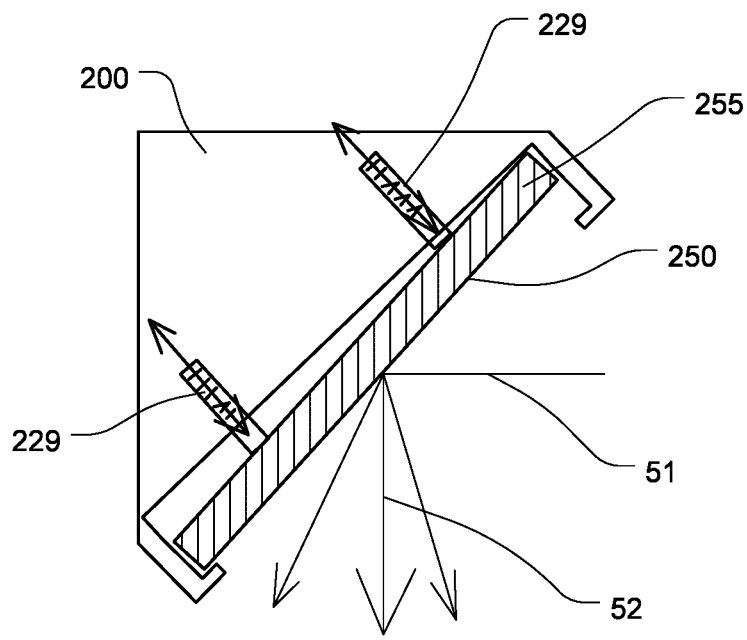
FIG. 43 illustrates a cross-sectional view of certain exemplary components of a variable range compensating device, according to the present disclosure.

As illustrated, for example, in FIGS. 42-43, adjustable threaded components or pins 229 positioned behind in the reflective surface 250 of a mirror or lens 255 can contact the mirror or lens 255. By adjusting the position of the adjustable threaded components or pins 229, the reflective surface 250 can be manipulated relative to an incoming image or incoming light path 51, to create different angles of a reflected image and produce a desired internal light path 52.

Figure 44:
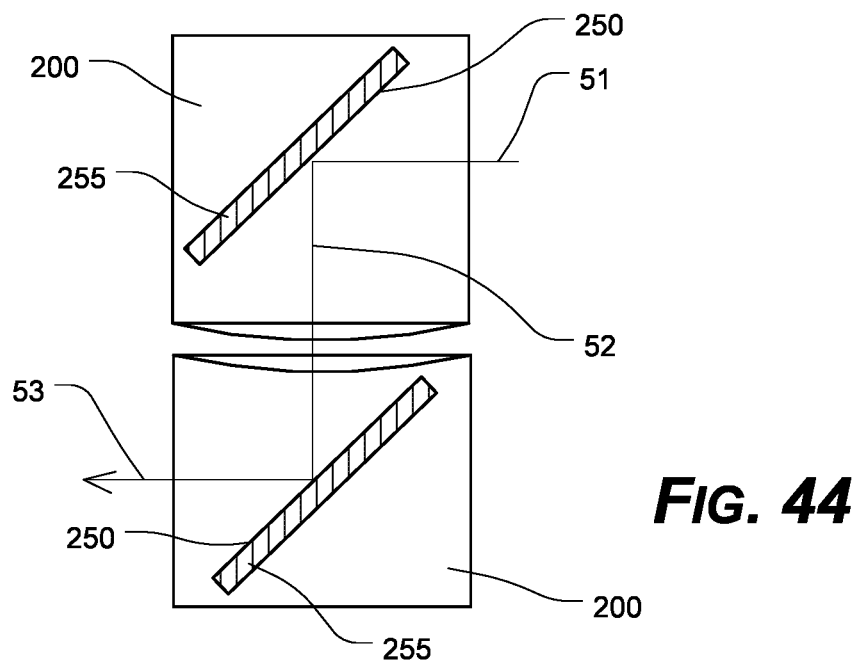
FIG. 44 illustrates a schematic view of exemplary lens holders, according to the present disclosure.
Figure 45:
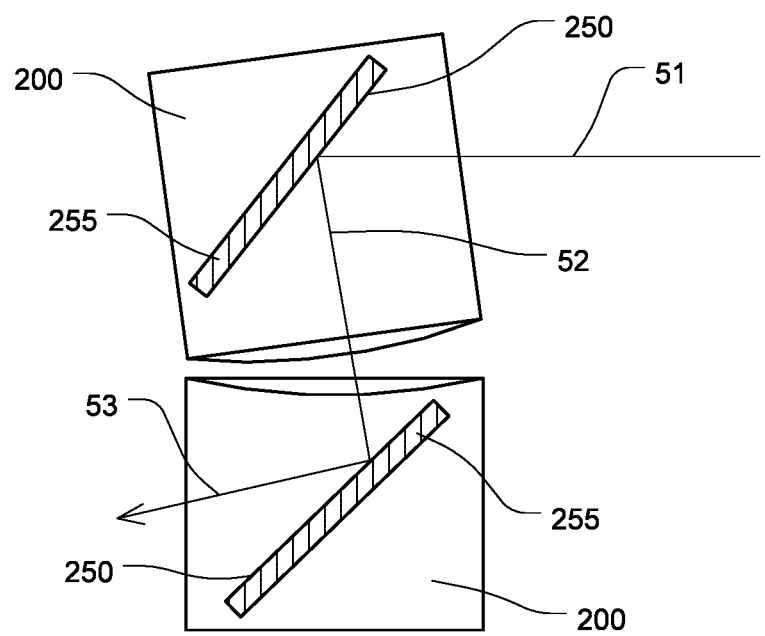
FIG. 45 illustrates a schematic view of exemplary lens holders, according to the present disclosure.

FIGS. 44-45 illustrate adjustable holders 200 having a radiused surface 252 (either a concave radiused surface or a convex radiused surface) acting similarly to a gimble in which the upper and lower adjustable holders 200 are manipulated, creating different axis as compared to each other, so as to create a new reflected image direction meeting a desired specification.

Figure 46:
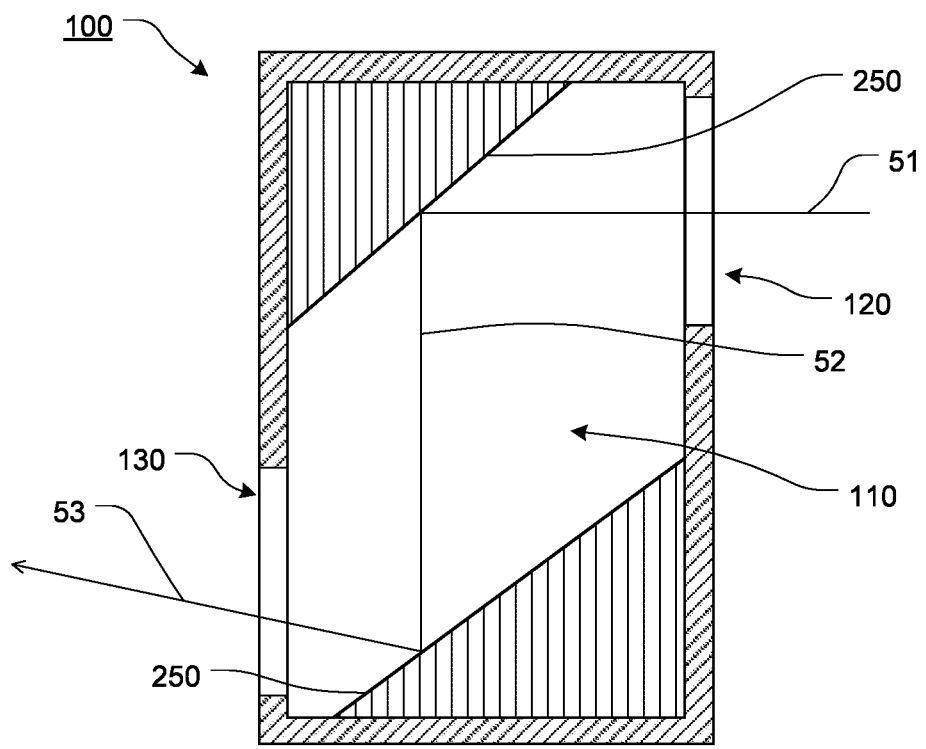
FIG. 46 illustrates an exemplary embodiment of the variable range compensating device, according to the present disclosure.

FIG. 46 illustrates an exemplary embodiment of the variable range compensating device 100, wherein the reflective surfaces 250 are machined, manufactured, or otherwise provided at a desired angle such that adjustment capability of the reflective surfaces 250 is not needed and the variable range compensating device 100 could be directly mounted proximate the optical targeting device 40. Where are capable, the reflective surfaces 250 may comprise direct metal surfaces.

Figure 47A:
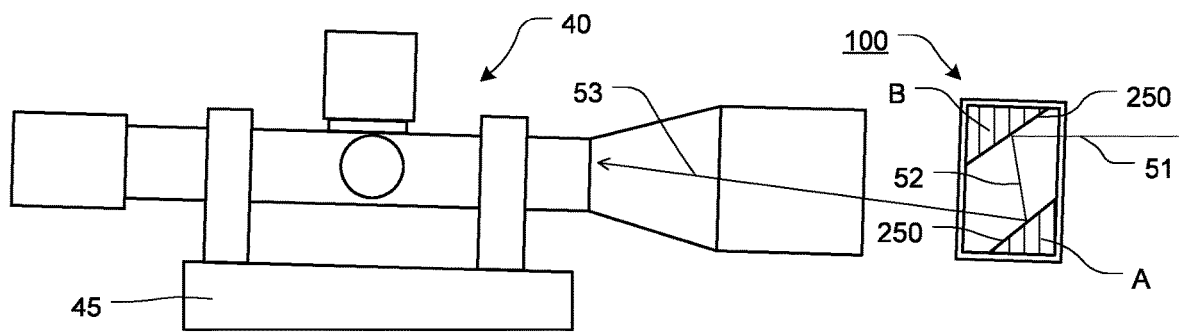
FIG. 47A illustrates a side view of an exemplary embodiment of a variable range compensating device positioned in a normal, upright position relative to an optical device, wherein the variable range compensating device is illustrated in a cross-sectional view, according to the present disclosure.
Figure 47B:
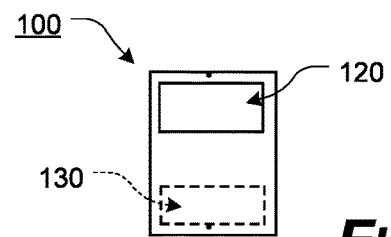
FIG. 47B illustrates a front view of an exemplary embodiment of a variable range compensating device positioned in a normal, upright position, according to the present disclosure.
Figure 48A:
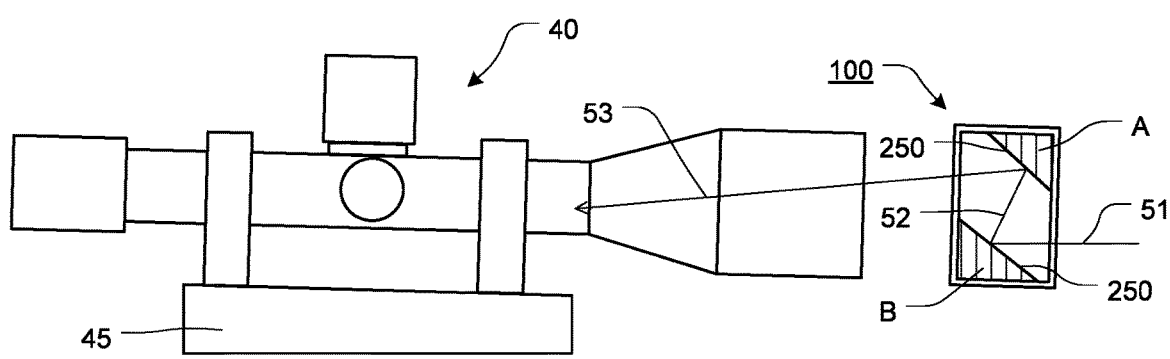
FIG. 48A illustrates a side view of an exemplary embodiment of a variable range compensating device positioned in an inverted position relative to an optical device, wherein the variable range compensating device is illustrated in a cross-sectional view, according to the present disclosure.
Figure 48B:
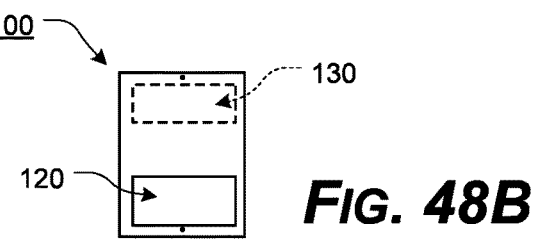
FIG. 48B illustrates a front view of an exemplary embodiment of a variable range compensating device positioned in an inverted position, according to the present disclosure.

In various exemplary embodiments, the variable range compensating device 100 may be utilized in a normal, upright position or an inverted position. For example, FIGS. 47A-47B illustrate the variable range compensating device 100 positioned in a normal, upright position, as previously described herein. FIGS. 48A-48B illustrate the variable range compensating device 100 positioned in an inverted position.

In some cases, rails or other mounts can be employed that provide large angles to the system, allowing for a longer range shot. However, because of the potential limits of travel within an exemplary optical targeting device 40, the variable range compensating device 100 cannot be used at shorter ranges (100 yds for example) as the target cannot be viewed due to the fact that the optical targeting device 40 cannot be adjusted to even view the shorter range target.

In such cases, the variable range compensating device 100 can be inverted and moa/mil/angle can be subtracted from the system (combination of optical targeting device 40 and variable range compensating device 100). For example, a person might mount a 100 moa rail base 45 on a 300 WM. Assuming the scope has 100 moa of actual travel capability, this system would only be capable of making a 1200 yd shot. In other words, engaging a target under 1200 yds is not possible as the target is completely out of view in this case somewhere (12 ft) down below the image that can actually be viewed through the optical targeting device 40. By inverting the variable range compensating device 100, the incoming image is shifted 100 ma lower, allowing for the shooter to engage sub 100 yd range targets with a full view of the target centered within the optical targeting device 40.

Thus, the variable range compensating device 100 may be inverted or flipped to lower an object image within the optical targeting device 40, allowing the variable range compensating device 100 to be utilized on high angle bases.

In these exemplary embodiments, the housing 105 may optionally be provided with alternative mounting or engagement points positioned on a top surface and a bottom surface of the variable range compensating device 100.

Figure 49:
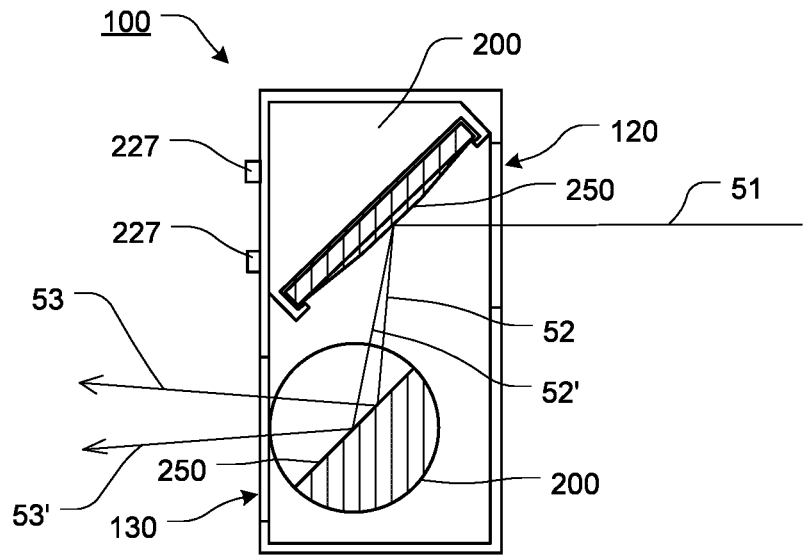
FIG. 49 illustrates a side, cross-sectional schematic view of an exemplary embodiment of a variable range compensating device, according to the present disclosure.
Figure 50:
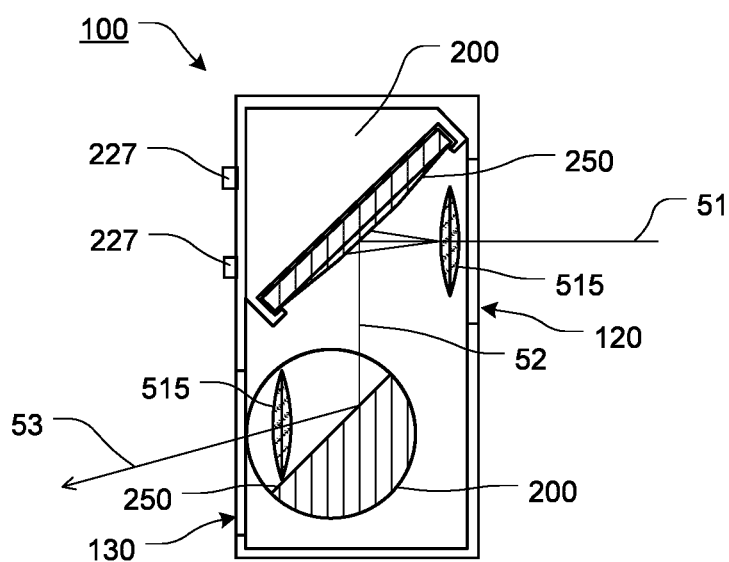
FIG. 50 illustrates a side, cross-sectional schematic view of an exemplary embodiment of a variable range compensating device, according to the present disclosure.

FIGS. 49-50 illustrate certain exemplary embodiments wherein at least one transmissive optical device 515 (such as, for example, a lens or a compound lens that focuses or disperses a light beam by means of refraction) is included to magnify the object image or de-magnify the object image. The at least one transmissive optical device 515 can be built directly on or attached to the mirror or lens 255 or as a standalone transmissive optical device 515 used within the variable range compensating device 100. The at least one transmissive optical device 515 may be used in either position or both positions.

Figure 51:
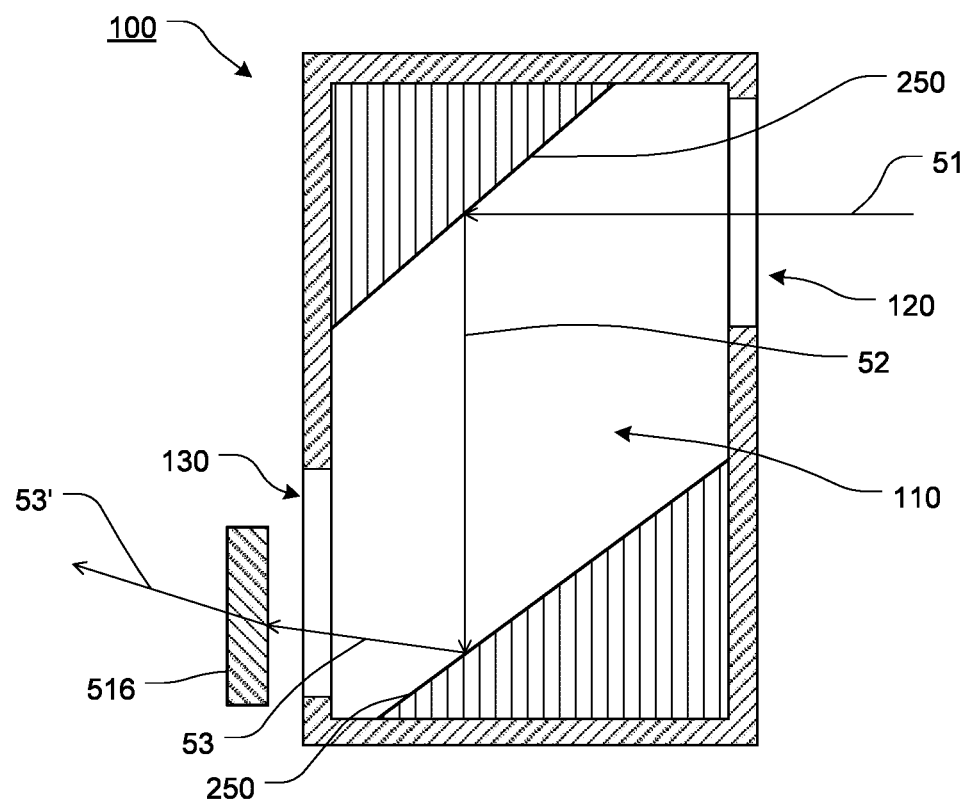
FIG. 51 illustrates an exemplary embodiment of the variable range compensating device, according to the present disclosure.

FIG. 51 illustrates an exemplary embodiment of the variable range compensating device 100, wherein the position of an incoming image or and image can be adjusted using at least one transmissive optical device 516, comprising a wedge lens or offset lens assembly. This allows further manufacturing methods and assembly methods.

Figure 52:
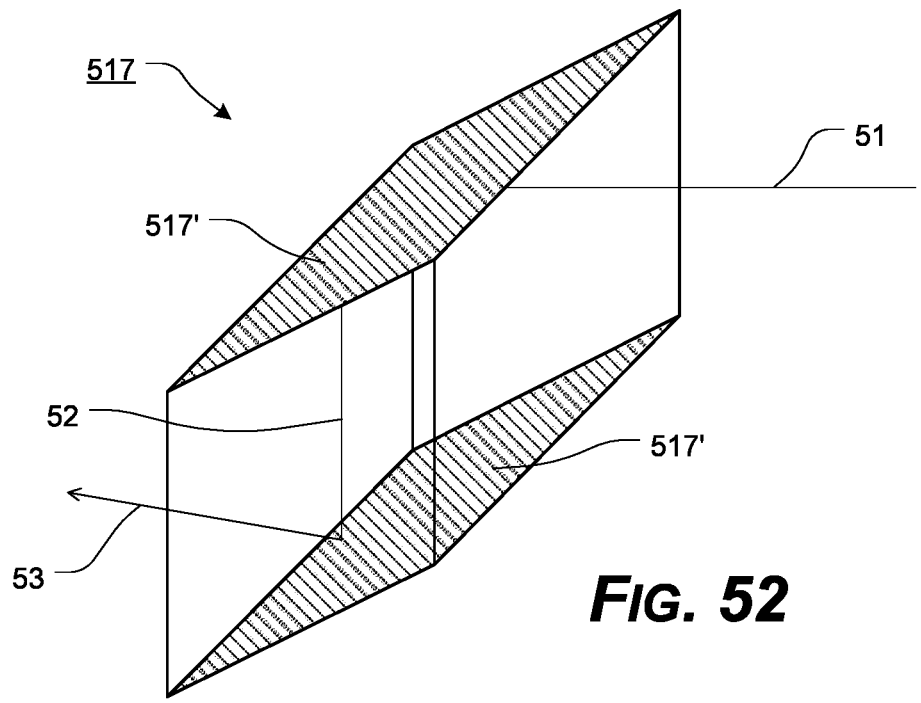
FIG. 52 illustrates an exemplary embodiment of a transmissive optical device, according to the present disclosure.

FIG. 52 illustrates an exemplary embodiment of a transmissive optical device 517, comprising a portion of solid transparent material having opposing reflective surfaces 517'. The transmissive optical device 517 utilizes internal reflection and/or includes opposing reflective surfaces 517'. In various exemplary embodiments, the transmissive optical device 517 may be attached or coupled to a single supporting rod. If correction is needed, at least one transmissive optical device 517, as illustrated in FIG. 51, could be used.

Figure 53:
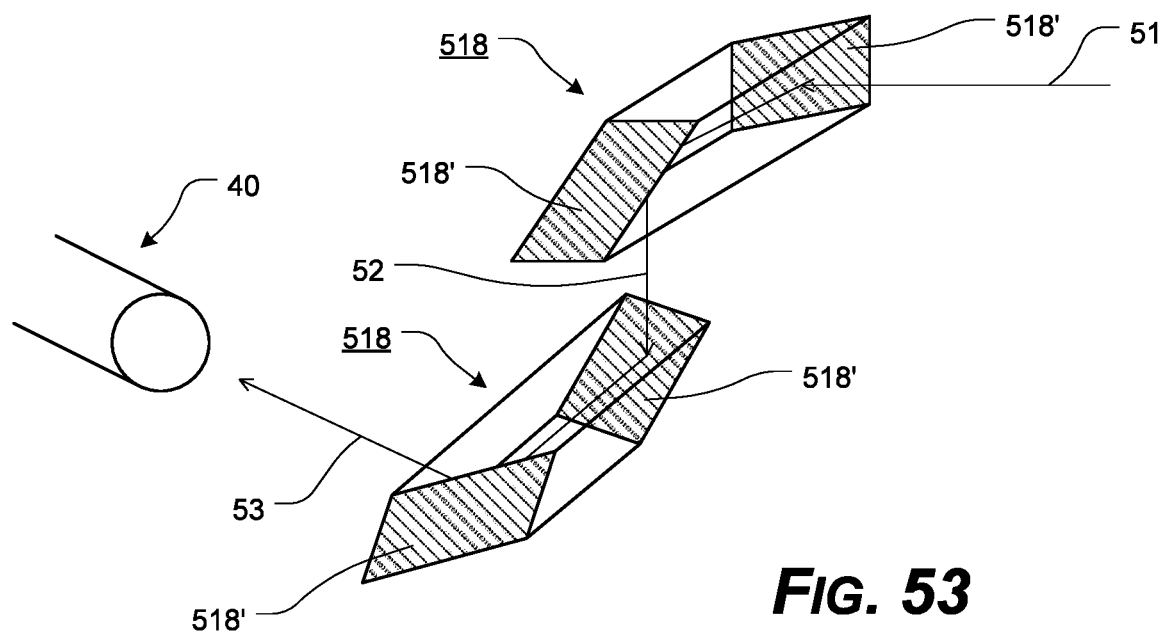
FIG. 53 illustrates an exemplary embodiment of a transmissive optical device, according to the present disclosure.

FIG. 53 illustrates an exemplary embodiment of a transmissive optical device 518, comprising a portion of solid transparent material having opposing reflective surfaces 518'. The transmissive optical device 518 utilizes internal reflection and/or includes opposing reflective surfaces 518'. In this exemplary embodiment, the transmissive optical devices 518 are not only changing elevation but also incorporating an offset to view the object off axis to the firearm platform. As moa/mil requirements increase, at some point the barrel or firing tube will enter the optical targeting device's image. In this process, an offset method is utilized to look around the barrel and place the image back on the platform centerline before manipulating the elevation of the object.

Figure 54A:
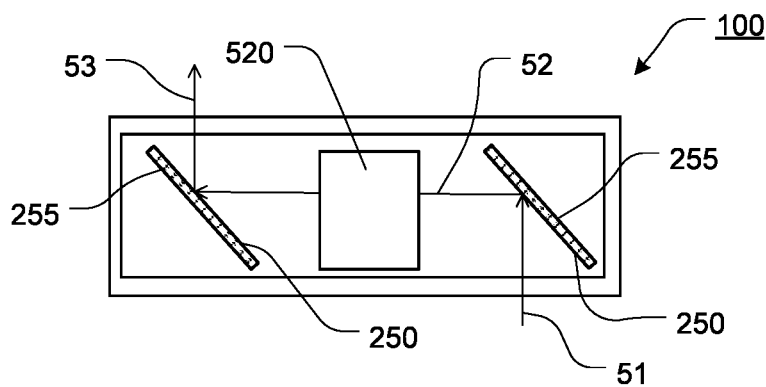
FIG. 54A illustrates a top schematic block diagram of an exemplary embodiment of a variable range compensating device, according to the present disclosure.
Figure 54B:
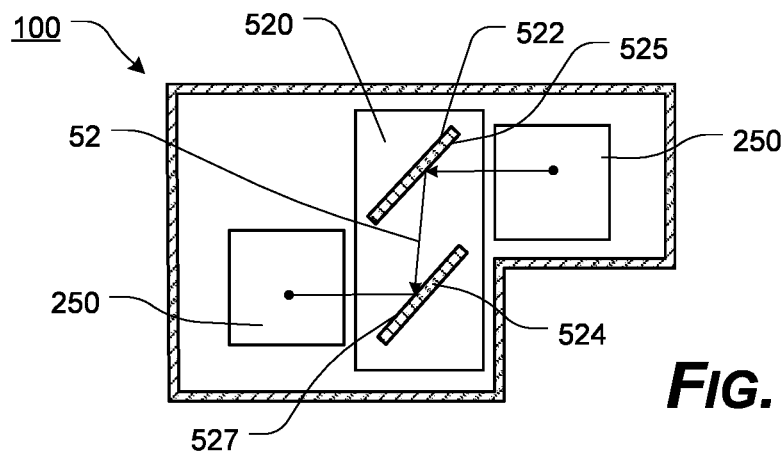
FIG. 54B illustrates a front schematic block diagram of an exemplary embodiment of a variable range compensating device, according to the present disclosure.
Figure 54C:
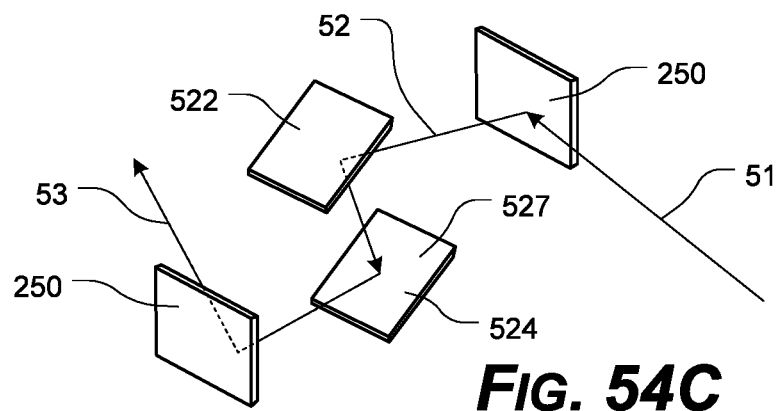
FIG. 54C illustrates a schematic block diagram of certain exemplary components of an exemplary variable range compensating device, according to the present disclosure.

FIGS. 54A-54C illustrate a top view, front view, and a schematic block diagram, respectively of exemplary elements of a variable range compensating device 100, which function substantially similarly to the variable range compensating device 100, as illustrated in FIG. 53. However, as illustrated in FIGS. 54A-54C, the embodiment utilizes a reflective element 520 comprising adjustable mirrors or lenses 522 and 524, each having a reflective surface 525 and 527, respectively.

Figure 55:
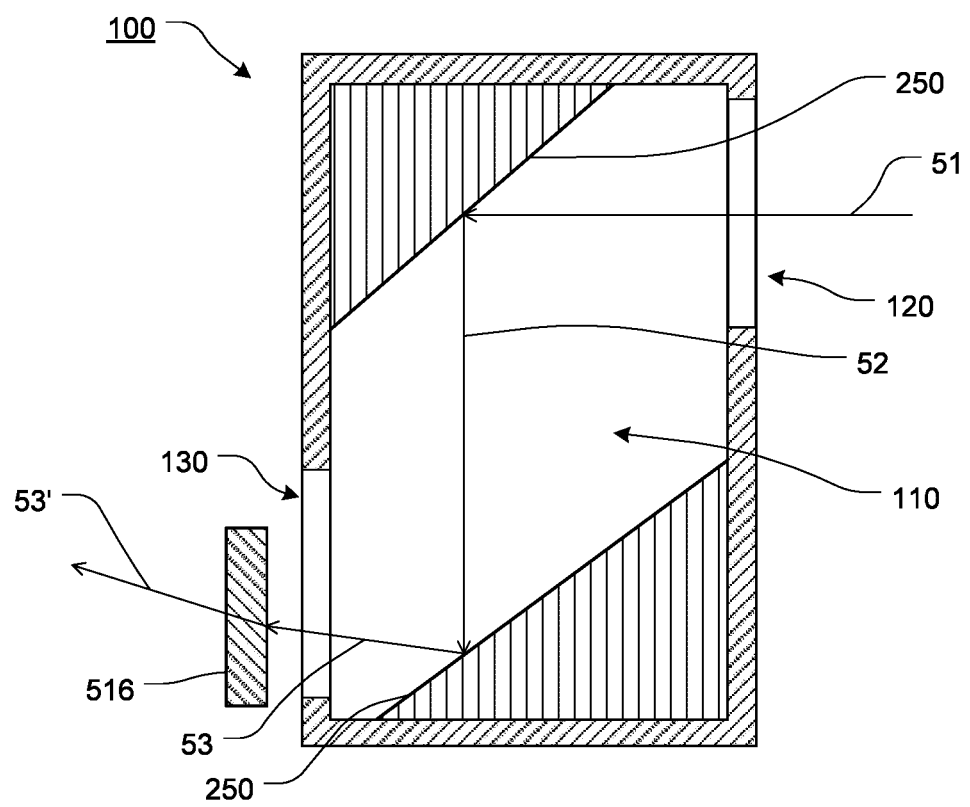
FIG. 55 illustrates an exemplary embodiment of the variable range compensating device, according to the present disclosure.

FIGS. 55-64 illustrates various exemplary embodiments of the variable range compensating device, according to the present disclosure. As illustrated in FIG. 55, various lenses or wedges may optionally be used to further correct and image position or image quality. As illustrated, the variable range compensating device 100 may optionally utilize an exemplary prism wedge 517 to further correct the position of an outgoing image in the x-axis, y-axis, and rotational. If an error exists in the placement of the mirrors, the prism wedge 517 can be used to realign the system to remove the error. Wedges can also be used to create the full value offset, allowing the mirrors to be set at 45°. This could simplify the building of the variable range compensating device 100.

In various exemplary embodiments, the prism wedge 517 may optionally comprise a wedge assembly as disclosed in U.S. Pat. No. 10,444,525, issued Oct. 15, 2019, to John L. Baker. In certain exemplary embodiments, prism wedge 517 comprises one or more multi-index optical wedges.

Utilizing this exemplary embodiment of the variable range compensating device 100, a new target position can be created relative to the bore of the rifle, Maras from heat of the rifles barrel can be reduced, and an initial offset above the barrel can be created to remove the barrel from the sight picture as elevation of the barrel is increased.

Figure 56:
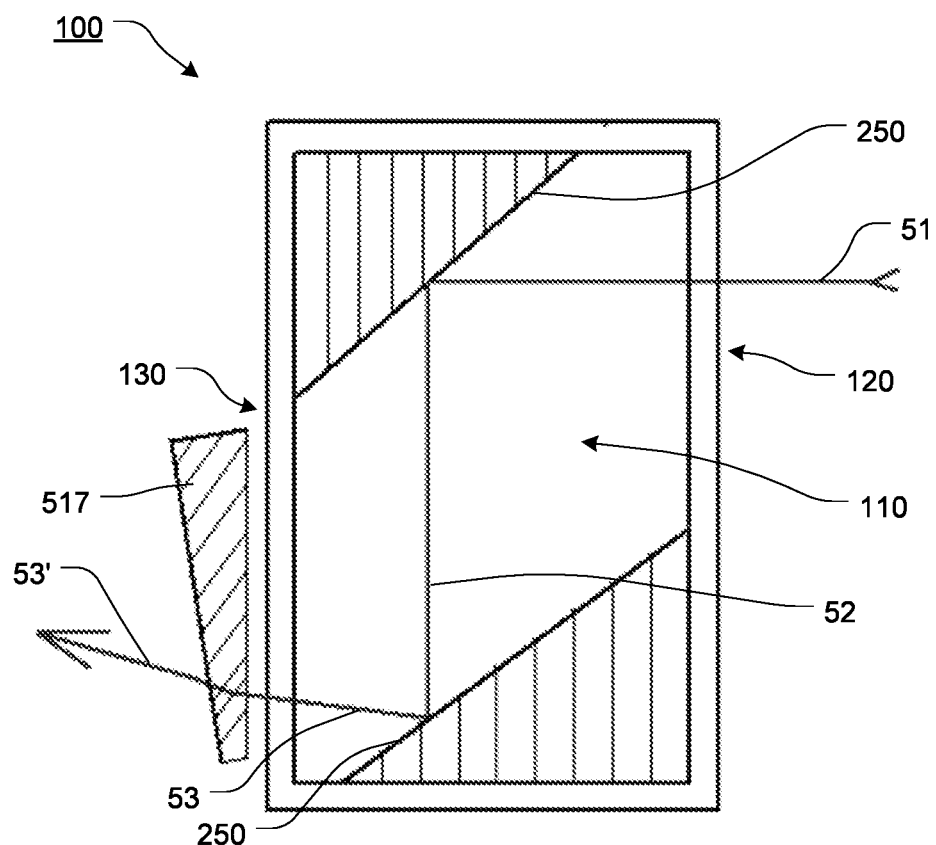
FIG. 56 illustrates an exemplary embodiment of the variable range compensating device, according to the present disclosure.
Figure 57:
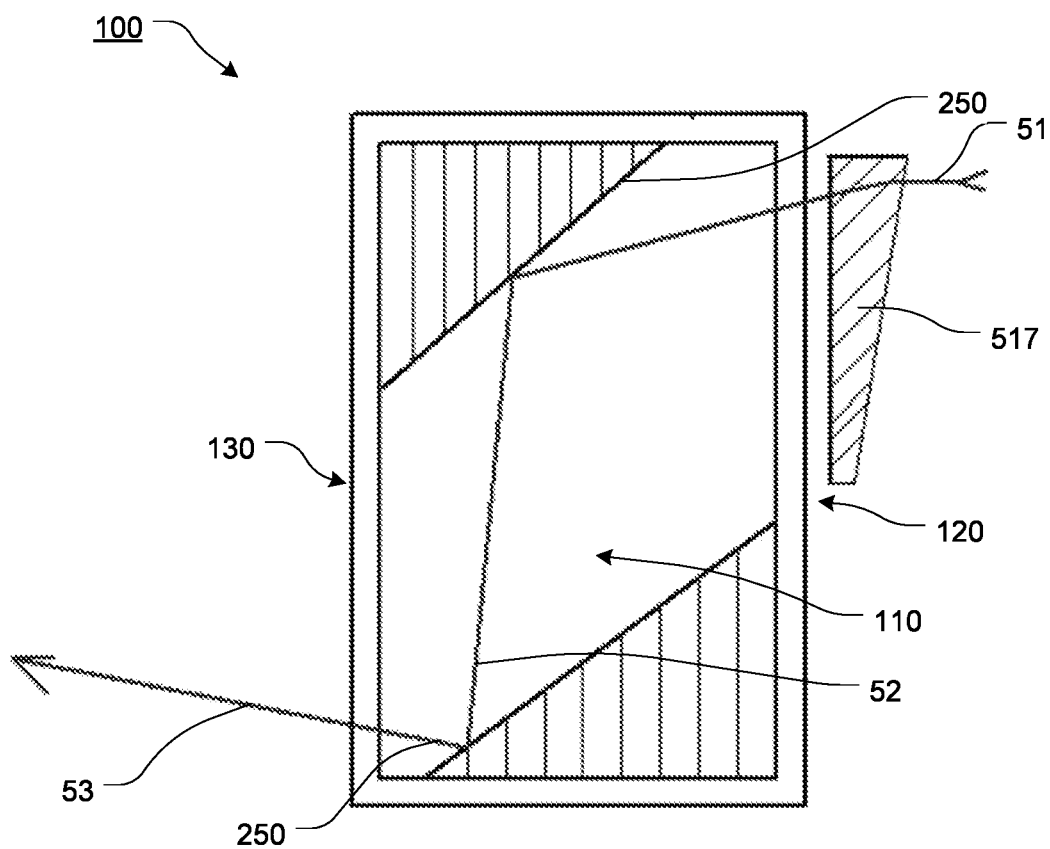
FIG. 57 illustrates an exemplary embodiment of the variable range compensating device, according to the present disclosure.
Figure 62:
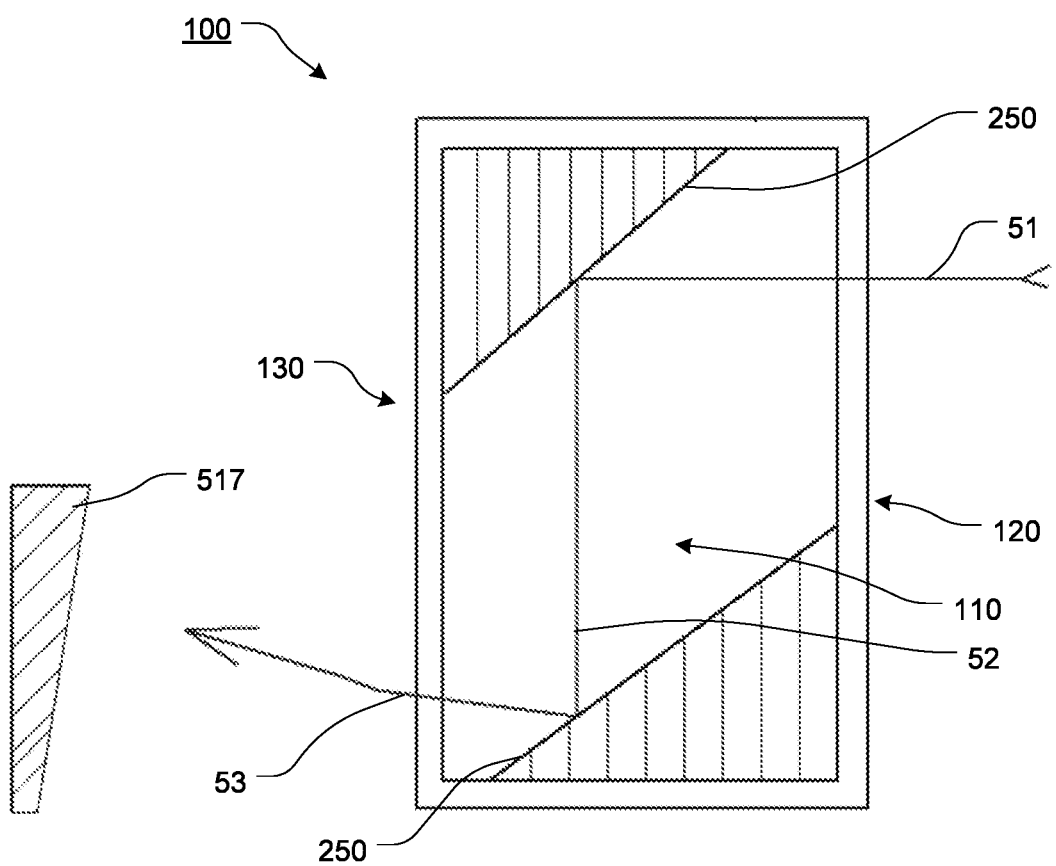
FIG. 62 illustrates an exemplary embodiment of the variable range compensating device, according to the present disclosure.

As illustrated in FIGS. 56, 57, and 62, the variable range compensating device 100 may optionally utilize a prism wedge placed at either the incoming image aperture 120 or the outgoing image aperture 130 of the variable range compensating device 100. A prism wedge may optionally be placed at both the incoming image aperture 120 and the outgoing image aperture 130. The prism wedges may work in conjunction with each other and the rotating mirror assembly or static mirror assembly. In these exemplary embodiments, the prism wedges can perform the primary offset, can be used for system correction, and/or can be a secondary addition as a kit to create offset to the primary variable range compensating device 100.

Figure 58:
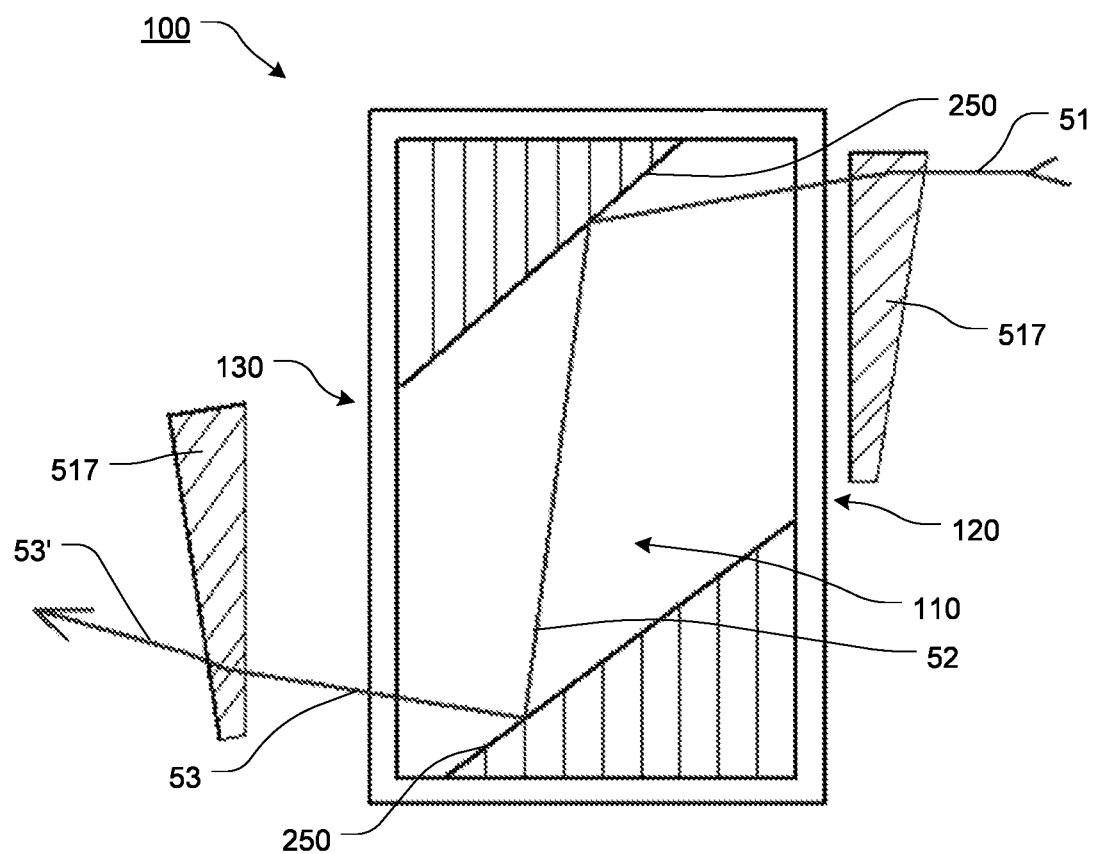
FIG. 58 illustrates an exemplary embodiment of the variable range compensating device, according to the present disclosure.
Figure 59:
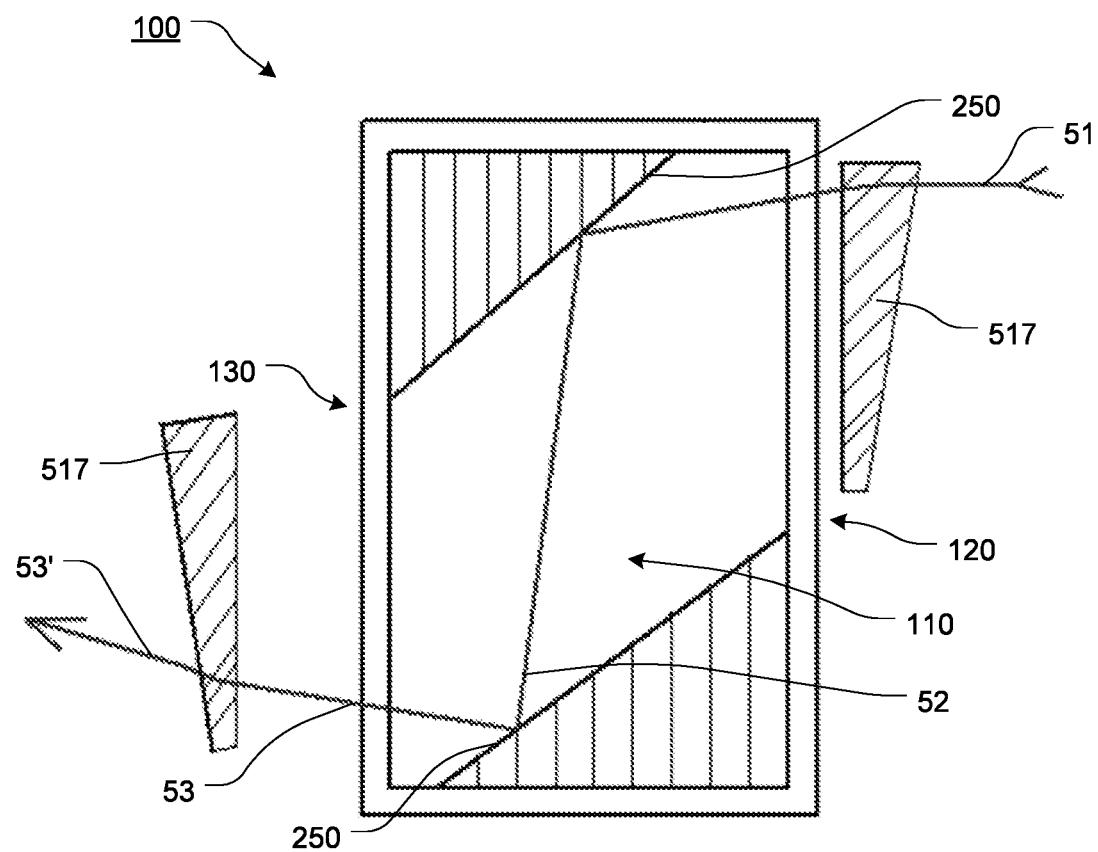
FIG. 59 illustrates an exemplary embodiment of the variable range compensating device, according to the present disclosure.

As illustrated in FIGS. 58 and 59, single prism wedges will produce chromatic aberration. High index classes used in conjunction with low index glasses can be used to eliminate the chromatic aberration through well understood formulas. The use of the two types of glass can be set up as a separated pair, as illustrated, or as a combined pair.

Figure 60:
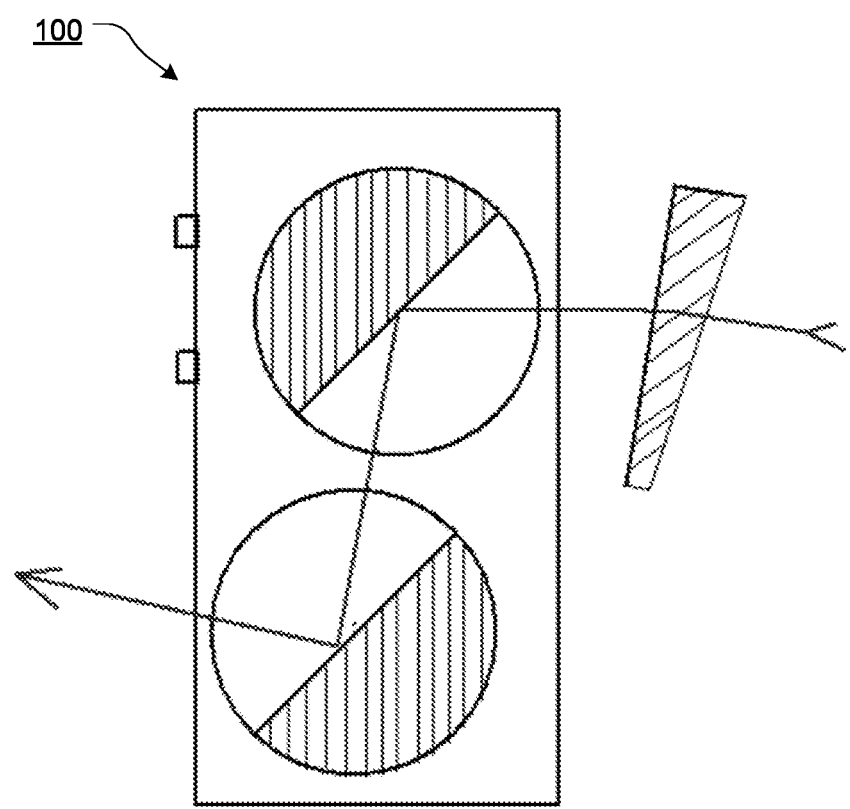
FIG. 60 illustrates an exemplary embodiment of the variable range compensating device, according to the present disclosure.
Figure 61:
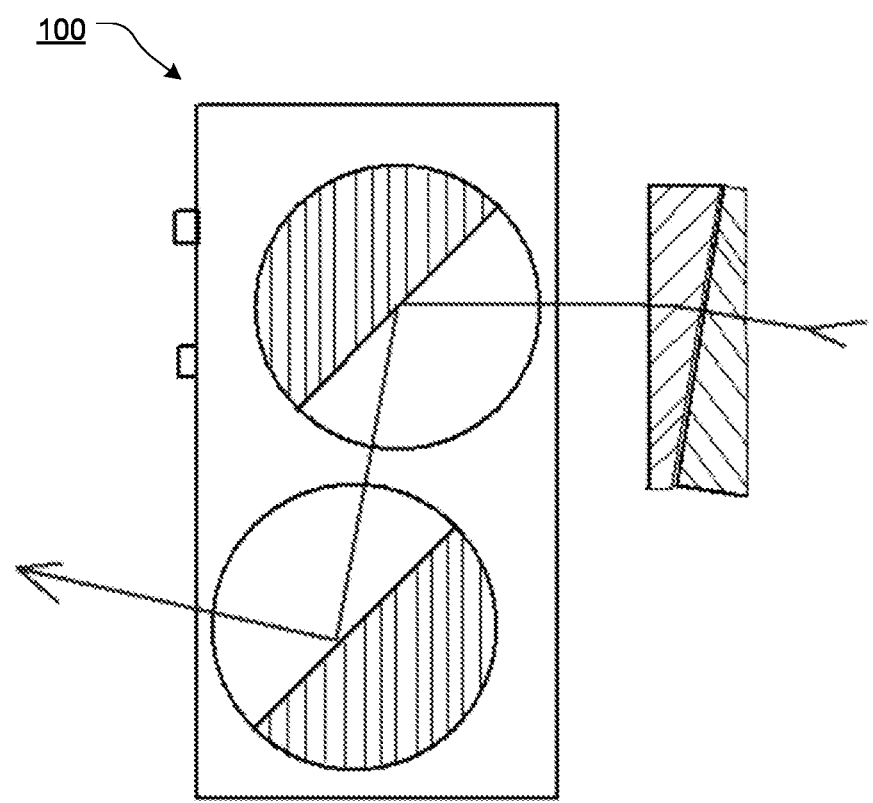
FIG. 61 illustrates an exemplary embodiment of the variable range compensating device, according to the present disclosure.

As illustrated in FIGS. 60 and 61, a wedge can be used to overcome aperture limits or opening sizes. In certain exemplary embodiments, the angle required to meet a new target solution might be beyond the aperture capability of the variable range compensating device 100, such that the image is shadowed or cut from the site picture. In embodiments wherein the variable range compensating device 100 does not have sufficient aperture capability, the wedge may create an offset image with a full view of the target before it enters the primary unit. This may also allow for the creation of a more compact variable range compensating device 100.

Figure 63A:
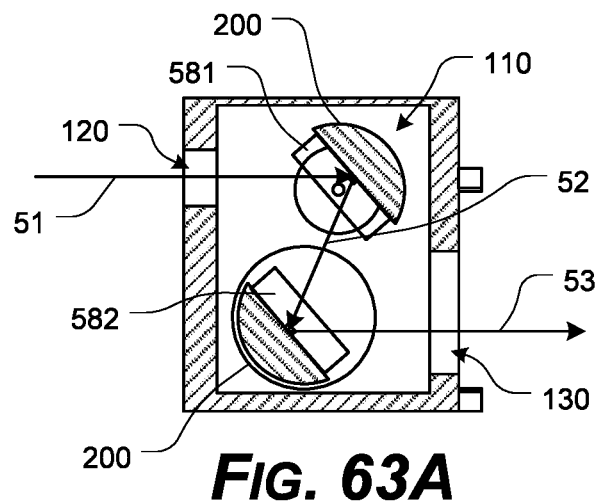
FIG. 63A illustrates a left side, cross-sectional view of an exemplary variable range compensating device, wherein a target image is presented, along a light path, to an eye/receptor, at an original or first zero, according to the present disclosure.
Figure 63B:
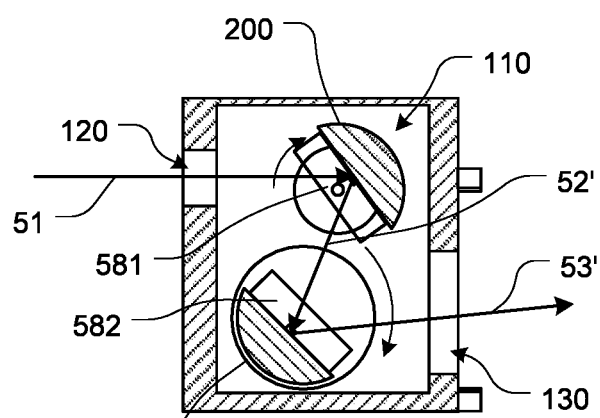
FIG. 63B illustrates a left side, cross-sectional view of an exemplary variable range compensating device, wherein a target image is presented, along a light path, to an eye/receptor, between a first zero and a second zero, according to the present disclosure.
Figure 63C:
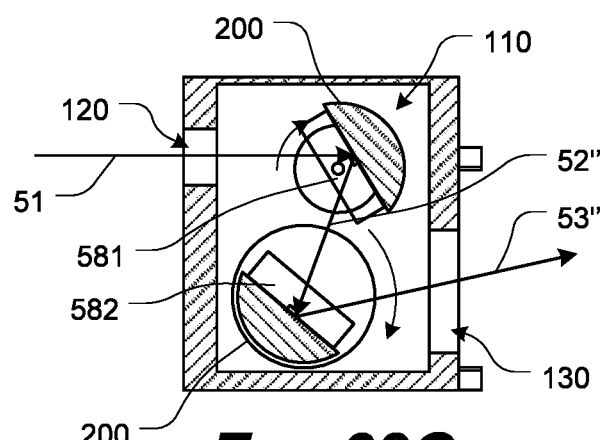
FIG. 63C illustrates a left side, cross-sectional view of an exemplary variable range compensating device, wherein a target image is presented, along a light path, to an eye/receptor, at a second zero, according to the present disclosure.

In various exemplary embodiments, as illustrated in FIGS. 63A-63C, the reflective surface 250 (or mirror or lens 255) of the first adjustable holder 200 and the reflective surface 250 (or mirror or lens 255) of the second adjustable holder 200 are replaced by reflective optical elements 581 and 582. As illustrated, a first reflective optical element 581 is attached or coupled to one of the adjustable holders 200 and a second reflective optical element 500 is attached or coupled to the other adjustable holder 200. Each reflective optical element 581 and 582 comprises a reflective optical element having a transparent optical portion with one of more surfaces that refract light. The reflective optical elements 581 and 582 may be formed of glass, plastic, or fluorite. However, each of the reflective optical elements 580 can be made from any material that is transparent and reflective to the wavelengths for which they are designed.

In various exemplary embodiments, the reflective optical elements 581 and 582 may optionally comprise optical wedges or prisms. In certain embodiments, each reflective optical element 581 and 582 comprises a reflective prism such as, for example, an Abbe-Koenig prism, an Amici roof prism, a Bauernfeind prism, a Dove prism, a Pentaprism and roof pentaprism, a Porro-Abbe prism, a Porro prism, a Retroreflector prism, or a Schmidt-Pechan prism.

In various exemplary embodiments, the reflective optical elements 581 and 582 may optionally comprise optical wedge or prism assemblies as disclosed in U.S. Pat. No. 10,444,525, issued Oct. 15, 2019, to John L. Baker. In certain exemplary embodiments, the reflective optical elements 581 and 582 comprise one or more multi-index optical wedges.

As illustrated in FIGS. 63A-63C, the adjustable holders 200, each having a reflective optical element 581 or 582, are adjusted, as further illustrated in FIG. 63A, such that a target image is presented through the variable range compensating device 100 and the optical targeting device 40, to eye/receptor 10, in a standard or first zero position. In the first zero position, the target image is originally presented, through the incoming image aperture 120, along incoming light path 51. As the original target image passes into the optical cavity 110, the target image contacts the reflective optical element 581 of the first adjustable holder 200. The target image is then reflected by the reflective optical element 581 of the first adjustable holder 200 to the reflective optical element 582 of the second adjustable holder 200, along internal light path 52.

As the target image contacts the reflective optical element 582 of the second adjustable holder 200, the target image is reflected by the reflective optical element 582 of the second adjustable holder 200, through the outgoing image aperture 130, to the optical targeting device 40, along outgoing light path 53. The target image is then passed through the optical targeting device 40, along outgoing light path 53, to the eye/receptor 10.

In this manner, the target image is presented, along outgoing light path 53, to the eye/receptor 10 at a first zero.

As illustrated in FIG. 63B, the first adjustable holder 200 and the second adjustable holder 200 are each rotated clockwise. As a result of the clockwise rotation of one or both of the first adjustable holder 200 and the second adjustable holder 200, the relative angle of the reflective optical element 581 of the first adjustable holder 200 relative to the reflective optical element 582 of the second adjustable holder 200 is altered. Thus, while the target image continues to be presented through the incoming image aperture 120, along incoming light path 51, the target image contacts the reflective optical element 581 of the first adjustable holder 200. The target image is then reflected by the reflective optical element 581 of the first adjustable holder 200 to the reflective optical element 582 of the second adjustable holder 200, along an altered internal light path 52'.

As the target image continues along altered internal light path 52' the target image contacts the reflective optical element 582 of the second adjustable holder 200 and is reflected by the reflective optical element 582 of the second adjustable holder 200, through the outgoing image aperture 130, along an altered outgoing light path 53', to the optical targeting device 40. The target image is then passed through the optical targeting device 40, along altered outgoing light path 53', to the eye/receptor 10.

In this manner, the target image is presented, along altered outgoing light path 53', to the eye/receptor 10 between a first zero and a second zero. The offset outgoing light path 53' is offset from the outgoing light path 53 by a distance 116.

Thus, the first zero represents a range where a projectile hits a target image when an aiming point through the optical targeting device 40 aligns with the target image, and wherein the second zero represents a range where a projectile hits a target image when an aiming point through the optical targeting device 40 aligns with the target image shifted by the optical adjustment device.

As illustrated in FIG. 63C, the first adjustable holder 200 and the second adjustable holder 200 are each rotated further clockwise, as compared to the rotational positions illustrated in FIG. 63B.

As a result of the further clockwise rotation of one or both of the first adjustable holder 200 and the second adjustable holder 200, the relative angle of the reflective optical element 581 of the first adjustable holder 200 relative to the reflective optical element 582 of the second adjustable holder 200 is further altered. Thus, as illustrated in FIGS. 2 and 11C, while the target image continues to be presented through the incoming image aperture 120, along incoming light path 51, the target image contacts the reflective optical element 581 of the first adjustable holder 200. The target image is then reflected by the reflective optical element 581 of the first adjustable holder 200 to the reflective optical element 582 of the second adjustable holder 200, along a further altered internal light path 52".

As the target image continues along further altered internal light path 52" the target image contacts the reflective optical element 582 of the second adjustable holder 200 and is reflected by the reflective optical element 582 of the second adjustable holder 200, through the outgoing image aperture 130, along a further altered outgoing light path 53", to the optical targeting device 40. The target image is then passed through the optical targeting device 40, along further altered outgoing light path 53", to the eye/receptor 10.

In this manner, the target image is presented, along further altered outgoing light path 53", to the eye/receptor 10 at a first zero. The further altered outgoing light path 53" is offset from the outgoing light path 53 by a distance 116.

Thus, in order to shift the target image from a first zero to a second zero, the relative rotational position of one or both of the first adjustable holder 200 (and, in turn, the reflective optical element 581 of the first adjustable holder 200) and/or the second adjustable holder 200 (and, in turn, the reflective surface 250 or mirror or lens 255 of the second adjustable holder 200) is adjusted. It should be appreciated that the degree of the relative rotational adjustment of the first adjustable holder 200 relative to the second adjustable holder 200 will result in the final light path of the image projected from the outgoing image aperture 130.

One or both of the adjustable holders 200 (and, in turn, the respective reflective optical elements 581 and 582) may optionally be adjusted to pass a new, second zero thru optical targeting device 40. A new second zero is produced and received by the eye/receptor 10. The difference in the target image position, between the first zero and second zero, as detected by the eye/receptor 10 is the required change that must be applied to optical targeting device 40. Changing the position of the optical targeting device 40 will require a shift in the platform the optical targeting device 40 is mounted to. This will create a new second zero.

The variable range compensating device 100 allows a user to shift the firearm, device, or other platform to which optical targeting device 40 is attached or coupled in order to realign to a desired aiming point. In various exemplary embodiments, locks 109 may optionally be provided to secure the first adjustable holder 200 and/or the second adjustable holder 200 such that the desired target image position (i.e., the relative rotational positions producing the adjusted second zero) may be maintained. In various exemplary, nonlimiting embodiments, the locks 109 comprise covers, attached or coupled to portions of the housing 105, covering the first adjustable holder 200 and/or the second adjustable holder 200.

In various exemplary, nonlimiting embodiments, as illustrated in FIGS. 19-21, the variable range compensating device 100 may use keyway reference points or detents 400, 401, 402, and 403, to establish reference positions for the adjustable holders 200 and reference positions when a predetermined rotational adjustment or any solution or combination thereof may be repeated or further utilized. In various exemplary embodiments, a known key 403 (optionally attached to the housing 105 via one or more fasteners 404) or one or more corresponding detents can be used to set and establish the relative rotational position of the first adjustable holder 200 and/or the second adjustable holder 200. The variable range compensating device 100 may then be used to shift an apparent second zero of a viewed target image or scene.

Figure 64:
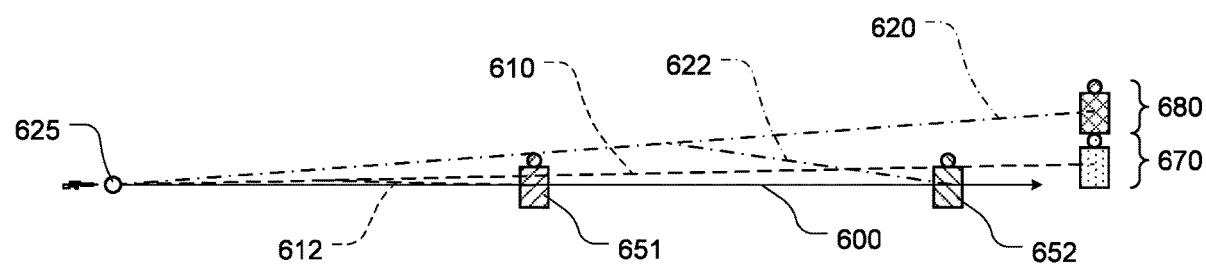
FIG. 64 illustrates a graphical representation of an exemplary second zero position created by an exemplary variable range compensating device, according to the present disclosure.

FIG. 64 illustrates a graphical representation of an exemplary second zero position created by an exemplary variable range compensating device, according to the present disclosure.

As illustrated, the variable range compensating device 100 will operate to shift the object image and allow a fired projectile to hit a target from 0-600 yards while holding directly on the target. The shooter's position (with the variable range compensating device 100) is shown at 625 with a first bore axis 610 and an original target 651 positioned at a first distance in the shooter's line of sight 600. A first trajectory 612 of a fired projectile is illustrated.

By utilizing the variable range compensating device 100 a second bore axis 620 is illustrated with a target 652 position and a second distance shooters line of sight 600. The firearm's position with a second bore axis 620 and a second trajectory 622.

In this exemplary embodiment, the variable range compensating device 100 provides a first point-blank zone 670 and a second point-blank zone 680. In this exemplary embodiment, each of the first point-blank zone 670 and the second point-blank zone 680 is approximately 40 inches.

It should also be appreciated that a more detailed explanation of the instructions regarding how to install the variable range compensating device 100, methods for using the variable range compensating device 100, once installed, and certain other items and/or techniques necessary for the implementation and/or operation of the various exemplary embodiments of the presently disclosed systems, methods, and/or apparatuses are not provided herein because such elements are commercially available and/or such background information will be known to one of ordinary skill in the art. Therefore, it is believed that the level of description provided herein is sufficient to enable one of ordinary skill in the art to understand and practice the presently disclosed systems, methods, and/or apparatuses, as described.

While the presently disclosed systems, methods, and/or apparatuses has been described in conjunction with the exemplary embodiments outlined above, the foregoing description of exemplary embodiments of the presently disclosed systems, methods, and/or apparatuses, as set forth above, are intended to be illustrative, not limiting and the fundamental disclosed systems, methods, and/or apparatuses should not be considered to be necessarily so constrained. It is evident that the presently disclosed systems, methods, and/or apparatuses is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the presently disclosed systems, methods, and/or apparatuses. The upper and lower limits of these smaller ranges may independently be included in the smaller ranges and is also encompassed within the presently disclosed systems, methods, and/or apparatuses, subject to any specifically excluded limit in the stated range. Where the stated range includes one or both of the limits, ranges excluding either or both of those included limits are also included in the presently disclosed systems, methods, and/or apparatuses.

It is to be understood that the phraseology of terminology employed herein is for the purpose of description and not of limitation. Unless defined otherwise, all technical and scientific terms used herein have the same meaning as commonly understood by one of ordinary skill in the art to which the presently disclosed systems, methods, and/or apparatuses belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the presently disclosed systems, methods, and/or apparatuses, such that others may, by applying current knowledge, change, vary, modify, and/or adapt these exemplary, non-limiting embodiments for various applications without departing from the spirit and scope of the presently disclosed systems, methods, and/or apparatuses and elements or methods similar or equivalent to those described herein can be used in practicing the presently disclosed systems, methods, and/or apparatuses. Any and all such changes, variations, modifications, and/or adaptations should and are intended to be comprehended within the meaning and range of equivalents of the disclosed exemplary embodiments and may be substituted without departing from the true spirit and scope of the presently disclosed systems, methods, and/or apparatuses.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A variable range compensating device for an optical targeting device, comprising:
    a housing having an optical cavity defined at least partially within said housing, wherein said optical cavity extends from an incoming image aperture to an outgoing image aperture;
    at least one first reflective optical element positioned within at least a portion of said optical cavity, wherein said at least one first reflective optical element is adjustable so as to adjust an orientation of said at least one first reflective optical element relative to said housing;
    at least one second reflective optical element positioned within at least a portion of said optical cavity, wherein said at least one second reflective optical element is adjustable so as to adjust an orientation of said at least one second reflective optical element relative to said housing;
    wherein said at least one first reflective optical element is positioned so as to receive a target image through said incoming image aperture and reflect said target image to said at least one second reflective optical element, and wherein said at least one second reflective optical element is positioned so as to receive said target image from said at least one first reflective optical element and reflect said target image through said outgoing image aperture; and
    wherein adjustment of said at least one first reflective optical element and/or said at least one second reflective optical element adjusts an angle at which said target image is reflected through said outgoing image aperture.

2. The variable range compensating device of claim 1, wherein said at least one first reflective optical element and/or said at least one second reflective optical element is an optical wedge.

3. The variable range compensating device of claim 1, wherein said at least one first reflective optical element and/or said at least one second reflective optical element is an optical prism.

4. The variable range compensating device of claim 1, wherein said at least one first reflective optical element and/or said at least one second reflective optical element comprises a reflective optical element having a transparent optical portion with one of more surfaces that refract light.

5. The variable range compensating device of claim 1, wherein said at least one first reflective optical element is attached or coupled to an adjustable holder.

6. The variable range compensating device of claim 1, wherein said at least one second reflective optical element is attached or coupled to an adjustable holder.

7. The variable range compensating device of claim 1, wherein a determined adjustment of said at least one first reflective optical element and/or a determined adjustment of said at least one second reflective optical element adjusts an angle at which said target image is reflected through said outgoing image aperture at a determined offset.

8. The variable range compensating device of claim 1, wherein adjustment so as to adjust said vertical orientation of said at least one first reflective optical element and/or said at least one second reflective optical element adjusts a right and left orientation of said at least one first reflective optical element and/or said at least one second reflective optical element.

9. The variable range compensating device of claim 1, wherein adjustment so as to adjust said orientation of said at least one first reflective optical element and/or said at least one second reflective optical element adjusts a vertical orientation of said at least one first reflective optical element and/or said at least one second reflective optical element.

10. The variable range compensating device of claim 1, wherein adjustment so as to adjust said orientation of said at least one first reflective optical element and/or said at least one second reflective optical element adjusts a horizontal orientation of said at least one first reflective optical element and/or said at least one second reflective optical element.

11. The variable range compensating device of claim 1, wherein adjustment so as to adjust said orientation of said at least one first reflective optical element and/or said at least one second reflective optical element adjusts said orientation of said at least one first reflective optical element relative to said at least one second reflective optical element.

12. The variable range compensating device of claim 1, wherein at least one transmissive optical device is positioned relative to said at least one first reflective optical element or said at least one second reflective optical element to magnify said incoming image or said outgoing image or de-magnify said incoming image or said outgoing image.

13. The variable range compensating device of claim 1, wherein at least one of said at least one first reflective optical element and said at least one second reflective optical element is manually manipulable.

14. The variable range compensating device of claim 1, wherein at least one of said at least one first reflective optical element and said at least one second reflective optical element are rotatable via linked interaction with at least one turret, wherein rotational movement of said turret produces rotational movement of at least one of said at least one first reflective optical element and said at least one second reflective optical element.

15. The variable range compensating device of claim 1, wherein at least one of said at least one first reflective optical element and said at least one second reflective optical element is manipulated via a drive motor.

16. The variable range compensating device of claim 15, wherein said drive motor rotatably adjusts at least one of said at least one first reflective optical element and said at least one second reflective optical element in response to information from a rangefinder device or a ballistic computer or calculator.

17. A variable range compensating device, comprising:
   a housing having an optical cavity defined at least partially within said housing, wherein said optical cavity extends from an incoming image aperture to an outgoing image aperture; and
   two or more reflective optical elements, wherein each reflective optical element is adjustably positioned within at least a portion of said optical cavity, and wherein adjustment of at least one of said reflective optical elements adjusts said reflective optical elements such that a target image entering said incoming image aperture is reflected by said reflective optical elements, so as to exit said outgoing image aperture at a determined offset.

18. The variable range compensating device of claim 17, wherein each of said reflective optical elements is attached or coupled to an adjustable holder.

19. The variable range compensating device of claim 17, wherein at least one reflective optical element is adjusted so as to adjust a relative angle of said at least one reflective optical element relative to at least one other reflective optical element.

20. A method for adjusting an angle at which a target image is presented to an optical targeting device, comprising:
   providing a variable range compensating device between a target and said optical targeting device;
   said variable range compensating device comprising:
   a housing having an optical cavity defined at least partially within said housing, wherein said optical cavity extends from an incoming image aperture to an outgoing image aperture;
   at least one first reflective optical element adjustably positioned within at least a portion of said optical cavity;
   at least one second reflective optical element adjustably positioned within at least a portion of said optical cavity;
   wherein said at least one first reflective optical element is positioned so as to receive a target image through said incoming image aperture and reflect said target image to said at least one second reflective optical element, and wherein said at least one second reflective optical element is positioned so as to receive said target image from said at least one first reflective optical element and reflect said target image through said outgoing image aperture;
   wherein adjustment of said at least one first reflective optical element and/or said at least one second reflective optical element adjusts an angle at which said target image is reflected through said outgoing image aperture; and
   adjusting at least one of said at least one first reflective optical element and/or said at least one second reflective optical element to adjust an angle at which said target image is reflected through said outgoing image aperture to said optical targeting device.

\* \* \* \* \*